United States Patent
Hu et al.

(10) Patent No.: US 10,419,326 B2
(45) Date of Patent: Sep. 17, 2019

(54) METHOD FOR IMPLEMENTING NETWORK VIRTUALIZATION AND RELATED APPARATUS AND COMMUNICATIONS SYSTEM

(71) Applicant: HUAWEI TECHNOLOGIES CO., LTD., Shenzhen, Guangdong (CN)

(72) Inventors: Shihui Hu, Beijing (CN); Mingming Zhu, Beijing (CN); Guangpeng Li, Beijing (CN); Enhui Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 339 days.

(21) Appl. No.: 15/243,351

(22) Filed: Aug. 22, 2016

(65) Prior Publication Data

US 2016/0359721 A1 Dec. 8, 2016

Related U.S. Application Data

(63) Continuation of application No. PCT/CN2014/072425, filed on Feb. 23, 2014.

(51) Int. Cl.
*H04L 12/751* (2013.01)
*H04L 12/24* (2006.01)
(Continued)

(52) U.S. Cl.
CPC .......... *H04L 45/02* (2013.01); *H04L 12/4641* (2013.01); *H04L 41/12* (2013.01); *H04L 45/745* (2013.01)

(58) Field of Classification Search
None
See application file for complete search history.

(56) References Cited

U.S. PATENT DOCUMENTS

2008/0301303 A1* 12/2008 Matsuoka ........... H04L 12/4645
709/227
2013/0332602 A1* 12/2013 Nakil .................. G06N 99/005
709/224

(Continued)

FOREIGN PATENT DOCUMENTS

CN 102710432 A 10/2012
EP 2833579 A1 2/2015
(Continued)

OTHER PUBLICATIONS

"OpenFlow Switch Specification Version 1.1.0", Open Networking Foundation (Year: 2011).*

(Continued)

*Primary Examiner* — James P Duffy
(74) *Attorney, Agent, or Firm* — Womble Bond Dickinson (US) LLP

(57) ABSTRACT

A method for implementing network virtualization, and a related apparatus and a communications system are provided. The method for implementing network virtualization may include: receiving, by an SDN controller, a virtual network creation request that carries virtual network topology information; creating a virtual network in response to the virtual network creation request; establishing, by the SDN controller, a device mapping relationship; establishing, by the SDN controller, a port mapping relationship; allocating, by the SDN controller, a virtual SDN controller to the virtual network; and registering, by the SDN controller, a first virtual forwarding device and a second virtual forwarding device with the virtual SDN controller. Technical solutions of embodiments of the present invention help to improve networking flexibility, reduce service costs, and shorten a service deployment period.

22 Claims, 18 Drawing Sheets

(51) Int. Cl.
*H04L 12/46* (2006.01)
*H04L 12/741* (2013.01)

(56) References Cited

U.S. PATENT DOCUMENTS

| | | | |
|---|---|---|---|
| 2014/0047125 A1 | 2/2014 | Hyoudou et al. | |
| 2014/0280864 A1* | 9/2014 | Yin | H04L 41/12 709/224 |
| 2015/0049636 A1* | 2/2015 | Tai | H04L 41/08 370/254 |

FOREIGN PATENT DOCUMENTS

| | | |
|---|---|---|
| WO | 2013139298 A1 | 9/2013 |
| WO | WO 2013/139298 A1 | 9/2013 |
| WO | WO 2013/146829 A1 | 10/2013 |

OTHER PUBLICATIONS

EP Application No. 14882883.3, Extended European Search Report, dated Dec. 9, 2016, 13 pages.

ETSI Anonymous, "Network Functions Virtualisation (NFV); Architectural Framework," ETSI GS NVF 002 V1.1.1, Oct. 1, 2013, pp. 1-21.

Hewlett-Packards, et al, "NVF and SDN," European Telecommunications Standards Institute (ETSI), Feb. 6, 2014, pp. 1-10.

PCT/CN2014/072425, International Search Report, dated Dec. 1, 2014, 12 pages.

Lin, Pingping, et al, "VCP: A Virtualization Cloud Platform for SDN Intra-domain Production Network," 2012 20th IEEE International Conference on Network Protocols (ICNP), Oct. 30-Nov. 2, 2012, 2 pages.

Sun, Ying-ying, et al, "Design and Implementation of Virtual Network Infrastructure Based on OpenFlow," Jan. 2014, 5 pages (English Abstract).

* cited by examiner

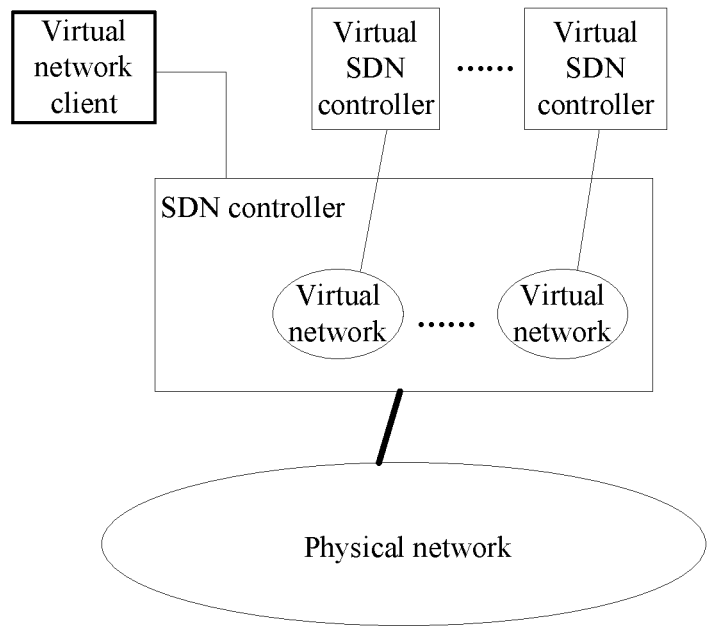
FIG. 1-a
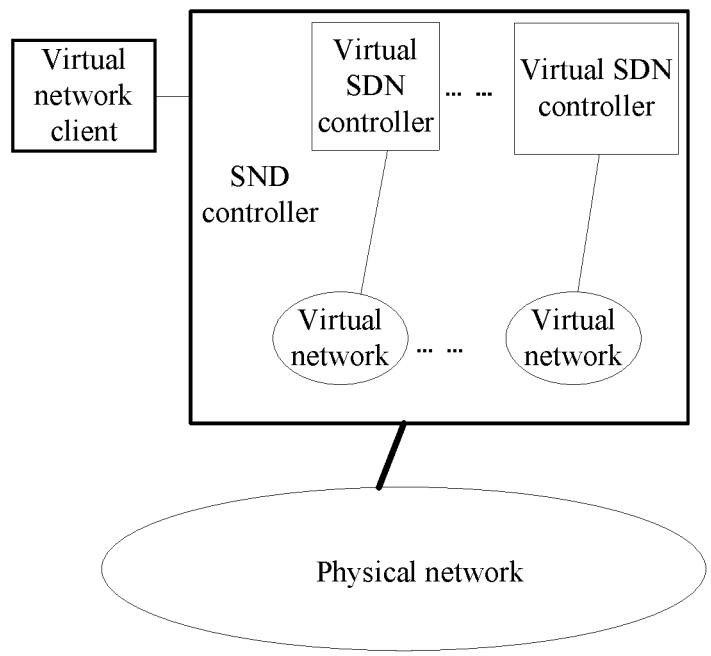
FIG. 1-b

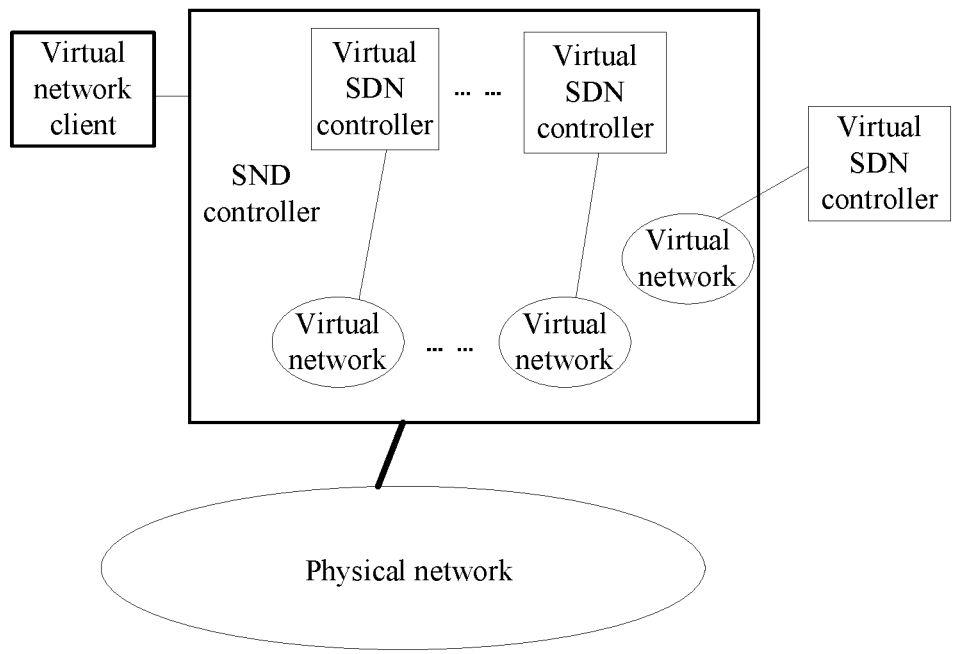
FIG. 1-c
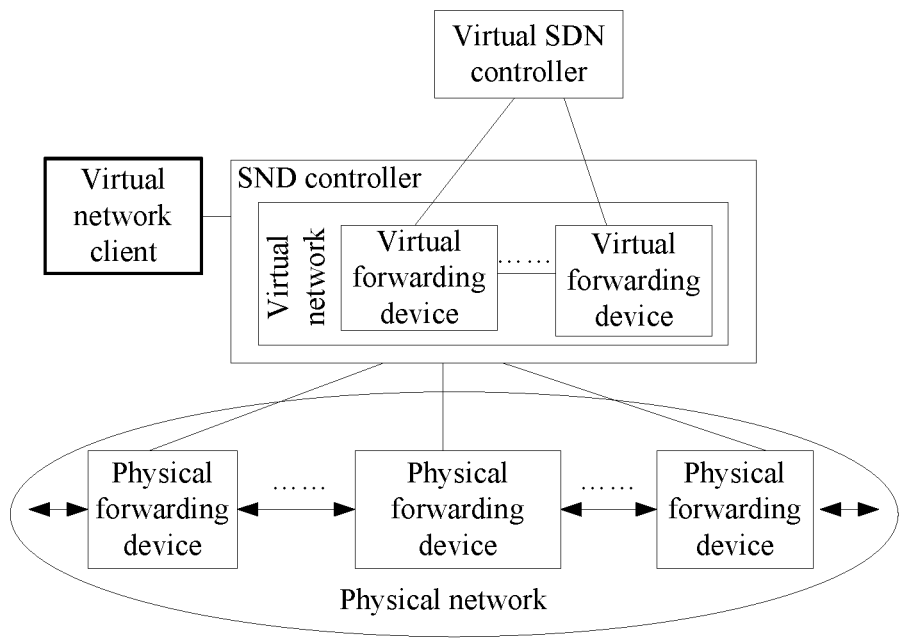
FIG. 1-d

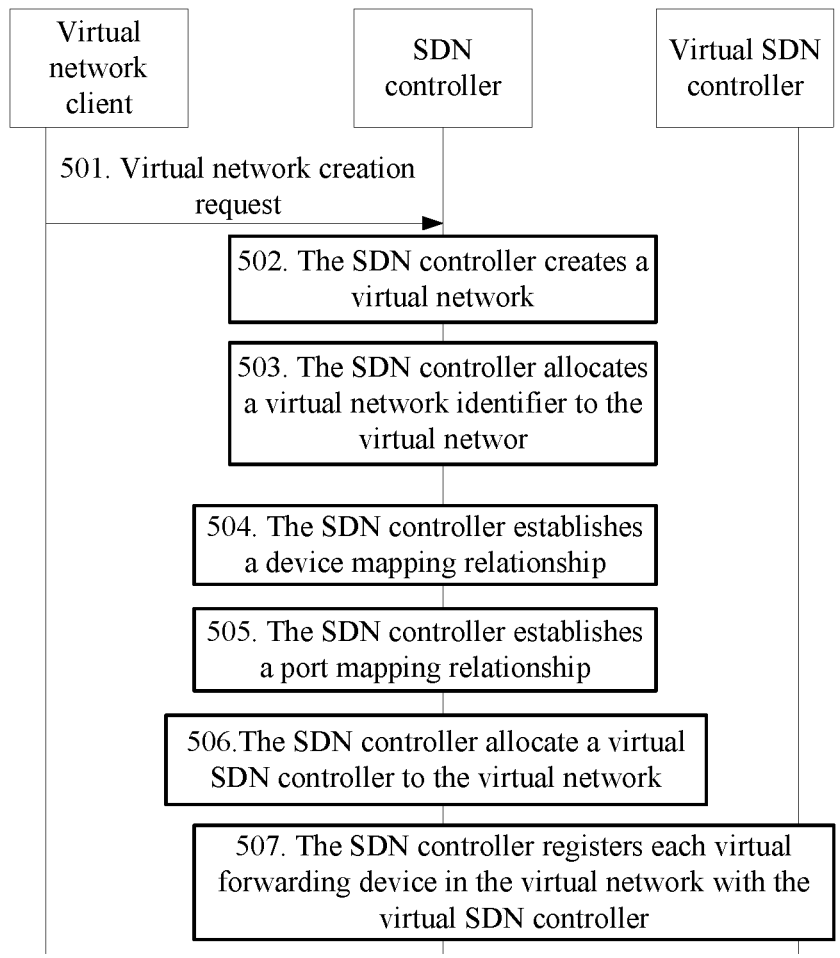
FIG. 5-a
FIG. 5-b

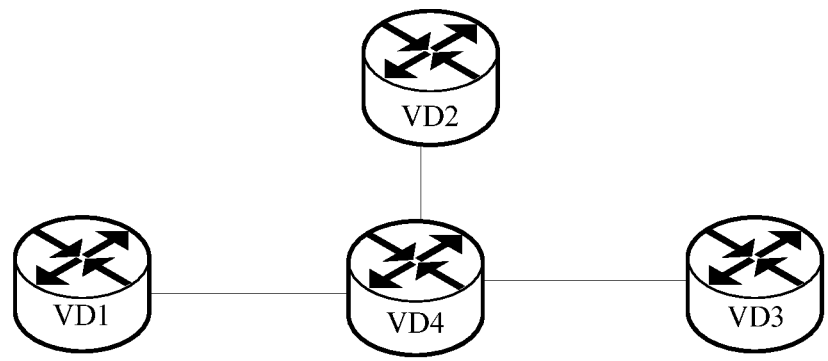
FIG. 5-c
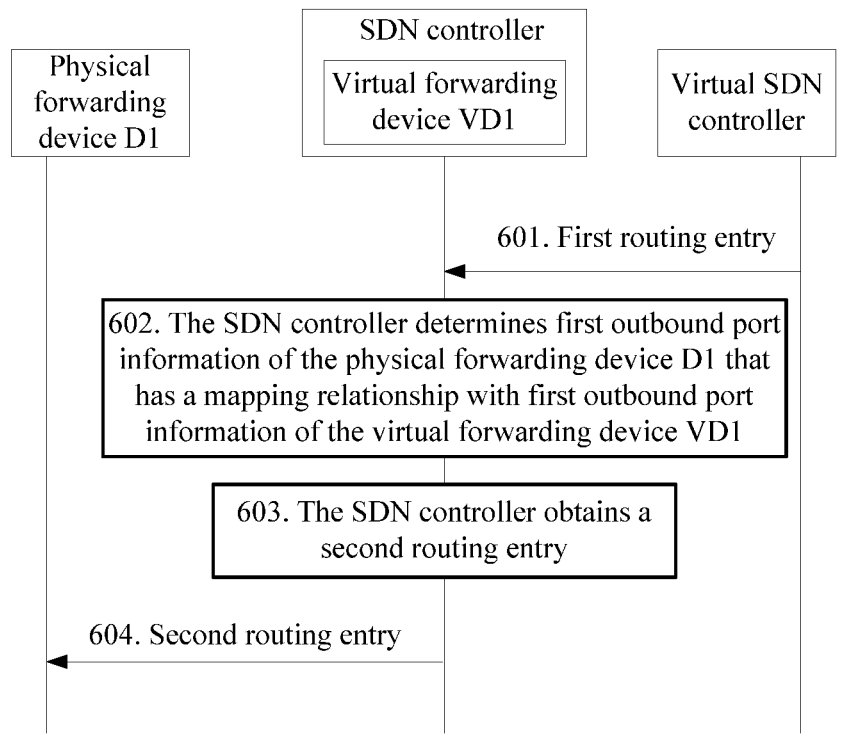
FIG. 6

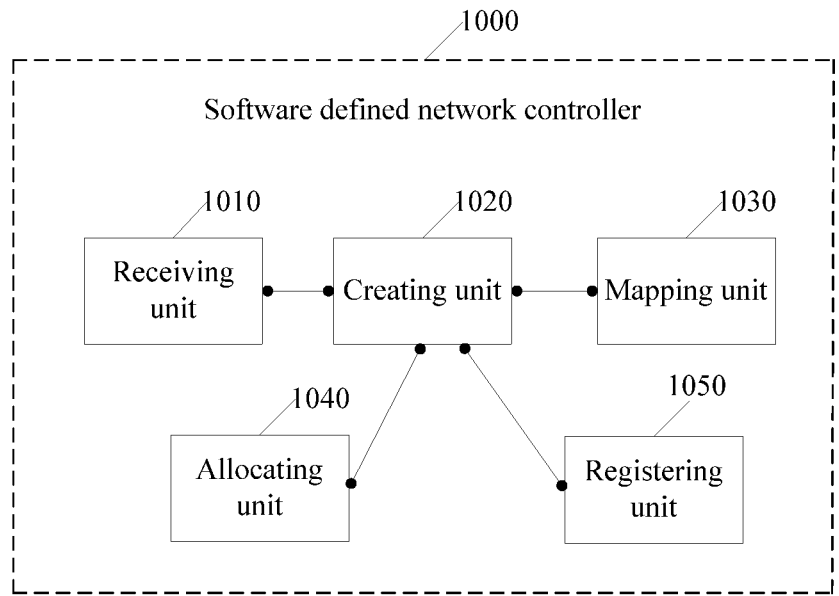
FIG. 10-a
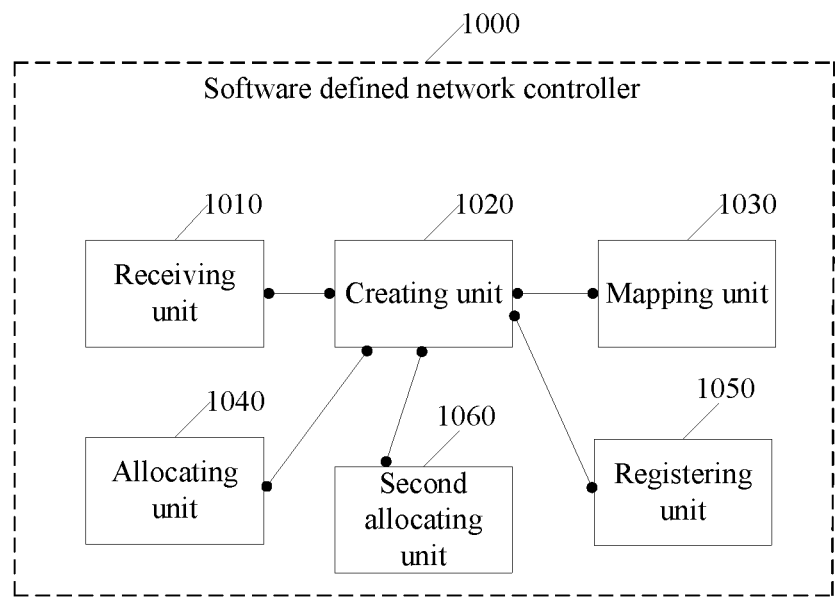
FIG. 10-b

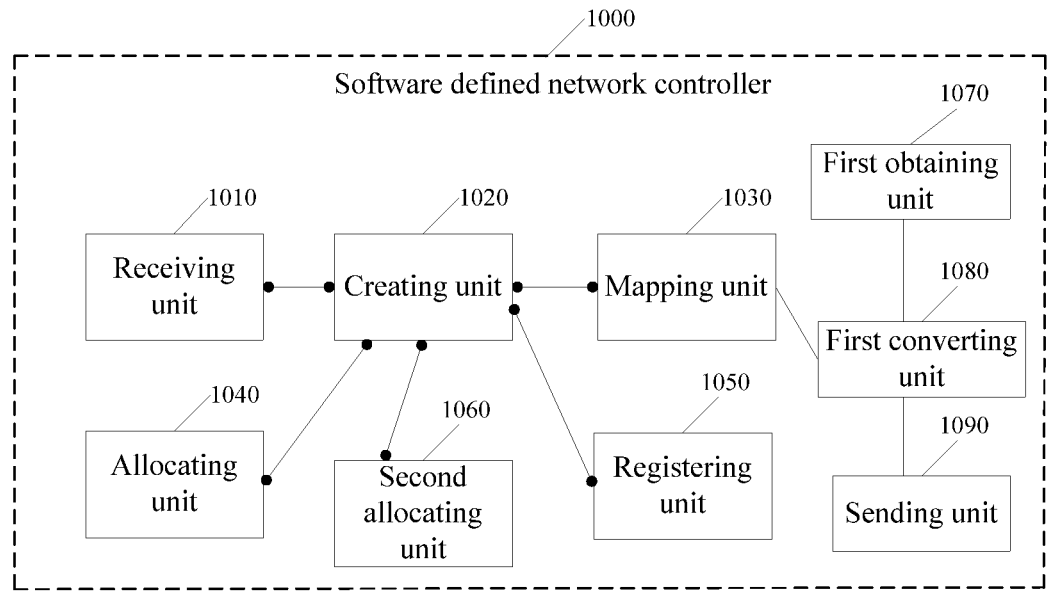
FIG. 10-c
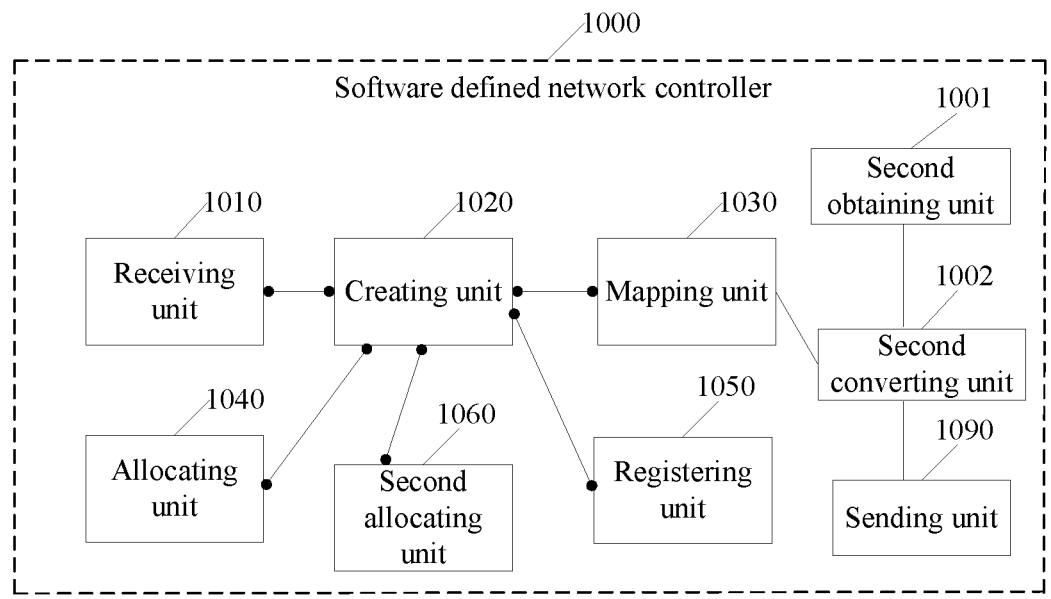
FIG. 10-d

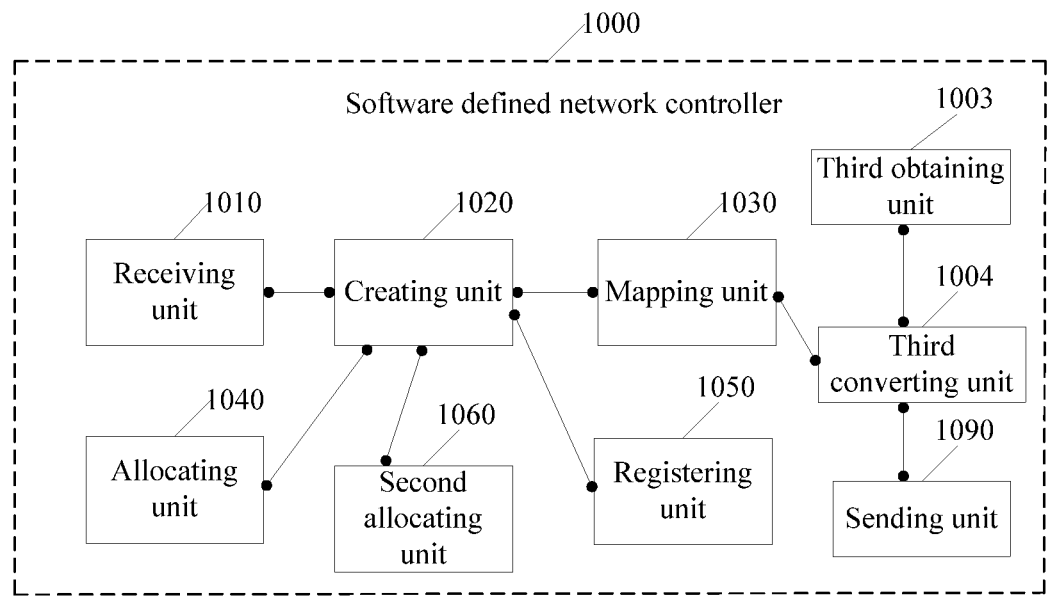
FIG. 10-e
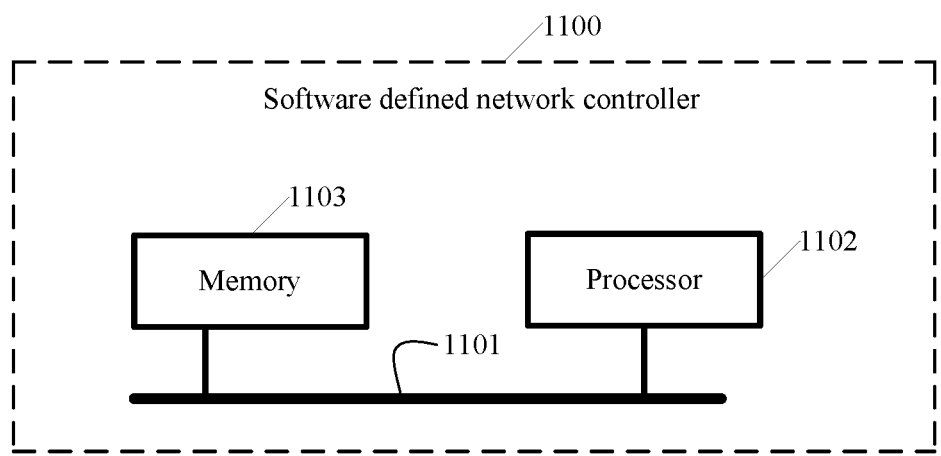
FIG. 11

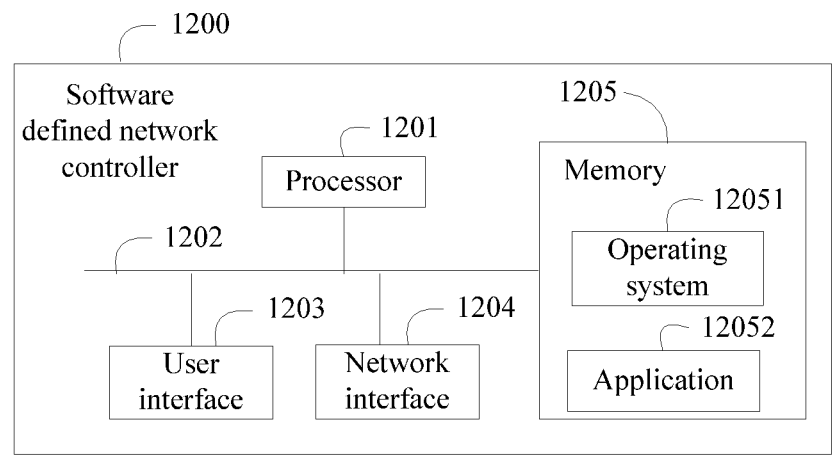
FIG. 12
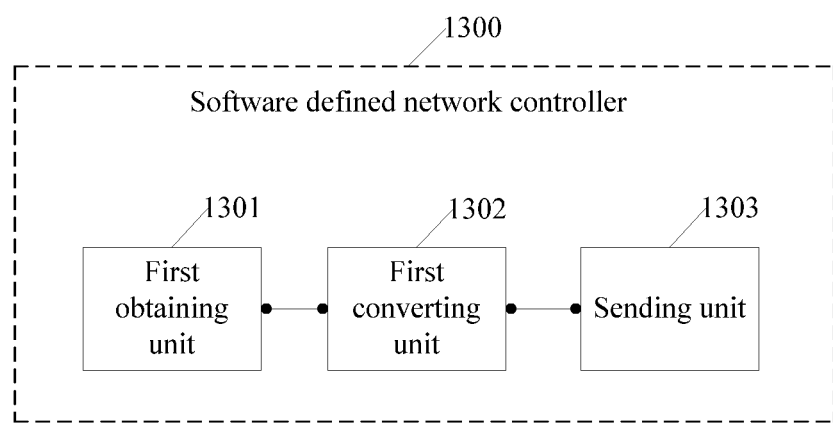
FIG. 13-a

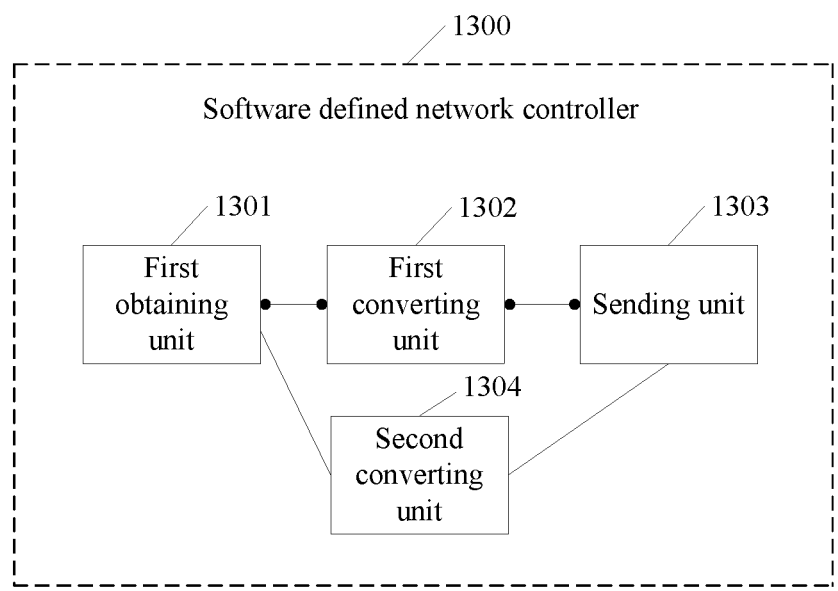
FIG. 13-b
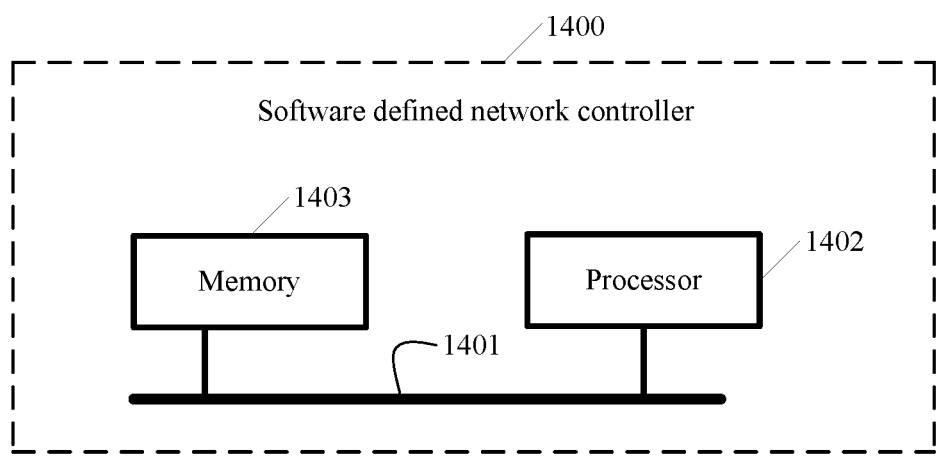
FIG. 14

METHOD FOR IMPLEMENTING NETWORK VIRTUALIZATION AND RELATED APPARATUS AND COMMUNICATIONS SYSTEM

CROSS-REFERENCE TO RELATED APPLICATIONS

This application is a continuation of International Application No. PCT/CN2014/072425, filed on Feb. 23, 2014, which is hereby incorporated by reference in its entirety.

TECHNICAL FIELD

The present invention relates to the field of communications technologies, and in particular, to a method for implementing network virtualization and a related apparatus and a communications system.

BACKGROUND

As cloud computing is popular gradually, more small- and medium-sized enterprise users hope that an operator provides a private network service. However, a current virtual private network (VPN, Virtual Private Network) has many problems. For example, the VPN can support only a star topology, a full-mesh topology, or a partial full-mesh topology, but a virtual network of any topology cannot be deployed according to a user requirement. VPN configuration is complex and a service deployment period is long (approximately 16 days). However, currently applying for and creating a cloud data center may be implemented instantly, and a deployment speed of the VPN cannot match a creation speed of the cloud data center.

Route exchange is implemented between VPN stations by using a Border Gateway Protocol (BGP, Border Gateway Protocol). BGP route propagation and exchange are limited, and a router supports a maximum of 4096 VPNs. Consequently, VPN service costs are high, a VPN service price is high, and most small- and medium-sized enterprises do not use the VPN service.

Due to features of a conventional VPN solution in aspects such as a service deployment period, service networking flexibility, and costs, it is increasingly difficult to meet diversified customer requirements.

SUMMARY

Embodiments of the present invention provide a method for implementing network virtualization, and a related apparatus and a communications system, so as to improve service networking flexibility, reduce service costs, and shorten a service deployment period.

A first aspect of an embodiment of the present invention provides a method for implementing network virtualization, including: receiving, by a software defined network SDN controller, a virtual network creation request that carries virtual network topology information;

creating, by the SDN controller, a virtual network in response to the virtual network creation request, where the virtual network has a topology described by the virtual network topology information, and the virtual network includes a first virtual forwarding device and a second virtual forwarding device;

establishing, by the SDN controller, a device mapping relationship, where the device mapping relationship includes a mapping relationship between the first virtual forwarding device and a first physical forwarding device in a physical network, and a mapping relationship between the second virtual forwarding device and a second physical forwarding device in the physical network;

establishing, by the SDN controller, a port mapping relationship, where the port mapping relationship includes a mapping relationship between a port of the first virtual forwarding device and a port of the first physical forwarding device, and a mapping relationship between a port of the second virtual forwarding device and a port of the second physical forwarding device;

allocating, by the SDN controller, a virtual SDN controller to the virtual network; and registering, by the SDN controller, the first virtual forwarding device and the second virtual forwarding device with the virtual SDN controller.

With reference to the first aspect, in a first possible implementation manner of the first aspect, after the creating, by the SDN controller, a virtual network, the method further includes: allocating, by the SDN controller, a virtual network identifier to the virtual network; and establishing, by the SDN controller, a mapping relationship between the virtual network identifier and an identifier of the virtual SDN controller.

With reference to the first aspect or the first possible implementation manner of the first aspect, in a second possible implementation manner of the first aspect, the mapping relationship between the port of the first virtual forwarding device and the port of the first physical forwarding device includes at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

With reference to the second possible implementation manner of the first aspect, in a third possible implementation manner of the first aspect, the inbound port information of the first virtual forwarding device includes a port identifier of an inbound port of the first virtual forwarding device, and the outbound port information of the first virtual forwarding device includes a port identifier of an outbound port of the first virtual forwarding device;

the inbound port information of the first physical forwarding device includes a port identifier of an inbound port of the first physical forwarding device, or the inbound port information of the first physical forwarding device includes a port identifier and an inbound port label of an inbound port of the first physical forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the second possible implementation manner of the first aspect or the third possible implementation manner of the first aspect, in a fourth possible implementation manner of the first aspect, after the registering, by the SDN controller, the first virtual forwarding device with the virtual SDN controller, the method further includes:

obtaining, by the SDN controller by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device;

determining, by the SDN controller based on the first virtual forwarding device and the device mapping relationship, the first physical forwarding device that has the mapping relationship with the first virtual forwarding device; and determining, based on the port mapping relationship and the outbound port information of the first virtual forwarding device, the outbound port information of the first physical forwarding device that has the mapping relationship with the outbound port information of the first virtual forwarding device; and sending, by the SDN controller, a second routing entry to the first physical forwarding device, where a match field of the second routing entry carries the network address, and an action field of the second routing entry carries the outbound port information of the first physical forwarding device.

With reference to the fourth possible implementation manner of the first aspect, in a fifth possible implementation manner of the first aspect, if the SDN controller allocates the virtual network identifier to the virtual network, the match field of the second routing entry further carries the virtual network identifier.

With reference to the second possible implementation manner of the first aspect or the third possible implementation manner of the first aspect, in a sixth possible implementation manner of the first aspect, after the registering, by the SDN controller, the first virtual forwarding device with the virtual SDN controller, the method further includes:

obtaining, by the SDN controller by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device;

determining, by the SDN controller based on the first virtual forwarding device and the device mapping relationship, the first physical forwarding device that has the mapping relationship with the first virtual forwarding device; determining, based on the port mapping relationship and the outbound port information of the first virtual forwarding device, the outbound port information of the first physical forwarding device that has the mapping relationship with the outbound port information of the first virtual forwarding device; and determining, based on the port mapping relationship and the inbound port information of the first virtual forwarding device, the inbound port information of the first physical forwarding device that has the mapping relationship with the inbound port information of the first virtual forwarding device; and sending, by the SDN controller, a fourth routing entry to the first physical forwarding device, where a match field of the fourth routing entry carries the inbound port information of the first physical forwarding device, and an action field of the fourth routing entry carries the outbound port information of the first physical forwarding device.

With reference to the second possible implementation manner of the first aspect or the third possible implementation manner of the first aspect, in a seventh possible implementation manner of the first aspect, after the registering, by the SDN controller, the first virtual forwarding device with the virtual SDN controller, the method further includes:

receiving, by the SDN controller, a first control message reported by the first physical forwarding device, where a match field of the first control message carries the inbound port information of the first physical forwarding device;

determining, by the SDN controller based on the port mapping relationship and the inbound port information of the first physical forwarding device, the inbound port information of the first virtual forwarding device that has the mapping relationship with the inbound port information of the first physical forwarding device; and sending, by the SDN controller, a second control message to the virtual SDN controller by using the first virtual forwarding device, where a match field of the second control message carries the inbound port information of the first virtual forwarding device.

With reference to the fourth possible implementation manner of the first aspect or the fifth possible implementation manner of the first aspect or the sixth possible implementation manner of the first aspect, in an eighth possible implementation manner of the first aspect, the method further includes:

if the first routing entry delivered by the virtual SDN controller is obtained by using the first virtual forwarding device, saving, by the SDN controller, the first routing entry; and if the third routing entry delivered by the virtual SDN controller is obtained by using the first virtual forwarding device, saving, by the SDN controller, the third routing entry.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect, in a ninth possible implementation manner of the first aspect, after the creating, by the SDN controller, a virtual network, the method further includes:

separately allocating, by the SDN controller, a device identifier to the first virtual forwarding device and the second virtual forwarding device;

where the mapping relationship between the first virtual forwarding device and the first physical forwarding device in the physical network includes a mapping relationship between the device identifier of the first virtual forwarding device and a device identifier of the first physical forwarding device; and where the mapping relationship between the second virtual forwarding device and the second physical forwarding device in the physical network includes a mapping relationship between the device identifier of the second virtual forwarding device and a device identifier of the second physical forwarding device.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect or the eighth possible implementation manner of the first aspect or the ninth possible implementation manner of the first aspect, in a tenth possible implementation manner of the first aspect, the virtual network creation request further carries link attribute information, and after the creating, by the SDN controller, a virtual network, the method further includes:

establishing, by the SDN controller, a mapping relationship between a virtual link and a link tunnel, where the link tunnel complies with a constraint of the link attribute information, where the virtual link is a virtual link between the first virtual forwarding device and the second virtual forwarding device, and the link tunnel is a link tunnel between the first physical forwarding device and the second physical forwarding device.

With reference to the tenth possible implementation manner of the first aspect, in an eleventh possible implementation manner of the first aspect, the link attribute information includes at least one piece of the following information:

link bandwidth information, link delay information, link packet loss ratio information, and link jitter information.

With reference to the tenth possible implementation manner of the first aspect or the eleventh possible implementation manner of the first aspect, in a twelfth possible implementation manner of the first aspect, information used to describe the virtual link includes: the device identifier of the first virtual forwarding device, a port identifier of a link source port in the first virtual forwarding device, the device identifier of the second virtual forwarding device, and a port identifier of a link destination port in the second virtual forwarding device.

A second aspect of an embodiment of the present invention provides a method for implementing network virtualization, including:

obtaining, by a software defined network SDN controller by using a first virtual forwarding device, a first routing entry delivered by a virtual SDN controller, where an action field of the first routing entry carries outbound port information of the first virtual forwarding device, and the first virtual forwarding device is registered with the virtual SDN controller;

determining, by the SDN controller based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network;

determining, by the SDN controller based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and sending, by the SDN controller, a second routing entry to the first physical forwarding device, where an action field of the second routing entry carries the outbound port information of the first physical forwarding device.

With reference to the second aspect, in a first possible implementation manner of the second aspect, the outbound port information of the first virtual forwarding device includes a port identifier of an outbound port of the first virtual forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the second aspect or the first possible implementation manner of the second aspect, in a second possible implementation manner of the second aspect, a match field of the first routing entry carries a network address, where the network address is a destination address and/or a source address, and a match field of the second routing entry carries the network address.

With reference to the second aspect or the first possible implementation manner of the second aspect or the second possible implementation manner of the second aspect, in a third possible implementation manner of the second aspect, the match field of the second routing entry carries a virtual network of a virtual network to which the first virtual forwarding device belongs.

With reference to the second aspect or the first possible implementation manner of the second aspect or the second possible implementation manner of the second aspect, in a fourth possible implementation manner of the second aspect, the match field of the first routing entry carries inbound port information of the first virtual forwarding device; and the method further includes:

determining, by the SDN controller based on the port mapping relationship and the inbound port information of the first virtual forwarding device, inbound port information of the first physical forwarding device that has a mapping relationship with the inbound port information of the first virtual forwarding device, where the port mapping relationship further includes the mapping relationship between the inbound port information of the first virtual forwarding device and the inbound port information of the first physical forwarding device;

where the match field of the second routing entry carries the inbound port information of the first physical forwarding device.

A third aspect of an embodiment of the present invention provides a method for implementing network virtualization, including:

receiving, by a software defined network SDN controller, a third control message reported by a first physical forwarding device in a physical network, where a match field of the third control message carries inbound port information of the first physical forwarding device;

determining, by the SDN controller based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and sending, by the SDN controller, a fourth control message to a virtual SDN controller by using the first virtual forwarding device, where a match field of the fourth control message carries the inbound port information of the first virtual forwarding device, and the first virtual forwarding device is registered with the virtual SDN controller.

With reference to the third aspect, in a first possible implementation manner of the third aspect, the inbound port information of the first virtual forwarding device includes a port identifier of an inbound port of the first virtual forwarding device; and the inbound port information of the first physical forwarding device includes a port identifier of an inbound port of the first physical forwarding device, or the inbound port information of the first physical forwarding device includes a port identifier and an inbound port label of an inbound port of the first physical forwarding device.

A fourth aspect of an embodiment of the present invention provides a software defined network SDN controller, including:

a receiving unit, configured to receive a virtual network creation request that carries virtual network topology information;

a creating unit, configured to create a virtual network in response to the virtual network creation request, where the virtual network has a topology described by the virtual network topology information, and the virtual network includes a first virtual forwarding device and a second virtual forwarding device;

a mapping unit, configured to establish a device mapping relationship and establish a port mapping relationship, where the device mapping relationship includes a mapping relationship between the first virtual forwarding device and a first physical forwarding device in a physical network, and a mapping relationship between the second virtual forwarding device and a second physical forwarding device in the physical network, and the port mapping relationship includes a mapping relationship between a port of the first virtual forwarding device and a port of the first physical forwarding device, and a mapping relationship between a port of the second virtual forwarding device and a port of the second physical forwarding device;

an allocating unit, configured to allocate a virtual SDN controller to the virtual network; and a registering unit, configured to register the first virtual forwarding device and the second virtual forwarding device with the virtual SDN controller.

With reference to the fourth aspect, in a first possible implementation manner of the fourth aspect, the SDN controller further includes a second allocating unit, configured to allocate a virtual network identifier to the virtual network after the creating unit creates the virtual network; and the mapping unit is further configured to establish a mapping relationship between the virtual network identifier and an identifier of the virtual SDN controller.

With reference to the fourth aspect or the first possible implementation manner of the fourth aspect, in a second possible implementation manner of the fourth aspect, the mapping relationship between the port of the first virtual forwarding device and the port of the first physical forwarding device includes at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

With reference to the second possible implementation manner of the fourth aspect, in a third possible implementation manner of the fourth aspect, the inbound port information of the first virtual forwarding device includes a port identifier of an inbound port of the first virtual forwarding device, and the outbound port information of the first virtual forwarding device includes a port identifier of an outbound port of the first virtual forwarding device;

the inbound port information of the first physical forwarding device includes a port identifier of an inbound port of the first physical forwarding device, or the inbound port information of the first physical forwarding device includes a port identifier and an inbound port label of an inbound port of the first physical forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the second possible implementation manner of the fourth aspect or the third possible implementation manner of the fourth aspect, in a fourth possible implementation manner of the fourth aspect, the SDN controller further includes:

a first obtaining unit, configured to: after the registering unit registers the first virtual forwarding device with the virtual SDN controller, obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device;

a first converting unit, configured to: determine, based on the first virtual forwarding device and the device mapping relationship, the first physical forwarding device that has the mapping relationship with the first virtual forwarding device; and determine, based on the port mapping relationship and the outbound port information of the first virtual forwarding device, the outbound port information of the first physical forwarding device that has the mapping relationship with the outbound port information of the first virtual forwarding device; and a sending unit, configured to send a second routing entry to the first physical forwarding device, where a match field of the second routing entry carries the network address, and an action field of the second routing entry carries the outbound port information of the first physical forwarding device.

With reference to the fourth possible implementation manner of the fourth aspect, in a fifth possible implementation manner of the fourth aspect, if the second allocating unit allocates the virtual network identifier to the virtual network, the match field of the second routing entry further carries the virtual network identifier.

With reference to the second possible implementation manner of the fourth aspect or the third possible implementation manner of the fourth aspect, in a sixth possible implementation manner of the fourth aspect, the SDN controller further includes:

a second obtaining unit, configured to: after the registering unit registers the first virtual forwarding device with the virtual SDN controller, obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device;

a second converting unit, configured to: determine, based on the first virtual forwarding device and the device mapping relationship, the first physical forwarding device that has the mapping relationship with the first virtual forwarding device; determine, based on the port mapping relationship and the outbound port information of the first virtual forwarding device, the outbound port information of the first physical forwarding device that has the mapping relationship with the outbound port information of the first virtual forwarding device; and determine, based on the port mapping relationship and the inbound port information of the first virtual forwarding device, the inbound port information of the first physical forwarding device that has the mapping relationship with the inbound port information of the first virtual forwarding device; and a sending unit, configured to send a fourth routing entry to the first physical forwarding device, where a match field of the fourth routing entry carries the inbound port information of the first physical forwarding device, and an action field of the fourth routing entry carries the outbound port information of the first physical forwarding device.

With reference to the second possible implementation manner of the fourth aspect or the third possible implementation manner of the fourth aspect, in a seventh possible implementation manner of the fourth aspect, the SDN controller further includes:

a third obtaining unit, configured to: after the registering unit registers the first virtual forwarding device with the virtual SDN controller, receive a first control message reported by the first physical forwarding device, where a match field of the first control message carries the inbound port information of the first physical forwarding device;

a third converting unit, configured to determine, based on the port mapping relationship and the inbound port information of the first physical forwarding device, the inbound port information of the first virtual forwarding device that has the mapping relationship with the inbound port information of the first physical forwarding device; and a sending unit, configured to send a second control message to the virtual SDN controller by using the first virtual forwarding device, where a match field of the second control message carries the inbound port information of the first virtual forwarding device.

With reference to the fourth possible implementation manner of the fourth aspect or the fifth possible implementation manner of the fourth aspect or the sixth possible implementation manner of the fourth aspect, in an eighth possible implementation manner of the fourth aspect, the SDN controller further includes:

a saving unit, configured to: if the first obtaining unit obtains, by using the first virtual forwarding device, the first routing entry delivered by the virtual SDN controller, save the first routing entry; and if the second obtaining unit obtains, by using the first virtual forwarding device, the third routing entry delivered by the virtual SDN controller, save the third routing entry.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect or the seventh possible implementation manner of the fourth aspect or the eighth possible implementation manner of the fourth aspect, in a ninth possible implementation manner of the fourth aspect, the SDN controller further includes:

a third allocating unit, configured to separately allocate a device identifier to the first virtual forwarding device and the second virtual forwarding device after the creating unit creates the virtual network;

where the mapping relationship between the first virtual forwarding device and the first physical forwarding device in the physical network includes a mapping relationship between the device identifier of the first virtual forwarding device and a device identifier of the first physical forwarding device; and where the mapping relationship between the second virtual forwarding device and the second physical forwarding device in the physical network includes a mapping relationship between the device identifier of the second virtual forwarding device and a device identifier of the second physical forwarding device.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect or the seventh possible implementation manner of the fourth aspect or the eighth possible implementation manner of the fourth aspect or the ninth possible implementation manner of the fourth aspect, in a tenth possible implementation manner of the fourth aspect, the virtual network creation request further carries link attribute information; and the mapping unit is further configured to establish a mapping relationship between a virtual link and a link tunnel after the creating unit creates the virtual network, where the link tunnel complies with a constraint of the link attribute information, where the virtual link is a virtual link between the first virtual forwarding device and the second virtual forwarding device, and the link tunnel is a link tunnel between the first physical forwarding device and the second physical forwarding device.

With reference to the tenth possible implementation manner of the fourth aspect, in an eleventh possible implementation manner of the fourth aspect, the link attribute information includes at least one piece of the following information: link bandwidth information, link delay information, link packet loss ratio information, and link jitter information.

With reference to the tenth possible implementation manner of the fourth aspect or the eleventh possible implementation manner of the fourth aspect, in a twelfth possible implementation manner of the fourth aspect, information used to describe the virtual link includes: the device identifier of the first virtual forwarding device, a port identifier of a link source port in the first virtual forwarding device, the device identifier of the second virtual forwarding device, and a port identifier of a link destination port in the second virtual forwarding device.

A fifth aspect of an embodiment of the present invention provides a software defined network SDN controller, including:

a first obtaining unit, configured to obtain, by using a first virtual forwarding device, a first routing entry delivered by a virtual SDN controller, where an action field of the first routing entry carries outbound port information of the first virtual forwarding device, and the first virtual forwarding device is registered with the virtual SDN controller;

a first converting unit, configured to: determine, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determine, based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and a sending unit, configured to send a second routing entry to the first physical forwarding device, where a match field of the second routing entry carries the network address, and an action field of the second routing entry carries the outbound port information of the first physical forwarding device.

With reference to the fifth aspect, in a first possible implementation manner of the fifth aspect, the outbound port information of the first virtual forwarding device includes a port identifier of an outbound port of the first virtual forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the fifth aspect or the first possible implementation manner of the fifth aspect, in a second possible implementation manner of the fifth aspect, a match field of the first routing entry carries a network address, where the network address is a destination address and/or a source address, and the match field of the second routing entry carries the network address.

With reference to the fifth aspect or the first possible implementation manner of the fifth aspect or the second possible implementation manner of the fifth aspect, in a third possible implementation manner of the fifth aspect, the match field of the second routing entry carries a virtual network of a virtual network to which the first virtual forwarding device belongs.

With reference to the fifth aspect or the first possible implementation manner of the fifth aspect or the second possible implementation manner of the fifth aspect, in a fourth possible implementation manner of the fifth aspect, the match field of the first routing entry carries inbound port information of the first virtual forwarding device; and the SDN controller further includes:

a second converting unit, configured to determine, based on the port mapping relationship and the inbound port information of the first virtual forwarding device, inbound port information of the first physical forwarding device that has a mapping relationship with the inbound port information of the first virtual forwarding device, where the port mapping relationship further includes the mapping relationship between the inbound port information of the first virtual forwarding device and the inbound port information of the first physical forwarding device;

where the match field of the second routing entry carries the inbound port information of the first physical forwarding device.

A sixth aspect of an embodiment of the present invention provides a software defined network SDN controller, including:

a third obtaining unit, configured to receive a third control message reported by a first physical forwarding device in a physical network, where a match field of the third control message carries inbound port information of the first physical forwarding device;

a third converting unit, configured to determine, based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and a sending unit, configured to send a fourth control message to a virtual SDN controller by using the first virtual forwarding device, where a match field of the fourth control message carries the inbound port information of the first virtual forwarding device, and the first virtual forwarding device is registered with the virtual SDN controller.

With reference to the sixth aspect, in a first possible implementation manner of the sixth aspect, the inbound port information of the first virtual forwarding device includes a port identifier of an inbound port of the first virtual forwarding device; and the inbound port information of the first physical forwarding device includes a port identifier of an inbound port of the first physical forwarding device, or the inbound port information of the first physical forwarding device includes a port identifier and an inbound port label of an inbound port of the first physical forwarding device.

A seventh aspect of an embodiment of the present invention provides a software defined network SDN controller, including: at least one bus, at least one processor connected to the bus, and at least one memory connected to the bus.

By invoking, by using the bus, code stored in the memory, the processor is configured to: receive a virtual network creation request that carries virtual network topology information; create a virtual network in response to the virtual network creation request, where the virtual network has a topology described by the virtual network topology information, and the virtual network includes a first virtual forwarding device and a second virtual forwarding device; establish a device mapping relationship, where the device mapping relationship includes a mapping relationship between the first virtual forwarding device and a first physical forwarding device in a physical network, and a mapping relationship between the second virtual forwarding device and a second physical forwarding device in the physical network; establish a port mapping relationship, where the port mapping relationship includes a mapping relationship between a port of the first virtual forwarding device and a port of the first physical forwarding device, and a mapping relationship between a port of the second virtual forwarding device and a port of the second physical forwarding device; allocate a virtual SDN controller to the virtual network; and register the first virtual forwarding device and the second virtual forwarding device with the virtual SDN controller.

With reference to the seventh aspect, in a first possible implementation manner of the seventh aspect, after the processor creates the virtual network, the processor is further configured to: allocate a virtual network identifier to the virtual network; and establish a mapping relationship between the virtual network identifier and an identifier of the virtual SDN controller.

With reference to the seventh aspect or the first possible implementation manner of the seventh aspect, in a second possible implementation manner of the seventh aspect, the mapping relationship between the port of the first virtual forwarding device and the port of the first physical forwarding device includes at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

With reference to the second possible implementation manner of the seventh aspect, in a third possible implementation manner of the seventh aspect, the inbound port information of the first virtual forwarding device includes a port identifier of an inbound port of the first virtual forwarding device, and the outbound port information of the first virtual forwarding device includes a port identifier of an outbound port of the first virtual forwarding device;

the inbound port information of the first physical forwarding device includes a port identifier of an inbound port of the first physical forwarding device, or the inbound port information of the first physical forwarding device includes a port identifier and an inbound port label of an inbound port of the first physical forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the second possible implementation manner of the seventh aspect or the third possible implementation manner of the seventh aspect, in a fourth possible implementation manner of the seventh aspect, after the processor registers the first virtual forwarding device with the virtual SDN controller, the processor is further configured to: obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device; determine, based on the first virtual forwarding device and the device mapping relationship, the first physical forwarding device that has the mapping relationship with the first virtual forwarding device; and determine, based on the port mapping relationship and the outbound port information of the first virtual forwarding device, the outbound port information of the first physical forwarding device that has the mapping relationship with the outbound port information of the first virtual forwarding device; and send a second routing entry to the first physical forwarding device, where a match field of the second routing entry carries the network address, and an action field of the second routing entry carries the outbound port information of the first physical forwarding device.

With reference to the fourth possible implementation manner of the seventh aspect, in a fifth possible implementation manner of the seventh aspect, if the processor allocates the virtual network identifier to the virtual network, the match field of the second routing entry further carries the virtual network identifier.

With reference to the second possible implementation manner of the seventh aspect or the third possible implementation manner of the seventh aspect, in a sixth possible implementation manner of the seventh aspect, after the processor registers the first virtual forwarding device with the virtual SDN controller, the processor is further configured to: obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device; determine, based on the first virtual forwarding device and the device mapping relationship, the first physical forwarding device that has the mapping relationship with the first virtual forwarding device; determine, based on the port mapping relationship and the outbound port information of the first virtual forwarding device, the outbound port information of the first physical forwarding device that has the mapping relationship with the outbound port information of the first virtual forwarding device; determine, based on the port mapping relationship and the inbound port information of the first virtual forwarding device, the inbound port information of the first physical forwarding device that has the mapping relationship with the inbound port information of the first virtual forwarding device; and send a fourth routing entry to the first physical forwarding device, where a match field of the fourth routing entry carries the inbound port information of the first physical forwarding device, and an action field of the fourth routing entry carries the outbound port information of the first physical forwarding device.

With reference to the second possible implementation manner of the seventh aspect or the third possible implementation manner of the seventh aspect, in a seventh possible implementation manner of the seventh aspect, after the processor registers the first virtual forwarding device with the virtual SDN controller, the processor is further configured to: receive a first control message reported by the first physical forwarding device, where a match field of the first control message carries the inbound port information of the first physical forwarding device; determine, based on the port mapping relationship and the inbound port information of the first physical forwarding device, the inbound port information of the first virtual forwarding device that has the mapping relationship with the inbound port information of the first physical forwarding device; and send a second control message to the virtual SDN controller by using the first virtual forwarding device, where a match field of the second control message carries the inbound port information of the first virtual forwarding device.

With reference to the fourth possible implementation manner of the seventh aspect or the fifth possible implementation manner of the seventh aspect or the sixth possible implementation manner of the seventh aspect, in an eighth possible implementation manner of the seventh aspect, the processor is further configured to: if the first routing entry delivered by the virtual SDN controller is obtained by using the first virtual forwarding device, save the first routing entry; and if the third routing entry delivered by the virtual SDN controller is obtained by using the first virtual forwarding device, save the third routing entry.

With reference to the seventh aspect or the first possible implementation manner of the seventh aspect or the second possible implementation manner of the seventh aspect or the third possible implementation manner of the seventh aspect or the fourth possible implementation manner of the seventh aspect or the fifth possible implementation manner of the seventh aspect or the sixth possible implementation manner of the seventh aspect or the seventh possible implementation manner of the seventh aspect or the eighth possible implementation manner of the seventh aspect, in a ninth possible implementation manner of the seventh aspect, after the processor creates the virtual network, the processor is further configured to: separately allocate a device identifier to the first virtual forwarding device and the second virtual forwarding device; where the mapping relationship between the first virtual forwarding device and the first physical forwarding device in the physical network includes a mapping relationship between the device identifier of the first virtual forwarding device and a device identifier of the first physical forwarding device; and where the mapping relationship between the second virtual forwarding device and the second physical forwarding device in the physical network includes a mapping relationship between the device identifier of the second virtual forwarding device and a device identifier of the second physical forwarding device.

With reference to the seventh aspect or the first possible implementation manner of the seventh aspect or the second possible implementation manner of the seventh aspect or the third possible implementation manner of the seventh aspect or the fourth possible implementation manner of the seventh aspect or the fifth possible implementation manner of the seventh aspect or the sixth possible implementation manner of the seventh aspect or the seventh possible implementation manner of the seventh aspect or the eighth possible implementation manner of the seventh aspect or the ninth possible implementation manner of the seventh aspect, in a tenth possible implementation manner of the seventh aspect, the virtual network creation request further carries link attribute information, and after the processor creates the virtual network, the processor is further configured to: establish a mapping relationship between a virtual link and a link tunnel, where the link tunnel complies with a constraint of the link attribute information, where the virtual link is a virtual link between the first virtual forwarding device and the second virtual forwarding device, and the link tunnel is a link tunnel between the first physical forwarding device and the second physical forwarding device.

With reference to the tenth possible implementation manner of the seventh aspect, in an eleventh possible implementation manner of the seventh aspect, the link attribute information includes at least one piece of the following information:

link bandwidth information, link delay information, link packet loss ratio information, and link jitter information.

With reference to the tenth possible implementation manner of the seventh aspect or the eleventh possible implementation manner of the seventh aspect, in a twelfth possible implementation manner of the seventh aspect, information used to describe the virtual link includes: the device identifier of the first virtual forwarding device, a port identifier of a link source port in the first virtual forwarding device, the device identifier of the second virtual forwarding device, and a port identifier of a link destination port in the second virtual forwarding device.

An eighth aspect of an embodiment of the present invention provides a software defined network SDN controller, including: at least one bus, at least one processor connected to the bus, and at least one memory connected to the bus.

By invoking, by using the bus, code stored in the memory, the processor is configured to: obtain, by using a first virtual forwarding device, a first routing entry delivered by a virtual SDN controller, where an action field of the first routing entry carries outbound port information of the first virtual forwarding device, and the first virtual forwarding device is registered with the virtual SDN controller; determine, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determine, based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and send a second routing entry to the first physical forwarding device, where an action field of the second routing entry carries the outbound port information of the first physical forwarding device.

With reference to the eighth aspect, in a first possible implementation manner of the eighth aspect, the outbound port information of the first virtual forwarding device includes a port identifier of an outbound port of the first virtual forwarding device; and the outbound port information of the first physical forwarding device includes a port identifier of an outbound port of the first physical forwarding device, or the outbound port information of the first physical forwarding device includes a port identifier and an outbound port label of an outbound port of the first physical forwarding device.

With reference to the eighth aspect or the first possible implementation manner of the eighth aspect, in a second possible implementation manner of the eighth aspect, a match field of the first routing entry carries a network address, where the network address is a destination address and/or a source address, and a match field of the second routing entry carries the network address.

With reference to the eighth aspect or the first possible implementation manner of the eighth aspect or the second possible implementation manner of the eighth aspect, in a third possible implementation manner of the eighth aspect, the match field of the second routing entry carries a virtual network of a virtual network to which the first virtual forwarding device belongs.

With reference to the eighth aspect or the first possible implementation manner of the eighth aspect or the second possible implementation manner of the eighth aspect, in a fourth possible implementation manner of the eighth aspect, the match field of the first routing entry carries inbound port information of the first virtual forwarding device; and the processor is further configured to determine, based on the port mapping relationship and the inbound port information of the first virtual forwarding device, inbound port information of the first physical forwarding device that has a mapping relationship with the inbound port information of the first virtual forwarding device, where the port mapping relationship further includes the mapping relationship between the inbound port information of the first virtual forwarding device and the inbound port information of the first physical forwarding device;

where the match field of the second routing entry carries the inbound port information of the first physical forwarding device.

A ninth aspect of an embodiment of the present invention provides a software defined network SDN controller, including: at least one bus, at least one processor connected to the bus, and at least one memory connected to the bus.

By invoking, by using the bus, code stored in the memory, the processor is configured to: receive a third control message reported by a first physical forwarding device in a physical network, where a match field of the third control message carries inbound port information of the first physical forwarding device; determine, based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and send a fourth control message to a virtual SDN controller by using the first virtual forwarding device, where a match field of the fourth control message carries the inbound port information of the first virtual forwarding device, and the first virtual forwarding device is registered with the virtual SDN controller.

With reference to the ninth aspect, in a first possible implementation manner of the ninth aspect, the inbound port information of the first virtual forwarding device includes a port identifier of an inbound port of the first virtual forwarding device; and the inbound port information of the first physical forwarding device includes a port identifier of an inbound port of the first physical forwarding device, or the inbound port information of the first physical forwarding device includes a port identifier and an inbound port label of an inbound port of the first physical forwarding device.

A tenth aspect of the present invention provides a communications system, which may include:

a first physical forwarding device, a second physical forwarding device, and the SDN controller according to any one of embodiments of the present invention.

An eleventh aspect of the present invention provides a communications system, including a first physical forwarding device and the SDN controller according to any one of embodiments of the present invention.

As may be seen above, in some feasible implementation manners of the present invention, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by the embodiments greatly improves service networking flexibility, and helps reduce service costs and shorten a service deployment period. In addition, after the virtual network is created, an SDN controller establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN, introduction of the virtual SDN controller and SDN controller helps simplify service configuration, and helps further reduce the service costs and shorten the service deployment period.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-*a* to FIG. 1-*d* are schematic diagrams of several network architectures according to an embodiment of the present invention;

FIG. 5-*a* is a schematic flowchart of another method for implementing network virtualization according to an embodiment of the present invention;

FIG. 5-*b* and FIG. 5-*c* are schematic architecture diagrams of two virtual networks according to an embodiment of the present invention;

FIG. 6 is a schematic flowchart of another method for implementing network virtualization according to an embodiment of the present invention;

FIG. 10-*a* to FIG. 10-*e* are schematic diagrams of several SDN controllers according to an embodiment of the present invention;

FIG. 11 is a schematic diagram of another SDN controller according to an embodiment of the present invention;

FIG. 12 is a schematic diagram of another SDN controller according to an embodiment of the present invention;

FIG. 13-*a* and FIG. 13-*b* are schematic diagrams of two SDN controllers according to an embodiment of the present invention;

FIG. 14 to FIG. 18 are schematic diagrams of another several SDN controllers according to embodiments of the present invention.

DESCRIPTION OF EMBODIMENTS

Figure 2:
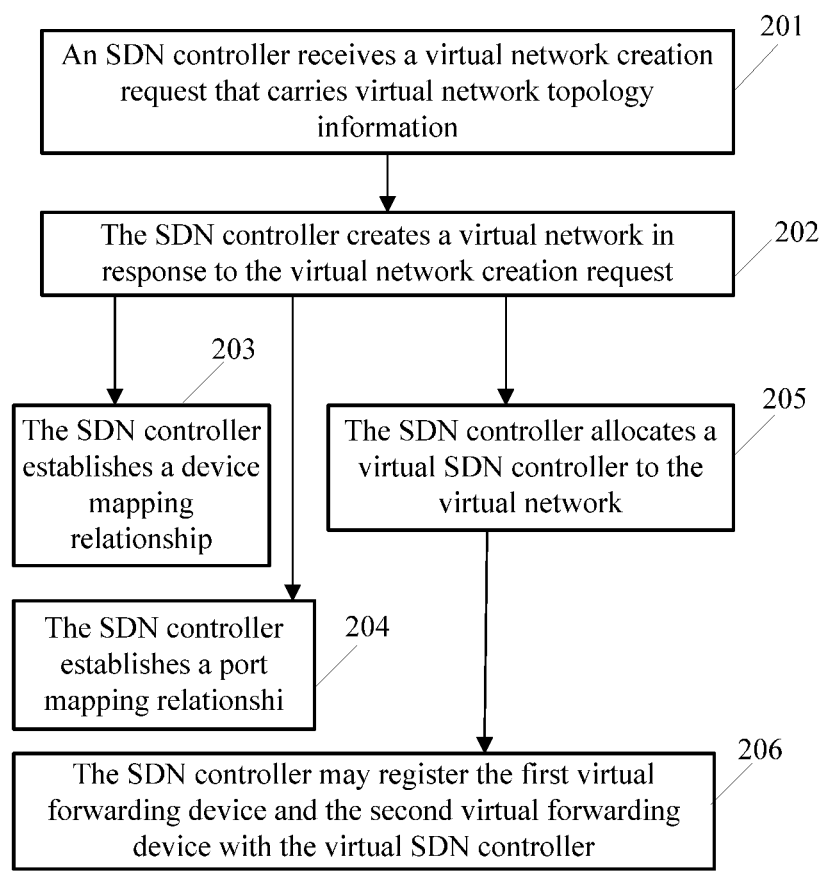
FIG. 2 is a schematic flowchart of a method for implementing network virtualization according to an embodiment of the present invention.

Embodiments of the present invention provide a method for implementing network virtualization, and a related apparatus and a communications system to improve service networking flexibility, reduce service costs, and shorten a service deployment period.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

The present invention is hereinafter described in detail with reference to specific embodiments.

In the specification, claims, and accompanying drawings of the present invention, the terms "first", "second", "third", "fourth", and the like are intended to distinguish different objects but do not necessarily indicate a specific order. In addition, the terms "including", "having", and any other variant thereof, are intended to cover a non-exclusive inclusion. For example, a process, method, system, product, or device that includes a series of steps or units is not limited to the listed steps or units, but may optionally include other steps or units that are not listed, or optionally include other steps or units that are inherent to the process, method, product, or device.

The following first briefly describes an OpenFlow mechanism.

An OpenFlow (OpenFlow) technology is first put forward by Stanford University, and aims to solve, based on a Transmission Control Protocol/Internet Protocol (TCP/IP, Transmission Control Protocol/Internet Protocol) technology by using an innovative network interconnection concept, various bottleneck problems that occur in a current network with new services. A core idea of the OpenFlow technology is to convert a data packet forwarding process that is completely controlled by a switch/router into an independent process that is separately completed by an OpenFlow switch (OpenFlow Switch) and a software defined network (SDN, Software Defined Network) controller (Controller).

In an SDN architecture, the SDN controller determines transmission paths of all packets in a network. The OpenFlow switch maintains at least one forwarding table locally. The OpenFlow switch receives a packet to be forwarded, and if a routing entry that matches the packet to be forwarded is found in the forwarding table, performs forwarding processing based on the matched routing entry. If no routing entry that matches the packet to be forwarded is found in the forwarding table, the OpenFlow switch sends the packet to the SDN controller for transmission path confirmation. The SDN controller transmits a new routing entry to the OpenFlow switch, and the OpenFlow switch performs packet forwarding according to the new routing entry delivered by the SDN controller. This mechanism means that devices in an SDN can be deployed in a distributed manner, and managed and controlled in a centralized manner, so that the network becomes in a software defined form. The SDN controller may provide a programmable interface, so that a network user may decide how to route a packet, and how to implement load balancing or how to perform access control, and the like. Therefore, a new routing protocol or security algorithm is deployed in the network, which always requires writing of only hundreds of rows of code on the SDN controller, and its openness helps accelerate fast development and deployment of a new network application.

First, refer to FIG. 1-*a* to FIG. 1-*d*, which are schematic diagrams of several network architectures according to an embodiment of the present invention. The technical solutions of this embodiment of the present invention may be specifically implemented in the network architectures shown in FIG. 1-*a* to FIG. 1-*d* or variants thereof.

In the network architectures shown in FIG. 1-*a* to FIG. 1-*d*, a physical forwarding device (such as a physical switch or a physical router) in a physical network is communicatively connected to an SDN controller. At least one virtual network may be created in the SDN controller. Each virtual network may be allocated one virtual SDN controller, and each virtual network may include at least two virtual forwarding devices (such as a virtual switch or a virtual router). The virtual forwarding devices are software instances. The virtual SDN controller may be integrated in the SDN controller (for example, as shown in FIG. 1-*b* and FIG. 1-*c*, FIG. 1-*b* illustrates that all virtual SDN controllers are integrated in the SDN controller, and FIG. 1-*c* illustrates that some virtual SDN controllers may be integrated in the SDN controller, and other virtual SDN controllers may not be integrated in the SDN controller), and the virtual SDN controller may also be a device independent of the SDN controller (as shown in FIG. 1-*d*). For example, the virtual SDN controller may be a server, a virtual machine, or a software instance.

A virtual network client may send a virtual network creation request that carries virtual network topology information to the SDN controller by using a northbound interface, so as to request the SDN controller to create a virtual network having a topology described by the network topology information. The virtual network client may also be referred to as a virtual network service front-end interface or an operator front-end interface.

In an embodiment of a method for implementing network virtualization according to the present invention, a method for implementing network virtualization may include: receiving, by an SDN controller, a virtual network creation request that carries virtual network topology information; creating a virtual network in response to the virtual network creation request, where the virtual network has a topology described by the virtual network topology information, and the virtual network includes a first virtual forwarding device and a second virtual forwarding device; establishing a device mapping relationship, where the device mapping relationship includes a mapping relationship between the first virtual forwarding device and a first physical forwarding device in a physical network, and a mapping relationship between the second virtual forwarding device and a second physical forwarding device in the physical network; establishing a port mapping relationship, where the port mapping relationship includes a mapping relationship between a port of the first virtual forwarding device and a port of the first physical forwarding device, and a mapping relationship between a port of the second virtual forwarding device and a port of the second physical forwarding device; allocating a virtual SDN controller to the virtual network; and registering the first virtual forwarding device and the second virtual forwarding device with the virtual SDN controller.

Referring to FIG. 2, FIG. 2 is a schematic flowchart of a method for implementing network virtualization according to an embodiment of the present invention. As shown in FIG. 2, the method for implementing network virtualization according to this embodiment of the present invention may include the following content:

201. An SDN controller receives a virtual network creation request that carries virtual network topology information.

For example, when a user needs to create a virtual network of a topology, the user may send a virtual network creation request that carries virtual network topology information to an SDN controller by using a virtual network client, so as to request the SDN controller to create a virtual network that has a topology described by the virtual network topology information.

202. The SDN controller creates a virtual network in response to the virtual network creation request.

The virtual network has the topology described by the virtual network topology information, and the virtual network includes a first virtual forwarding device and a second virtual forwarding device. In some extreme cases, the virtual network may also include only one virtual forwarding device.

Certainly, the virtual network may optionally further include other virtual forwarding devices. For example, the virtual network may optionally further include a third virtual forwarding device, a fourth virtual forwarding device, and the like. Each virtual forwarding device in the virtual network is a software instance. The virtual forwarding device may simulate a behavior mode of a physical forwarding device externally.

203. The SDN controller establishes a device mapping relationship.

The device mapping relationship includes a mapping relationship between the first virtual forwarding device and a first physical forwarding device in a physical network, and a mapping relationship between the second virtual forwarding device and a second physical forwarding device in the physical network.

In some embodiments of the present invention, the mapping relationship between the first virtual forwarding device and the first physical forwarding device may be established by generating a mapping relationship record that records device identifiers of the first virtual forwarding device and the first physical forwarding device. Likewise, the mapping relationship between the second virtual forwarding device and the second physical forwarding device may be established by generating a mapping relationship record that records device identifiers of the second virtual forwarding device and the second physical forwarding device. Manners of establishing mapping relationships between other virtual forwarding devices and other physical forwarding devices may be similar. Certainly, the device mapping relationship may also be established in other manners.

The first physical forwarding device may be a physical forwarding device or may also be a physical forwarding device group including multiple physical forwarding devices. Likewise, the second physical forwarding device may be a physical forwarding device or may also be a physical forwarding device group including multiple physical forwarding devices. For example, assuming that the first physical forwarding device is a router A, establishing the mapping relationship between the first virtual forwarding device and the first physical forwarding device includes: establishing a mapping relationship between the router A and the first virtual forwarding device. For another example, assuming that the first physical forwarding device is a physical forwarding device group including the router A and a router B, establishing the mapping relationship between the first virtual forwarding device and the first physical forwarding device includes: establishing a mapping relationship between the physical forwarding device group including the router A and router B, and the first virtual forwarding device. Other cases are similar to the foregoing case.

It can be understood that different virtual forwarding devices in different virtual networks may have a mapping relationship with a same physical forwarding device.

204. The SDN controller establishes a port mapping relationship.

The port mapping relationship includes a mapping relationship between a port of the first virtual forwarding device and a port of the first physical forwarding device, and a mapping relationship between a port of the second virtual forwarding device and a port of the second physical forwarding device.

205. The SDN controller allocates a virtual SDN controller to the virtual network.

In some embodiments of the present invention, the SDN controller may allocate different SDN controllers to different virtual networks, that is, the virtual SDN controller and the virtual network may be in a one-to-one correspondence. In some scenarios, the SDN controller may also allocate a same virtual SDN controller to at least two virtual networks.

The virtual SDN controller may be integrated in the SDN controller. The virtual SDN controller may also be a device independent of the SDN controller. For example, the virtual SDN controller may be a server, a virtual machine, or a software instance.

206. The SDN controller may register the first virtual forwarding device and the second virtual forwarding device with the virtual SDN controller.

The SDN controller may register virtual forwarding devices including the first virtual forwarding device and the second virtual forwarding device in the virtual network with the virtual SDN controller. By registering the virtual forwarding devices with the virtual SDN controller, control channels may be established between the virtual SDN controller and the virtual forwarding devices. The virtual SDN controller may deliver control information such as a routing entry to the virtual forwarding devices based on the control channels, and the virtual SDN controller may further use the control channels to discover the topology of the virtual network based on a topology discovery protocol. The virtual forwarding devices may use the control channels to report a virtual device power-on/power-off event, a port activation/deactivation event, a link activation/deactivation event, and the like to the virtual SDN controller.

It can be understood that no definite sequence exists between steps 203 and 204, and step 205.

It can be understood that no definite sequence exists between steps 203 and 204 and step 206.

As may be seen above, in this embodiment, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by this embodiment has great improvements in manners such as service networking flexibility, and helps reduce service costs and shorten a service deployment period. In addition, after the virtual network is created, an SDN controller establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN mechanism, introduction of the virtual SDN controller and SDN controller helps simplify service configuration, and also helps reduce the service costs and shorten the service deployment period.

In some embodiments of the present invention, after the virtual network is created, the SDN controller may optionally further allocate a virtual network identifier to the virtual network. The SDN controller may optionally further establish a mapping relationship between the virtual network identifier and an identifier of the virtual SDN controller.

In some embodiments of the present invention, after the virtual network is created, the SDN controller may optionally further separately allocate a device identifier to the first virtual forwarding device and the second virtual forwarding device (certainly the SDN controller may optionally further separately allocate a device identifier to other virtual forwarding devices in the virtual network). The mapping relationship between the first virtual forwarding device and the first physical forwarding device in the physical network may include a mapping relationship between the device identifier of the first virtual forwarding device and a device identifier of the first physical forwarding device. The mapping relationship between the second virtual forwarding device and the second physical forwarding device in the physical network may include a mapping relationship between the device identifier of the second virtual forwarding device and a device identifier of the second physical forwarding device. It can be understood that mapping relationships between other virtual forwarding devices (if any) and other physical forwarding devices (if any) are inferred by analogy.

In some embodiments of the present invention, optionally, the virtual network creation request may further carry link attribute information and the like, and after the virtual network is created, the SDN controller may optionally further establish a mapping relationship between a first virtual link and a first link tunnel, where the first link tunnel complies with a constraint of the link attribute information, where the first virtual link is a virtual link between the first virtual forwarding device and the second virtual forwarding device, and the first link tunnel is a link tunnel between the first physical forwarding device and the second physical forwarding device. In some embodiments of the present invention, the link attribute information includes at least one piece of the following information: link bandwidth information, link delay information, link packet loss ratio information, link jitter information, and the like.

In some embodiments of the present invention, an information group used to describe the first virtual link may include: the device identifier of the first virtual forwarding device (namely, a source virtual forwarding device), a port identifier of a link source port in the first virtual forwarding device, the device identifier of the second virtual forwarding device (namely, a destination virtual forwarding device), and a port identifier of a link destination port in the second virtual forwarding device.

In some embodiments of the present invention, the mapping relationship between the port of the first virtual forwarding device and the port of the first physical forwarding device may include at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

Similarly, the mapping relationship between the port of the second virtual forwarding device and the port of the second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an outbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an outbound port label of a first outbound port of the second physical forwarding device).

The physical forwarding device in the embodiments of the present invention may be a device having a packet forwarding function, such as a physical router or a physical switch, where the virtual forwarding device may be a virtual router or a virtual switch.

For example, after the SDN controller registers the first virtual forwarding device with the virtual SDN controller, the SDN controller may optionally further obtain, by using the first virtual forwarding device, a first routing entry delivered by the virtual SDN controller, where an action field of the first routing entry carries the outbound port information of the first virtual forwarding device; the SDN controller determines, based on the first virtual forwarding device and the device mapping relationship, the first physical forwarding device that has the mapping relationship with the first virtual forwarding device; the SDN controller determines, based on the port mapping relationship and the outbound port information of the first virtual forwarding device, the outbound port information of the first physical forwarding device that has the mapping relationship with the outbound port information of the first virtual forwarding device; and the SDN controller sends a second routing entry to the first physical forwarding device, where an action field of the second routing entry carries the outbound port information of the first physical forwarding device. The SDN controller may, for example, obtain the second routing entry by conversion based on the first routing entry. For example, the SDN controller may obtain the second routing entry by replacing the outbound port information of the first virtual forwarding device, which is carried in the action field of the first routing entry, with the outbound port information of the first physical forwarding device. Optionally, if the SDN controller allocates the virtual network identifier to the virtual network, a match field of the second routing entry may further carry the virtual network identifier.

For another example, after the SDN controller registers the first virtual forwarding device with the virtual SDN controller, the SDN controller may optionally further obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device; the SDN controller determines, based on the first virtual forwarding device and the device mapping relationship, the first physical forwarding device that has the mapping relationship with the first virtual forwarding device; the SDN controller determines, based on the port mapping relationship and the outbound port information of the first virtual forwarding device, the outbound port information of the first physical forwarding device that has the mapping relationship with the outbound port information of the first virtual forwarding device; and the SDN controller sends a second routing entry to the first physical forwarding device, where a match field of the second routing entry carries the network address, where the network address is a destination address and/or a source address, and an action field of the second routing entry carries the outbound port information of the first physical forwarding device. The SDN controller may, for example, obtain the second routing entry by conversion based on the first routing entry. For example, the SDN controller may obtain the second routing entry by replacing the outbound port information of the first virtual forwarding device, which is carried in the action field of the first routing entry, with the outbound port information of the first physical forwarding device. Optionally, if the SDN controller allocates the virtual network identifier to the virtual network, the match field of the second routing entry may further carry the virtual network identifier.

For another example, after the SDN controller registers the first virtual forwarding device with the virtual SDN controller, the SDN controller may optionally further obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device; the SDN controller determines, based on the first virtual forwarding device and the device mapping relationship, the first physical forwarding device that has the mapping relationship with the first virtual forwarding device; the SDN controller determines, based on the port mapping relationship and the outbound port information of the first virtual forwarding device, the outbound port information of the first physical forwarding device that has the mapping relationship with the outbound port information of the first virtual forwarding device; the SDN controller determines, based on the port mapping relationship and the inbound port information of the first virtual forwarding device, the inbound port information of the first physical forwarding device that has the mapping relationship with the inbound port information of the first virtual forwarding device; and the SDN controller sends a fourth routing entry to the first physical forwarding device, where a match field of the fourth routing entry carries the inbound port information of the first physical forwarding device, and an action field of the fourth routing entry carries the outbound port information of the first physical forwarding device. The SDN controller may, for example, obtain the fourth routing entry by conversion based on the third routing entry. For example, the SDN controller may obtain the fourth routing entry by replacing the inbound port information of the first virtual forwarding device, which is carried in the match field of the third routing entry, with the inbound port information of the first physical forwarding device, and replacing the outbound port information of the first virtual forwarding device, which is carried in the action field of the third routing entry, with the outbound port information of the first physical forwarding device.

For another example, after the SDN controller registers the first virtual forwarding device with the virtual SDN controller, the SDN controller may optionally further receive a first control message reported by the first physical forwarding device, where a match field of the first control message carries the inbound port information of the first physical forwarding device; the SDN controller determines, based on the first physical forwarding device and the device mapping relationship, the first virtual forwarding device that has the mapping relationship with the first physical forwarding device; the SDN controller determines, based on the port mapping relationship and the inbound port information of the first physical forwarding device, the inbound port information of the first virtual forwarding device that has the mapping relationship with the inbound port information of the first physical forwarding device; and the SDN controller sends a second control message to the virtual SDN controller by using the first virtual forwarding device, where a match field of the second control message may carry the inbound port information of the first virtual forwarding device. The SDN controller may obtain the second control message by conversion based on the first control message. For example, the SDN controller may obtain the second control message by replacing the inbound port information of the first physical forwarding device, which is carried in the match field of the first control message, with the inbound port information of the first virtual forwarding device.

For another example, after the SDN controller registers the first virtual forwarding device with the virtual SDN controller, the SDN controller may optionally further receive a third control message reported by the first physical forwarding device, where a match field of the third control message may carry a virtual network identifier of a virtual network to which the first virtual forwarding device belongs; the SDN controller determines, based on the virtual network identifier, the first physical forwarding device, and the device mapping relationship, the first virtual forwarding device that has the mapping relationship with the first physical forwarding device; and the SDN controller removes the virtual network identifier of the virtual network to which the first virtual forwarding device belongs, which is carried in the match field of the third control message, so as to obtain a fourth control message. The SDN controller sends the fourth control message to the virtual SDN controller by using the first virtual forwarding device.

In some embodiments of the present invention, if the SDN controller obtains, by using the first virtual forwarding device, the first routing entry delivered by the virtual SDN controller, the SDN controller may optionally further save the first routing entry. If the SDN controller obtains, by using the first virtual forwarding device, the third routing entry delivered by the virtual SDN controller, the SDN controller may optionally further save the third routing entry.

Particularly, some control messages may also need to be transferred only between a virtual SDN controller and a virtual forwarding device. It is unnecessary for the SDN controller to forward these control messages to a physical forwarding device that has a mapping relationship with the virtual forwarding device. For example, after a fifth control message sent by the virtual SDN controller is received by using the first virtual forwarding device, the SDN controller may feed back a response message of the fifth control message to the virtual SDN controller by using the first virtual forwarding device. Alternatively, the SDN controller may also send a sixth control message to the virtual SDN controller by using the first virtual forwarding device, and receive, by using the first virtual forwarding device, a response message that is of the sixth control message and is fed back by the virtual SDN controller.

In another embodiment of a method for implementing network virtualization according to the present invention, another method for implementing network virtualization may include: receiving, by an SDN controller by using a first virtual forwarding device, a first routing entry delivered by a virtual SDN controller, where an action field of the first routing entry carries outbound port information of the first virtual forwarding device, and the first virtual forwarding device is registered with the virtual SDN controller; determining, by the SDN controller based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determining, by the SDN controller based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and sending, by the SDN controller, a second routing entry to the first physical forwarding device, where an action field of the second routing entry carries the outbound port information of the first physical forwarding device.

Figure 3:
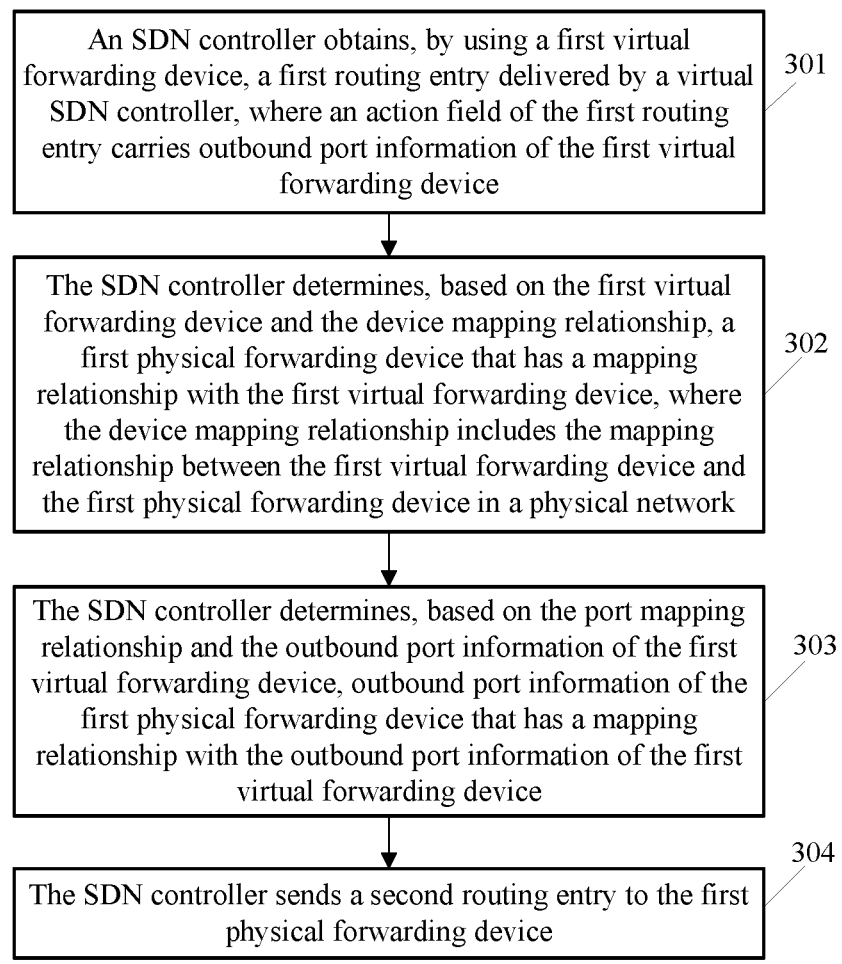
FIG. 3 is a schematic flowchart of another method for implementing network virtualization according to an embodiment of the present invention.

Referring to FIG. 3, FIG. 3 is a schematic flowchart of another method for implementing network virtualization according to another embodiment of the present invention. As shown in FIG. 3, another method for implementing network virtualization according to another embodiment of the present invention may include the following content:

301. An SDN controller obtains, by using a first virtual forwarding device, a first routing entry delivered by a virtual SDN controller, where an action field of the first routing entry carries outbound port information of the first virtual forwarding device.

The first virtual forwarding device is registered with the virtual SDN controller.

In addition, a virtual network to which the first virtual forwarding device belongs may further include a second virtual forwarding device and the like.

302. The SDN controller determines, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network.

303. The SDN controller determines, based on the port mapping relationship and the outbound port information of the first virtual forwarding device, outbound port information of the first physical forwarding device that has a mapping relationship with the outbound port information of the first virtual forwarding device. The port mapping relationship includes the mapping relationship between the outbound port information of the first virtual forwarding device and the outbound port information of the first physical forwarding device.

304. The SDN controller sends a second routing entry to the first physical forwarding device.

An action field of the second routing entry carries the outbound port information of the first physical forwarding device.

In some embodiments of the present invention, the SDN controller may, for example, obtain the second routing entry by conversion based on the first routing entry. For example, the SDN controller may obtain the second routing entry by replacing the outbound port information of the first virtual forwarding device, which is carried in the action field of the first routing entry, with the outbound port information of the first physical forwarding device.

The physical forwarding device in the embodiments of the present invention may be a physical router or a physical switch, which is a device having a packet forwarding function, where the virtual forwarding device may be a virtual router or a virtual switch.

In some embodiments of the present invention, a mapping relationship between a port of the first virtual forwarding device and a port of the first physical forwarding device may include at least one of the following mapping relationships: a mapping relationship between inbound port information of the first virtual forwarding device and inbound port information of the first physical forwarding device; and the mapping relationship between the outbound port information of the first virtual forwarding device and the outbound port information of the first physical forwarding device.

Similarly, a mapping relationship between a port of the second virtual forwarding device and a port of the second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

In some embodiments of the present invention, optionally, a match field of the first routing entry carries a network address, where the network address is a destination address and/or a source address; and a match field of the second routing entry carries the network address.

In some embodiments of the present invention, optionally, the match field of the second routing entry carries a virtual network of the virtual network to which the first virtual forwarding device belongs.

In some other embodiments of the present invention, optionally, the match field of the first routing entry carries the inbound port information of the first virtual forwarding device, and optionally, the SDN controller may further determine, based on the port mapping relationship and the inbound port information of the first virtual forwarding device, the inbound port information of the first physical forwarding device that has the mapping relationship with the inbound port information of the first virtual forwarding device, where the port mapping relationship further includes the mapping relationship between the inbound port information of the first virtual forwarding device and the inbound port information of the first physical forwarding device. The match field of the second routing entry may further carry the inbound port information of the first physical forwarding device.

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps simplify a service configuration, and helps reduce service costs and shorten a service deployment period.

In another embodiment of a method for implementing network virtualization according to the present invention, another method for implementing network virtualization may include: receiving, by an SDN controller, a third control message reported by a first physical forwarding device in a physical network, where a match field of the third control message carries inbound port information of the first physical forwarding device; determining, by the SDN controller based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and sending, by the SDN controller, a fourth control message to a virtual SDN controller by using the first virtual forwarding device, where a match field of the fourth control message carries the inbound port information of the first virtual forwarding device, and the first virtual forwarding device is registered with the virtual SDN controller.

Figure 4:
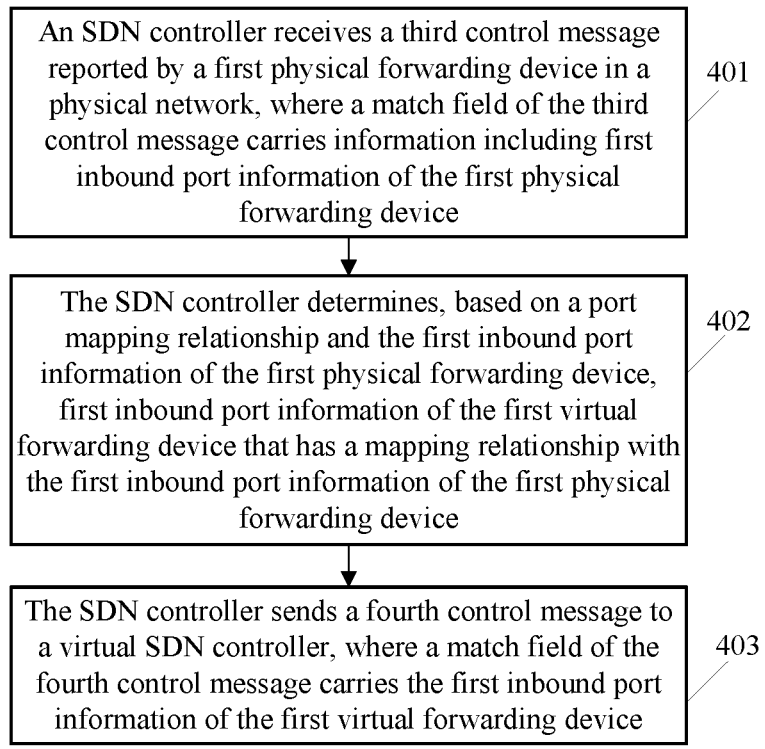
FIG. 4 is a schematic flowchart of another method for implementing network virtualization according to an embodiment of the present invention.

Referring to FIG. 4, FIG. 4 is a schematic flowchart of another method for implementing network virtualization according to another embodiment of the present invention. As shown in FIG. 4, another method for implementing network virtualization according to another embodiment of the present invention may include the following content:

401. An SDN controller receives a third control message reported by a first physical forwarding device in a physical network, where a match field of the third control message carries information including first inbound port information of the first physical forwarding device.

402. The SDN controller determines, based on a port mapping relationship and the first inbound port information of the first physical forwarding device, first inbound port information of a first virtual forwarding device that has a mapping relationship with the first inbound port information of the first physical forwarding device. The port mapping relationship includes a mapping relationship between inbound port information of the first virtual forwarding device and inbound port information of the first physical forwarding device.

In some embodiments of the present invention, the SDN controller may determine, based on the first physical forwarding device and a device mapping relationship, at least one first virtual forwarding device that has a mapping relationship with the first physical forwarding device and includes the first virtual forwarding device (because different virtual forwarding devices in different virtual networks may have a mapping relationship with a same physical forwarding device). The SDN controller determines, based on the port mapping relationship and the first inbound port information of the first physical forwarding device, the first inbound port information of the first virtual forwarding device that has the mapping relationship with the first inbound port information of the first physical forwarding device.

403. The SDN controller sends a fourth control message to a virtual SDN controller, where a match field of the fourth control message carries the first inbound port information of the first virtual forwarding device.

A virtual network in which the first virtual forwarding device is located may further include a second virtual forwarding device; and the first virtual forwarding device and the second virtual forwarding device are registered with the virtual SDN controller.

The physical forwarding device in the embodiments of the present invention may be a physical router or a physical switch, which is a device having a packet forwarding function, where the virtual forwarding device may be a virtual router or a virtual switch.

In some embodiments of the present invention, a mapping relationship between a port of the first virtual forwarding device and a port of the first physical forwarding device may include at least one of the following mapping relationships: the mapping relationship between the inbound port information of the first virtual forwarding device and the inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, the first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, the first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps simplify a service configuration, and helps reduce service costs and shorten a service deployment period.

For better understanding and implementation of the foregoing solutions of the embodiments of the present invention, the following uses some specific application scenarios as examples for description. Implementation of the methods corresponding to FIG. 5-*a* to FIG. 5-*c* in the network architecture shown in any one of FIG. 1-*a* to FIG. 1-*d* is used as an example for description below.

Referring to FIG. 5-*a*, FIG. 5-*a* is a schematic flowchart of another method for implementing network virtualization according to another embodiment of the present invention. As shown in FIG. 5, another method for implementing network virtualization according to another embodiment of the present invention may include the following content:

501. A virtual network client sends a virtual network creation request that carries virtual network topology information to an SDN controller.

For example, when a user needs to create a virtual network of a topology, the user may send a virtual network creation request that carries virtual network topology information to an SDN controller by using a virtual network client, so as to request the SDN controller to create at least one virtual network that has a topology described by the virtual network topology information.

502. The SDN controller receives the virtual network creation request that carries the virtual network topology information from the virtual network client. The SDN controller creates a virtual network in response to the virtual network creation request. The virtual network created by the SDN controller has the topology described by the virtual network topology information.

A virtual network that is created by the SDN controller and has the topology described by the virtual network topology information, as shown in FIG. 5-*b* or FIG. 5-*c*, is used as an example below. The virtual network shown in FIG. 5-*b* includes a virtual forwarding device VD1 and a virtual forwarding device VD4. The virtual network shown in FIG. 5-*c* includes a virtual forwarding device VD1, a virtual forwarding device VD2, a virtual forwarding device VD3, and a virtual forwarding device VD4. It can be understood that the virtual networks of the topologies shown in FIG. 5-*b* and FIG. 5-*c* are exemplary only. In an actual application, a topology of a virtual network created by an SDN controller is not limited thereto.

Each virtual forwarding device in the virtual network is a software instance. The virtual forwarding device may simulate a behavior mode of a physical forwarding device externally.

503. The SDN controller allocates a virtual network identifier to the virtual network.

Further, the SDN controller may further allocate a device identifier to each virtual forwarding device in the virtual network.

For example, if the SDN controller creates the virtual network shown in FIG. 5-b, the SDN controller may further separately allocate a globally unique device identifier to the virtual forwarding device VD1 and virtual forwarding device VD4. If the SDN controller creates the virtual network shown in FIG. 5-c, the SDN controller may further separately allocate a globally unique device identifier to the virtual forwarding device VD1, virtual forwarding device VD2, virtual forwarding device VD3, and virtual forwarding device VD4.

The SDN controller may optionally further establish a mapping relationship between the virtual network identifier and an identifier of the virtual SDN controller.

504. The SDN controller establishes a device mapping relationship.

The device mapping relationship includes a mapping relationship between a virtual forwarding device in the virtual network and a physical forwarding device in a physical network.

For example, if the SDN controller creates the virtual network shown in FIG. 5-b, the device mapping relationship may include a mapping relationship between the virtual forwarding device VD1 and a physical forwarding device D1 in the physical network, and a mapping relationship between the virtual forwarding device VD4 and a physical forwarding device D4.

For another example, if the SDN controller creates the virtual network shown in FIG. 5-c, the device mapping relationship may include a mapping relationship between the virtual forwarding device VD1 and a physical forwarding device D1 in the physical network, a mapping relationship between the virtual forwarding device VD2 and a physical forwarding device D2 in the physical network, a mapping relationship between the virtual forwarding device VD3 and a physical forwarding device D3 in the physical network, and a mapping relationship between the virtual forwarding device VD4 and a physical forwarding device D4 in the physical network.

In some embodiments of the present invention, the mapping relationship between the virtual forwarding device VD1 and the physical forwarding device D1 in the physical network may include a mapping relationship between the device identifier of the virtual forwarding device VD1 and a device identifier of the physical forwarding device D1. The mapping relationship between the virtual forwarding device VD4 and the physical forwarding device D4 in the physical network may include a mapping relationship between the device identifier of the virtual forwarding device VD4 and a device identifier of the physical forwarding device D4. The mapping relationships between other virtual forwarding devices and physical forwarding devices are inferred by analogy.

505. The SDN controller establishes a port mapping relationship.

The port mapping relationship includes a mapping relationship between a port of a virtual forwarding device in the virtual network and a port of a physical forwarding device in the physical network.

For example, if the SDN controller creates the virtual network shown in FIG. 5-b, the port mapping relationship may include a mapping relationship between an inbound port of the virtual forwarding device VD1 and an inbound port of the physical forwarding device D1, a mapping relationship between an outbound port of the virtual forwarding device VD1 and an outbound port of the physical forwarding device D1, a mapping relationship between an inbound port of the virtual forwarding device VD4 and an inbound port of the physical forwarding device D4, and a mapping relationship between an outbound port of the virtual forwarding device VD4 and an outbound port of the physical forwarding device D4.

In some embodiments of the present invention, a mapping relationship between a port of the virtual forwarding device VD1 and a port of the physical forwarding device D1 may include at least one of the following mapping relationships: a mapping relationship between inbound port information of the virtual forwarding device VD1 and inbound port information of the physical forwarding device D1; and a mapping relationship between outbound port information of the virtual forwarding device VD1 and outbound port information of the physical forwarding device D1.

Similarly, a mapping relationship between a port of the virtual forwarding device VD4 and a port of the physical forwarding device D4 may include at least one of the following mapping relationships: a mapping relationship between inbound port information of the virtual forwarding device VD4 and inbound port information of the physical forwarding device D4; and a mapping relationship between outbound port information of the virtual forwarding device VD4 and outbound port information of the physical forwarding device D4.

The outbound port information may include one or more pieces of information related to the outbound port. The inbound port information may include one or more pieces of information related to the inbound port.

For example, the inbound port information of the virtual forwarding device VD1 may include a port identifier of an inbound port of the virtual forwarding device VD1 (for example, first inbound port information of the virtual forwarding device VD1 may include a port identifier of a first inbound port of the virtual forwarding device VD1). The outbound port information of the virtual forwarding device VD1 may include a port identifier of an outbound port of the virtual forwarding device VD1 (for example, first outbound port information of the virtual forwarding device VD1 may include a port identifier of a first outbound port of the virtual forwarding device VD1).

For example, the inbound port information of the physical forwarding device D1 includes a port identifier of an inbound port of the physical forwarding device D1 (for example, first inbound port information of the physical forwarding device D1 includes a port identifier of a first inbound port of the physical forwarding device D1), or the inbound port information of the physical forwarding device D1 includes a port identifier and an inbound port label of an inbound port of the physical forwarding device D1 (for example, first inbound port information of the physical forwarding device D1 includes a port identifier and an inbound port label of a first inbound port of the physical forwarding device D1). The outbound port information of the physical forwarding device D1 includes a port identifier of an outbound port of the physical forwarding device D1 (for example, first outbound port information of the physical forwarding device D1 includes a port identifier of a first outbound port of the physical forwarding device D1), or the outbound port information of the physical forwarding device D1 includes a port identifier and an outbound port label of an outbound port of the physical forwarding device D1 (for example, first outbound port information of the physical forwarding device D1 includes a port identifier and an inbound port label of a first outbound port of the physical forwarding device D1).

For example, the inbound port information of the virtual forwarding device VD4 may include a port identifier of an inbound port of the virtual forwarding device VD4 (for example, first inbound port information of the virtual forwarding device VD4 may include a port identifier of a first inbound port of the virtual forwarding device VD4). The outbound port information of the virtual forwarding device VD4 may include a port identifier of an outbound port of the virtual forwarding device VD4 (for example, first outbound port information of the virtual forwarding device VD4 may include a port identifier of a first outbound port of the virtual forwarding device VD4).

For example, the inbound port information of the physical forwarding device D4 includes a port identifier of an inbound port of the physical forwarding device D4 (for example, first inbound port information of the physical forwarding device D4 includes a port identifier of a first inbound port of the physical forwarding device D4), or the inbound port information of the physical forwarding device D4 includes a port identifier and an inbound port label of an inbound port of the physical forwarding device D4 (for example, first inbound port information of the physical forwarding device D4 includes a port identifier and an inbound port label of a first inbound port of the physical forwarding device D4). The outbound port information of the physical forwarding device D4 includes a port identifier of an outbound port of the physical forwarding device D4 (for example, first outbound port information of the physical forwarding device D4 includes a port identifier of a first outbound port of the physical forwarding device D4), or the outbound port information of the physical forwarding device D4 includes a port identifier and an outbound port label of an outbound port of the physical forwarding device D4 (for example, first outbound port information of the physical forwarding device D4 includes a port identifier and an inbound port label of a first outbound port of the physical forwarding device D4).

The physical forwarding device in the embodiments of the present invention may be a physical router or a physical switch, which is a device having a packet forwarding function, where the virtual forwarding device may be a virtual router or a virtual switch.

In some embodiments of the present invention, after the virtual network is created, the SDN controller may optionally further establish a mapping relationship between a virtual link and a link tunnel, where the virtual link is a virtual link between the virtual forwarding devices, and the link tunnel is a link tunnel between the physical forwarding devices.

For example, if the SDN controller creates the virtual network shown in FIG. 5-$b$, the mapping relationship established between a virtual link and a link tunnel by the SDN controller includes a mapping relationship between a virtual link vL14 (the virtual link vL14 is a virtual link between the virtual forwarding device VD1 and the virtual forwarding device VD4) and a link tunnel L14 (the link tunnel L14 is a link tunnel between the physical forwarding device D1 and the physical forwarding device D4).

For example, if the SDN controller creates the virtual network shown in FIG. 5-$c$, the mapping relationship established between a virtual link and a link tunnel by the SDN controller may include a mapping relationship between a virtual link vL14 (the virtual link vL14 is a virtual link between the virtual forwarding device VD1 and the virtual forwarding device VD4) and a link tunnel L14 (the link tunnel L14 is a link tunnel between the physical forwarding device D1 and the physical forwarding device D4), a mapping relationship between a virtual link vL24 (the virtual link vL24 is a virtual link between the virtual forwarding device VD2 and the virtual forwarding device VD4) and a link tunnel L24 (the link tunnel L24 is a link tunnel between the physical forwarding device D2 and the physical forwarding device D4), and a mapping relationship between a virtual link vL34 (the virtual link vL34 is a virtual link between the virtual forwarding device VD3 and the virtual forwarding device VD4) and a link tunnel L34 (the link tunnel L34 is a link tunnel between the physical forwarding device D3 and the physical forwarding device D4).

Optionally, the virtual network creation request may further carry link attribute information of one or more virtual links. Assuming that the virtual network creation request carries link attribute information corresponding to the virtual link vL14, the link tunnel L14 having the mapping relationship with the virtual link vL14 needs to meet a constraint of the link attribute information corresponding to the virtual link vL14. Constraints of other link tunnels are inferred by analogy.

Certainly, the link attribute information carried in the virtual network creation request may also be targeted at all virtual links. In this scenario, all of the link tunnel L14, link tunnel L24, and link tunnel L34 need to meet constraints of link attribute information.

The link attribute information includes at least one piece of the following information: link bandwidth information, link delay information, link packet loss ratio information, and link jitter information. Assuming that the link attribute information corresponding to the virtual link vL14, which is carried in the virtual network creation request, includes link bandwidth information, a link bandwidth of the link tunnel L14 having the mapping relationship with the virtual link vL14 needs to be greater than a link bandwidth indicated by the link bandwidth information.

Certainly, if the virtual network creation request does not carry link attribute information of a virtual link, it may be considered that a link attribute of a link tunnel having a mapping relationship with the virtual link is not constrained, or that a link attribute of a link tunnel having a mapping relationship with the virtual link is constrained according to a default link attribute (for example, a default link bandwidth value and a default link delay or packet loss ratio).

In some embodiments of the present invention, information used to describe a virtual link may include: a device identifier of a source virtual forwarding device (for example, the device identifier of the virtual forwarding device VD1), a port identifier of a link source port in the source virtual forwarding device, a device identifier of a destination virtual forwarding device (for example, the device identifier of the virtual forwarding device VD4), and a port identifier of a destination port in the destination virtual forwarding device.

506. The SDN controller allocates a virtual SDN controller to the virtual network.

The SDN controller may allocate different SDN controllers to different virtual networks, that is, the virtual SDN controllers and the virtual networks may be in a one-to-one correspondence.

The virtual SDN controller may be integrated in the SDN controller. The virtual SDN controller may also be a device independent of the SDN controller. For example, the virtual SDN controller may be a server, a virtual machine, or a software instance.

507. The SDN controller registers each virtual forwarding device in the virtual network with the virtual SDN controller.

The SDN controller may register virtual forwarding devices including the virtual forwarding device VD1 and the virtual forwarding device VD2 in the virtual network with the virtual SDN controller. By registering the virtual forwarding devices with the virtual SDN controller, control channels may be established between the virtual SDN controller and the virtual forwarding devices. The virtual SDN controller may deliver control information such as a routing entry to the virtual forwarding devices based on the control channels, and the virtual SDN controller may further use the control channels to discover the topology of the virtual network based on a topology discovery protocol. The virtual forwarding devices may use the control channels to report a virtual device power-on/power-off event, a port activation/deactivation event, a link activation/deactivation event, and the like to the virtual SDN controller.

As may be seen above, in the solution of this embodiment, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by this embodiment has great improvements in manners such as service networking flexibility, and helps reduce service costs and shorten a service deployment period. In addition, after the virtual network is created, an SDN controller establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN mechanism, introduction of the virtual SDN controller and SDN controller helps simplify a service configuration, and helps further reduce the service costs and shorten the service deployment period.

A scenario of information exchange between a physical forwarding device, an SDN controller, a virtual SDN controller, and a virtual forwarding device after the solution of the embodiment corresponding to FIG. 5-a is implemented is described by using an example below. FIG. 6 is a schematic flowchart of another method for implementing network virtualization according to another embodiment of the present invention. As shown in FIG. 6, another method for implementing network virtualization according to another embodiment of the present invention may include the following content:

601. A virtual SDN controller delivers a first routing entry.

602. An SDN controller obtains, by using a virtual forwarding device VD1, the first routing entry delivered by the virtual SDN controller, where a match field of the first routing entry carries a network address, where the network address may be a destination address and/or a source address, and an action field of the first routing entry carries first outbound port information of the virtual forwarding device VD1.

The SDN controller determines, based on the virtual forwarding device VD1 and a device mapping relationship, a physical forwarding device D1 that has a mapping relationship with the virtual forwarding device VD1; and determines, based on a port mapping relationship and the first outbound port information of the virtual forwarding device VD1, first outbound port information of the physical forwarding device D1 that has a mapping relationship with the first outbound port information of the virtual forwarding device VD1.

603. The SDN controller obtains a second routing entry by replacing the first outbound port information of the virtual forwarding device VD1, which is carried in the action field of the first routing entry, with the first outbound port information of the physical forwarding device D1, where a match field of the second routing entry carries the network address.

Further, the match field of the second routing entry may optionally further carry a virtual network identifier of a virtual network to which the virtual forwarding device VD1 belongs.

604. The SDN controller sends the second routing entry to the physical forwarding device D1.

After the physical forwarding device D1 receives the second routing entry, if information related to a received packet to be forwarded (for example, a network address and an inbound port of the packet to be forwarded) matches information in the match field of the second routing entry, the physical forwarding device D1 may perform, based on information included in an action field of the second routing entry, forwarding processing for the packet to be forwarded.

In some embodiments of the present invention, the first outbound port information of the virtual forwarding device VD1 may include a port identifier of a first outbound port of the virtual forwarding device VD1. The first outbound port information of the physical forwarding device D1 includes a port identifier of a first outbound port of the physical forwarding device D1, or the first outbound port information of the physical forwarding device D1 includes a port identifier and an outbound port label of a first outbound port of the physical forwarding device D1.

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps to simplify a service configuration, and helps reduce service costs and shorten a service deployment period.

Figure 7:
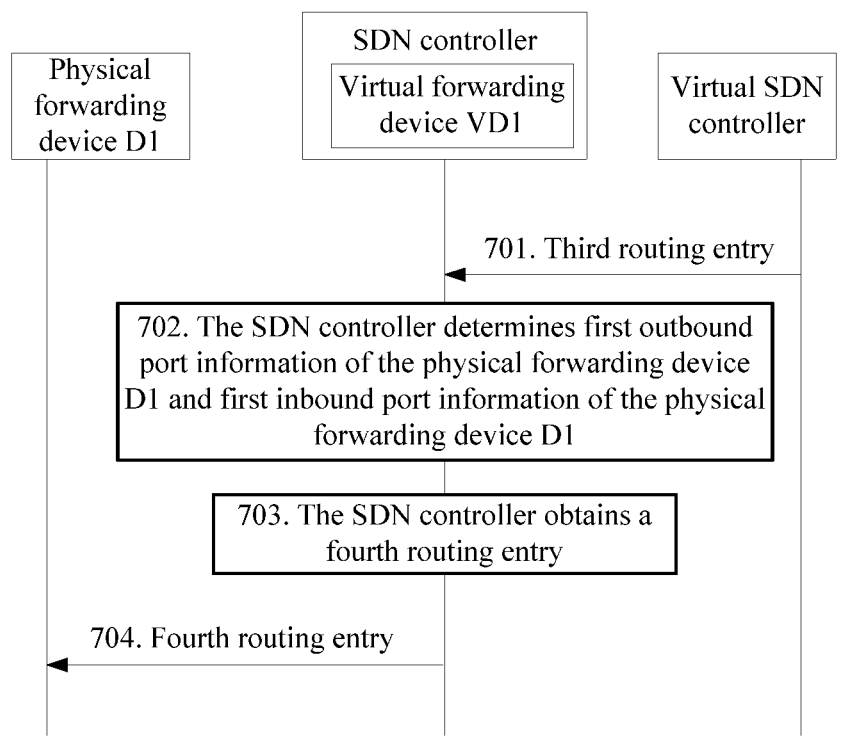
FIG. 7 is a schematic flowchart of another method for implementing network virtualization according to an embodiment of the present invention.

Another scenario of information exchange between a physical forwarding device, an SDN controller, a virtual SDN controller, and a virtual forwarding device after the solution of this embodiment corresponding to FIG. 5-*a* is implemented is described by using an example below. FIG. 7 is a schematic flowchart of another method for implementing network virtualization according to another embodiment of the present invention. As shown in FIG. 7, another method for implementing network virtualization according to another embodiment of the present invention may include the following content:

701. A virtual SDN controller delivers a third routing entry.

702. An SDN controller obtains, by using a virtual forwarding device VD1, the third routing entry delivered by the virtual SDN controller, where a match field of the third routing entry carries first inbound port information of the virtual forwarding device VD1, and an action field of the third routing entry carries first outbound port information of the virtual forwarding device VD1.

The SDN controller determines, based on the virtual forwarding device VD1 and a device mapping relationship, a physical forwarding device D1 that has a mapping relationship with the virtual forwarding device VD1; determines, based on a port mapping relationship and the first outbound port information of the virtual forwarding device VD1, first outbound port information of the physical forwarding device D1 that has a mapping relationship with the first outbound port information of the virtual forwarding device VD1; and determines, based on the port mapping relationship and the first inbound port information of the virtual forwarding device VD1, first inbound port information of the physical forwarding device D1 that has a mapping relationship with the first inbound port information of the virtual forwarding device VD1.

703. The SDN controller obtains a fourth routing entry by replacing the first outbound port information of the virtual forwarding device VD1, which is carried in the action field of the third routing entry, with the first outbound port information of the physical forwarding device D1, and replacing the first inbound port information of the virtual forwarding device VD1, which is carried in the match field of the third routing entry, with the first inbound port information of the physical forwarding device D1.

704. The SDN controller sends the fourth routing entry to the physical forwarding device D1.

After the physical forwarding device D1 receives the fourth routing entry, if information related to a received packet to be forwarded (for example, an inbound port, of the physical forwarding device D1, for receiving the packet to be forwarded) matches information in a match field of the fourth routing entry, the physical forwarding device D1 may perform, based on information included in an action field of the fourth routing entry, forwarding processing for the packet to be forwarded.

The first outbound port information of the virtual forwarding device VD1 includes a port identifier of a first outbound port of the virtual forwarding device VD1. The first inbound port information of the virtual forwarding device VD1 includes a port identifier of a first inbound port of the virtual forwarding device VD1. The first outbound port information of the physical forwarding device D1 includes a port identifier of a first outbound port of the physical forwarding device D1, or the first outbound port information of the physical forwarding device D1 includes a port identifier and an outbound port label and the like of a first outbound port of the physical forwarding device D1. The first inbound port information of the physical forwarding device D1 includes a port identifier of a first inbound port of the physical forwarding device D1, or the first inbound port information of the physical forwarding device D1 includes a port identifier and an inbound port label and the like of a first inbound port of the physical forwarding device D1.

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps simplify a service configuration, and helps reduce service costs and shorten a service deployment period.

Figure 8:
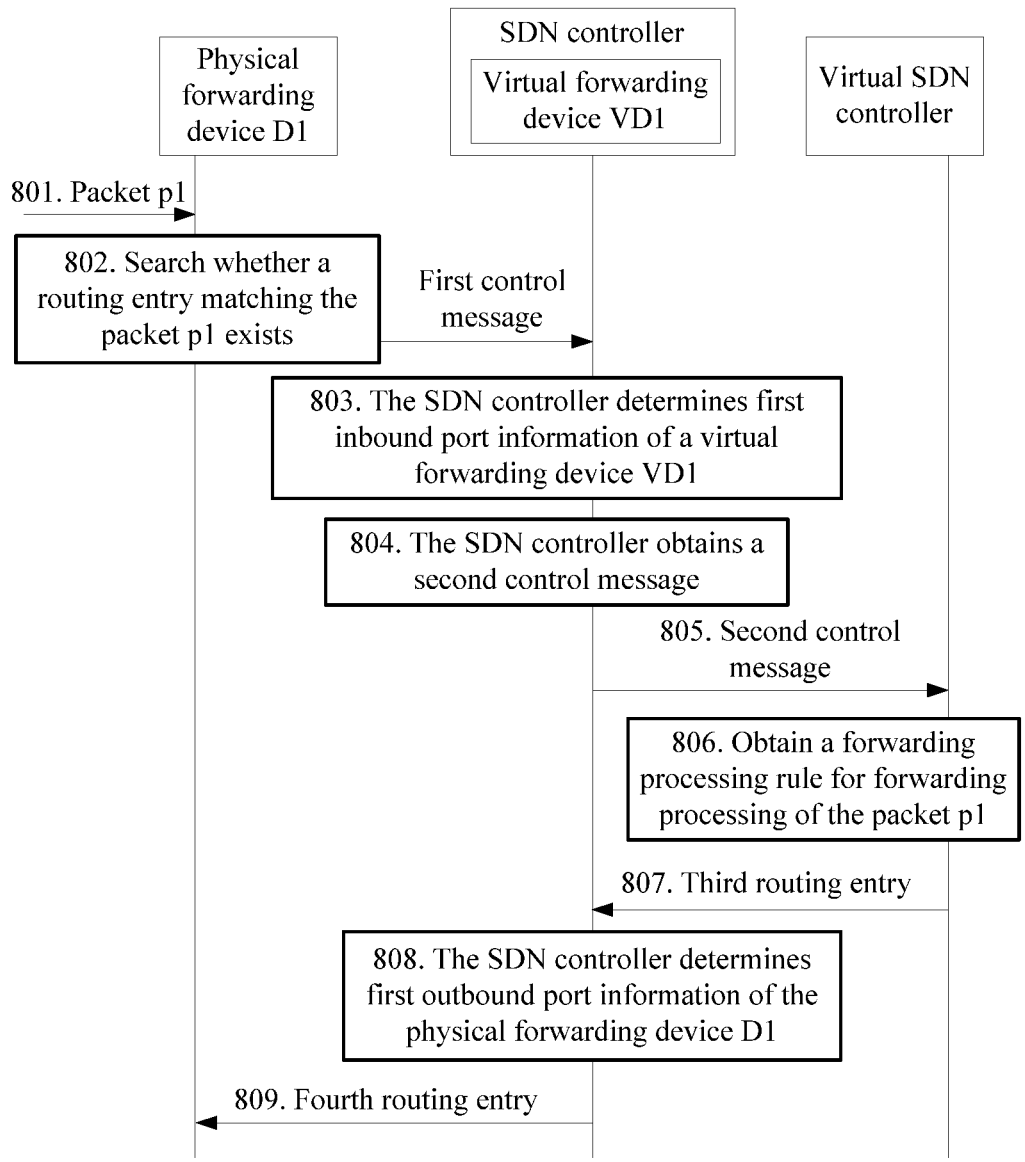
FIG. 8 is a schematic flowchart of another method for implementing network virtualization according to an embodiment of the present invention.

Another scenario of information interaction between a physical forwarding device, an SDN controller, a virtual SDN controller, and a virtual forwarding device after the solution of this embodiment corresponding to FIG. 5-*a* is implemented is described by using an example below. FIG. 8 is a schematic flowchart of another method for implementing network virtualization according to another embodiment of the present invention. As shown in FIG. 8, another method for implementing network virtualization according to another embodiment of the present invention may include the following content:

801. A physical forwarding device D1 receives a packet p1 by using a first inbound port.

802. The physical forwarding device D1 uses first inbound port information (for example, the first inbound port information includes a port identifier and an inbound port label) as a match index to search whether a routing entry matching the packet p1 exists.

In this embodiment, assuming that the physical forwarding device D1 does not find any routing entry matching the packet p1, the physical forwarding device D1 sends a first control message carrying the packet p1 to an SDN controller, where a match field of the first control message carries the first inbound port information of the physical forwarding device D1.

803. The SDN controller determines, based on the first inbound port information of the physical forwarding device D1 and an established port mapping relationship, first inbound port information of a virtual forwarding device VD1 that has a mapping relationship with the first inbound port information of the physical forwarding device D1.

804. The SDN controller obtains a second control message by replacing the first inbound port information of the physical forwarding device D1, which is carried in the match field of the first control message, with the first inbound port information of the virtual forwarding device VD1.

805. The SDN controller sends the second control message to a virtual SDN controller by using the virtual forwarding device VD1.

806. The virtual SDN controller obtains, based on a preset policy, a forwarding processing rule for forwarding the packet p1.

807. The virtual SDN controller sends a third routing entry, where an action field of the third routing entry carries the forwarding processing rule, a match field of the third routing entry carries the first inbound port information of the virtual forwarding device VD1, and the forwarding processing rule includes first outbound port information of the virtual forwarding device VD1.

808. The SDN controller receives the third routing entry from the virtual SDN controller by using the virtual forwarding device VD1.

The SDN controller determines, based on the port mapping relationship and the virtual forwarding device VD1, the physical forwarding device D1 that has a mapping relationship with the virtual forwarding device VD1. The SDN controller determines, based on the port mapping relationship and the first outbound port information of the virtual forwarding device VD1, first outbound port information of the physical forwarding device D1 that has a mapping relationship with the first outbound port information of the virtual forwarding device VD1.

809. The SDN controller obtains a fourth routing entry by replacing the first inbound port information of the virtual forwarding device VD1, which is carried in the match field of the third routing entry, with the first inbound port information of the physical forwarding device D1, and replacing the first outbound port information of the virtual forwarding device VD1, which is carried in the action field of the third routing entry, with the first outbound port information of the physical forwarding device D1.

The SDN controller sends the fourth routing entry to the physical forwarding device D1.

After the physical forwarding device D1 receives the fourth routing entry, the physical forwarding device D1 performs, based on the forwarding processing rule included in an action field of the fourth routing entry, forwarding processing for a subsequently received packet to be forwarded that matches the fourth routing entry.

The first outbound port information of the virtual forwarding device VD1 may include a port identifier of a first outbound port of the virtual forwarding device VD1. The first inbound port information of the virtual forwarding device VD1 may include a port identifier of a first inbound port of the virtual forwarding device VD1. The first outbound port information of the physical forwarding device D1 may include a port identifier of a first outbound port of the physical forwarding device D1, or the first outbound port information of the physical forwarding device D1 may include a port identifier and an outbound port label and the like of a first outbound port of the physical forwarding device D1. The first inbound port information of the physical forwarding device D1 may include a port identifier of a first inbound port of the physical forwarding device D1, or the first inbound port information of the physical forwarding device D1 may include a port identifier and an inbound port label and the like of a first inbound port of the physical forwarding device D1.

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps simplify a service configuration, and helps reduce service costs and shorten a service deployment period.

Figure 9:
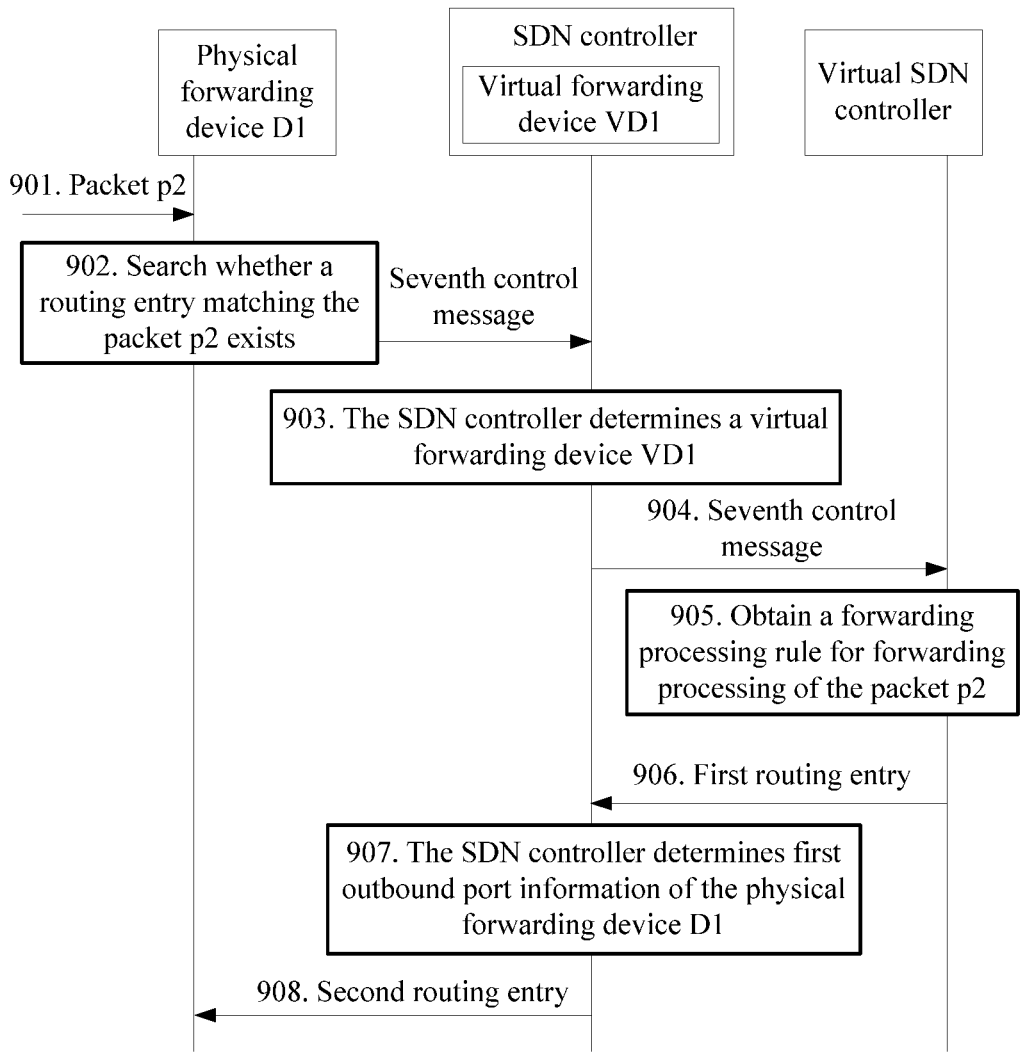
FIG. 9 is a schematic flowchart of another method for implementing network virtualization according to an embodiment of the present invention.

Another scenario of information exchange between a physical forwarding device, an SDN controller, a virtual SDN controller, and a virtual forwarding device after the solution of this embodiment corresponding to FIG. 5-a is implemented is described by using an example below. FIG. 9 is a schematic flowchart of another method for implementing network virtualization according to another embodiment of the present invention. As shown in FIG. 9, another method for implementing network virtualization according to another embodiment of the present invention may include the following content:

901. A physical forwarding device D1 receives a packet p2.

902. The physical forwarding device D1 uses first inbound port information (the first inbound port information includes a port identifier and an inbound port label and the like of a first inbound port) as a match index to search whether a routing entry matching the packet p1 exists.

In this embodiment, assuming that the physical forwarding device D1 does not find any routing entry matching the packet p1, the physical forwarding device D1 sends a seventh control message carrying the packet p1 to an SDN controller, where a match field of the seventh control message carries a virtual network identifier.

903. The SDN controller determines, based on the virtual network identifier, the physical forwarding device D1, and the device mapping relationship, a virtual forwarding device VD1 that is located in a virtual network indicated by the virtual network identifier and has a mapping relationship with the physical forwarding device D1.

904. The SDN controller sends the seventh control message to a virtual SDN controller by using the virtual forwarding device VD1.

905. The virtual SDN controller obtains, based on a preset policy, a forwarding processing rule for forwarding processing of the packet p1.

906. The virtual SDN controller sends a first routing entry.

An action field of the first routing entry carries the forwarding processing rule.

907. The SDN controller receives the first routing entry from the virtual SDN controller by using the virtual forwarding device VD1.

The SDN controller determines, based on a port mapping relationship and the virtual forwarding device VD1, the physical forwarding device D1 that has a mapping relationship with the virtual forwarding device VD1. The SDN controller determines, based on a port mapping relationship and first outbound port information of the virtual forwarding device VD1, first outbound port information of the physical forwarding device D1 that has a mapping relationship with the first outbound port information of the virtual forwarding device VD1.

908. The SDN controller obtains a second routing entry by replacing the first outbound port information of the virtual forwarding device VD1, which is carried in the action field of the first routing entry, with the first outbound port information of the physical forwarding device D1.

The SDN controller sends the second routing entry to the physical forwarding device D1, where a match field of the second routing entry carries the virtual network identifier.

After receiving the second routing entry, the physical forwarding device D1 performs, based on the forwarding processing rule included in an action field of the second routing entry, forwarding processing for a subsequently received packet to be forwarded that matches the second routing entry.

The first outbound port information of the virtual forwarding device VD1 may include a port identifier of a first outbound port of the virtual forwarding device VD1. The first inbound port information of the virtual forwarding device VD1 may include a port identifier of a first inbound port of the virtual forwarding device VD1. The first outbound port information of the physical forwarding device D1 may include a port identifier of a first outbound port of the physical forwarding device D1, or the first outbound port information of the physical forwarding device D1 may include a port identifier and an outbound port label and the like of a first outbound port of the physical forwarding device D1. The first inbound port information of the physical forwarding device D1 may include the port identifier of the first inbound port of the physical forwarding device D1, or the first inbound port information of the physical forwarding device D1 may include the port identifier and the inbound port label and the like of the first inbound port of the physical forwarding device D1.

As may be seen above, in this implementation solution, after a virtual network is created, an SDN controller establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller helps simplify a service configuration, and helps reduce service costs and shorten a service deployment period.

It can be understood that the physical forwarding device D1 in the embodiments shown in FIG. 5-a to FIG. 9 may be considered as an implementation example of a first physical forwarding device, and that the virtual forwarding device VD1 shown in FIG. 5-a to FIG. 9 may be considered as an implementation example of a first virtual forwarding device.

In a conventional VPN solution, a route of an enterprise user is managed by an operator network, and a control layer of a conventional physical forwarding device implements VPN route propagation and route computation by using a distributed protocol. This causes huge computing consumption to a control layer of a network device. A computing capability of a network device has become a bottleneck in further development of a VPN service. However, in some solutions of the embodiments of the present invention, route propagation, route computation, forwarding table maintenance, and the like of a virtual network may be split to the virtual network, and a physical network may reserve only a universal packet forwarding function. This helps greatly reduce computing consumption of a physical forwarding device. Because computing consumption caused by route computation of the virtual network does not exist in a physical forwarding device, more virtual devices may be mapped to one physical forwarding device, and physical costs required by the virtual network are greatly reduced.

Further, network device virtualization is implemented in an SDN controller, and a virtual controller may provide a programmable interface complying with an SDN standard. Therefore, a user may customize the virtual network more flexibly by using the virtual controller, and further, a completely virtualized virtual controller and virtual network are provided for the user. Based on some solutions of the embodiments of the present invention, automatic configuration may be implemented by using a resource automatic allocation algorithm. This may greatly reduce an error probability while reducing labor costs, and also make it possible to deploy a virtual network on a large scale.

The following further provides a related apparatus configured to implement the foregoing solution.

Referring to FIG. 10-*a*, FIG. 10-*a* is a schematic diagram of an SDN controller 1000 provided by an embodiment of the present invention. The SDN controller 1000 may include: a receiving unit 1010, a creating unit 1020, a mapping unit 1030, an allocating unit 1040, and a registering unit 1050.

The receiving unit 1010 is configured to receive a virtual network creation request that carries virtual network topology information.

The creating unit 1020 is configured to create a virtual network in response to the virtual network creation request, where the virtual network has a topology described by the virtual network topology information, and the virtual network includes a first virtual forwarding device and a second virtual forwarding device.

The mapping unit 1030 is configured to establish a device mapping relationship and establish a port mapping relationship, where the device mapping relationship includes a mapping relationship between the first virtual forwarding device and a first physical forwarding device in a physical network, and a mapping relationship between the second virtual forwarding device and a second physical forwarding device in the physical network, and the port mapping relationship includes a mapping relationship between a port of the first virtual forwarding device and a port of the first physical forwarding device, and a mapping relationship between a port of the second virtual forwarding device and a port of the second physical forwarding device.

The allocating unit 1040 is configured to allocate a virtual SDN controller to the virtual network.

The registering unit 1050 is configured to register the first virtual forwarding device and the second virtual forwarding device with the virtual SDN controller.

Referring to FIG. 10-*b*, in some embodiments of the present invention, the SDN controller 1000 may further include a second allocating unit 1060, configured to allocate a virtual network identifier to the virtual network after the creating unit creates the virtual network.

The mapping unit 1030 may be further configured to establish a mapping relationship between the virtual network identifier and an identifier of the virtual SDN controller.

In some embodiments of the present invention, the mapping relationship between the port of the first virtual forwarding device and the port of the first physical forwarding device includes at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

In some embodiments of the present invention, the inbound port information of the first virtual forwarding device includes a port identifier of an inbound port of the first virtual forwarding device, and the outbound port information of the first virtual forwarding device includes a port identifier of an outbound port of the first virtual forwarding device.

The inbound port information of the first physical forwarding device includes a port identifier of an inbound port of the first physical forwarding device, or the inbound port information of the first physical forwarding device includes a port identifier and an inbound port label of an inbound port of the first physical forwarding device.

The outbound port information of the first physical forwarding device includes a port identifier of an outbound port of the first physical forwarding device, or the outbound port information of the first physical forwarding device includes a port identifier and an outbound port label of an outbound port of the first physical forwarding device.

Referring to FIG. 10-c, in some embodiments of the present invention, the SDN controller 1000 may further include:

a first obtaining unit 1070, a first converting unit 1080, and a sending unit 1090.

The first obtaining unit 1070 is configured to: after the registering unit 1050 registers the first virtual forwarding device with the virtual SDN controller, obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device.

The first converting unit 1080 is configured to: determine, based on the first virtual forwarding device and the device mapping relationship, the first physical forwarding device that has the mapping relationship with the first virtual forwarding device; and determine, based on the port mapping relationship and the outbound port information of the first virtual forwarding device, the outbound port information of the first physical forwarding device that has the mapping relationship with the outbound port information of the first virtual forwarding device.

The sending unit 1090 is configured to send a second routing entry to the first physical forwarding device, where a match field of the second routing entry carries the network address, and an action field of the second routing entry carries the outbound port information of the first physical forwarding device.

In some embodiments of the present invention, if the second allocating unit allocates the virtual network identifier to the virtual network, the match field of the second routing entry further carries the virtual network identifier.

Referring to FIG. 10-d, in some other embodiments of the present invention, the SDN controller 1000 may further include:

a second obtaining unit 1001, a second converting unit 1002, and a sending unit 1090.

The second obtaining unit 1001 is configured to: after the registering unit registers the first virtual forwarding device with the virtual SDN controller, obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device.

The second converting unit 1002 is configured to: determine, based on the first virtual forwarding device and the device mapping relationship, the first physical forwarding device that has the mapping relationship with the first virtual forwarding device; determine, based on the port mapping relationship and the outbound port information of the first virtual forwarding device, the outbound port information of the first physical forwarding device that has the mapping relationship with the outbound port information of the first virtual forwarding device; and determine, based on the port mapping relationship and the inbound port information of the first virtual forwarding device, the inbound port information of the first physical forwarding device that has the mapping relationship with the inbound port information of the first virtual forwarding device.

The sending unit 1090 is configured to send a fourth routing entry to the first physical forwarding device, where a match field of the fourth routing entry carries the inbound port information of the first physical forwarding device, and an action field of the fourth routing entry carries the outbound port information of the first physical forwarding device.

Referring to FIG. 10-e, in still some other embodiments of the present invention, the SDN controller 1000 may further include:

a third obtaining unit 1003, a third converting unit 1004, and a sending unit 1090.

The third obtaining unit 1003 is configured to: after the registering unit registers the first virtual forwarding device with the virtual SDN controller, receive a first control message reported by the first physical forwarding device, where a match field of the first control message carries the inbound port information of the first physical forwarding device.

The third converting unit 1004 is configured to determine, based on the port mapping relationship and the inbound port information of the first physical forwarding device, the inbound port information of the first virtual forwarding device that has the mapping relationship with the inbound port information of the first physical forwarding device.

The sending unit 1090 is configured to send a second control message to the virtual SDN controller by using the first virtual forwarding device, where a match field of the second control message carries the inbound port information of the first virtual forwarding device.

In some embodiments of the present invention, the SDN controller 1000 may further include:

a saving unit, configured to: if the first obtaining unit 1070 obtains, by using the first virtual forwarding device, the first routing entry delivered by the virtual SDN controller, save the first routing entry; and if the second obtaining unit 1001 obtains, by using the first virtual forwarding device, the third routing entry delivered by the virtual SDN controller, save the third routing entry.

In some embodiments of the present invention, the SDN controller 1000 may further include:

a third allocating unit, configured to separately allocate a device identifier to the first virtual forwarding device and the second virtual forwarding device after the creating unit creates the virtual network.

The mapping relationship between the first virtual forwarding device and the first physical forwarding device in the physical network includes a mapping relationship between the device identifier of the first virtual forwarding device and a device identifier of the first physical forwarding device.

The mapping relationship between the second virtual forwarding device and the second physical forwarding device in the physical network includes a mapping relationship between the device identifier of the second virtual forwarding device and a device identifier of the second physical forwarding device.

In some embodiments of the present invention, the virtual network creation request further carries link attribute information.

The mapping unit is further configured to establish a mapping relationship between a virtual link and a link tunnel after the creating unit creates the virtual network, where the link tunnel complies with a constraint of the link attribute information, where the virtual link is a virtual link between the first virtual forwarding device and the second virtual forwarding device, and the link tunnel is a link tunnel between the first physical forwarding device and the second physical forwarding device.

In some embodiments of the present invention, the link attribute information includes at least one piece of the following information: link bandwidth information, link delay information, link packet loss ratio information, and link jitter information.

In some embodiments of the present invention, information used to describe the virtual link includes: the device identifier of the first virtual forwarding device, a port identifier of a link source port in the first virtual forwarding device, the device identifier of the second virtual forwarding device, and a port identifier of a link destination port in the second virtual forwarding device.

It can be understood that functions of each functional unit of the SDN controller 1000 in this embodiment may be implemented according to the methods in the foregoing method embodiments. The implementation process thereof is not further described herein. For details, refer to related descriptions of the foregoing method embodiments.

As seen from above, in this implementation solution, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by this embodiment has great improvements in manners such as service networking flexibility, and helps reduce service costs and shorten a service deployment period. In addition, after the virtual network is created, an SDN controller 1000 establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN mechanism, introduction of the virtual SDN controller and SDN controller 1000 helps simplify a service configuration, and helps further reduce the service costs and shorten the service deployment period.

Referring to FIG. 11, FIG. 11 is a schematic diagram of an SDN controller 1100 according to an embodiment of the present invention. The SDN controller 1100 may include at least one bus 1101, at least one processor 1102 connected to the bus 1101, and at least one memory 1103 connected to the bus 1101.

By invoking, by using the bus 1101, code stored in the memory 1103, the processor 1102 is configured to: receive a virtual network creation request that carries virtual network topology information; create a virtual network in response to the virtual network creation request, where the virtual network has a topology described by the virtual network topology information, and the virtual network includes a first virtual forwarding device and a second virtual forwarding device; establish a device mapping relationship, where the device mapping relationship includes a mapping relationship between the first virtual forwarding device and a first physical forwarding device in a physical network, and a mapping relationship between the second virtual forwarding device and a second physical forwarding device in the physical network; establish a port mapping relationship, where the port mapping relationship includes a mapping relationship between a port of the first virtual forwarding device and a port of the first physical forwarding device, and a mapping relationship between a port of the second virtual forwarding device and a port of the second physical forwarding device; allocate a virtual SDN controller to the virtual network; and register the first virtual forwarding device and the second virtual forwarding device with the virtual SDN controller.

Certainly, the virtual network may optionally further include other virtual forwarding devices. For example, the virtual network may optionally further include a third virtual forwarding device, a fourth virtual forwarding device, and the like. Each virtual forwarding device in the virtual network is a software instance. The virtual forwarding device may simulate a behavior mode of a physical forwarding device externally.

In some embodiments of the present invention, the processor 1102 may establish the mapping relationship between the first virtual forwarding device and the first physical forwarding device by generating a mapping relationship record that records device identifiers of the first virtual forwarding device and the first physical forwarding device. Likewise, the mapping relationship between the second virtual forwarding device and the second physical forwarding device may be established by generating a mapping relationship record that records device identifiers of the second virtual forwarding device and the second physical forwarding device. Manners of establishing mapping relationships between other virtual forwarding devices and other physical forwarding devices may be similar. Certainly, the device mapping relationship may also be established in other manners.

The first physical forwarding device may be a physical forwarding device or may also be a physical forwarding device group including multiple physical forwarding devices. Likewise, the second physical forwarding device may be a physical forwarding device or may also be a physical forwarding device group including multiple physical forwarding devices. For example, assuming that the first physical forwarding device is a router A, establishing the mapping relationship between the first virtual forwarding device and the first physical forwarding device includes:

establishing a mapping relationship between the router A and the first virtual forwarding device. For another example, assuming that the first physical forwarding device is a physical forwarding device group including the router A and a router B, establishing the mapping relationship between the first virtual forwarding device and the first physical forwarding device includes: establishing a mapping relationship between the physical forwarding device group including the router A and router B, and the first virtual forwarding device. Other cases are similar to the foregoing case.

It can be understood that different virtual forwarding devices in different virtual networks may have a mapping relationship with a same physical forwarding device.

In some embodiments of the present invention, the processor 1102 may allocate different SDN controllers to different virtual networks, that is, the virtual SDN controller and the virtual network may be in a one-to-one correspondence. In some scenarios, the processor 1102 may also allocate a same virtual SDN controller to at least two virtual networks.

The virtual SDN controller may be integrated in the SDN controller. The virtual SDN controller may also be a device independent of the SDN controller. For example, the virtual SDN controller may be a server, a virtual machine, or a software instance.

The processor 1102 may register virtual forwarding devices including the first virtual forwarding device and the second virtual forwarding device in the virtual network with the virtual SDN controller. By registering the virtual forwarding devices with the virtual SDN controller, control channels may be established between the virtual SDN controller and the virtual forwarding devices. The virtual SDN controller may deliver control information such as a routing entry to the virtual forwarding devices based on the control channels, and the virtual SDN controller may further use the control channels to discover the topology of the virtual network based on a topology discovery protocol. The virtual forwarding devices may use the control channels to report a virtual device power-on/power-off event, a port activation/deactivation event, a link activation/deactivation event, and the like to the virtual SDN controller.

In some embodiments of the present invention, after the virtual network is created, the processor 1102 may optionally further allocate a virtual network identifier to the virtual network. The SDN controller may optionally further establish a mapping relationship between the virtual network identifier and an identifier of the virtual SDN controller.

In some embodiments of the present invention, after the virtual network is created, the processor 1102 may optionally further separately allocate a device identifier to the first virtual forwarding device and the second virtual forwarding device (certainly the processor 1102 may optionally further separately allocate a device identifier to other virtual forwarding devices in the virtual network). The mapping relationship between the first virtual forwarding device and the first physical forwarding device in the physical network may include a mapping relationship between the device identifier of the first virtual forwarding device and a device identifier of the first physical forwarding device. The mapping relationship between the second virtual forwarding device and the second physical forwarding device in the physical network may include a mapping relationship between the device identifier of the second virtual forwarding device and a device identifier of the second physical forwarding device. It can be understood that mapping relationships between other virtual forwarding devices (if any) and other physical forwarding devices (if any) are inferred by analogy.

In some embodiments of the present invention, optionally, the virtual network creation request may further carry link attribute information and the like, and after the virtual network is created, the processor 1102 may optionally further establish a mapping relationship between a first virtual link and a first link tunnel, where the first link tunnel complies with a constraint of the link attribute information, where the first virtual link is a virtual link between the first virtual forwarding device and the second virtual forwarding device, and the link tunnel is a link tunnel between the first physical forwarding device and the second physical forwarding device. In some embodiments of the present invention, the link attribute information includes at least one piece of the following information: link bandwidth information, link delay information, link packet loss ratio information, link jitter information, and the like.

In some embodiments of the present invention, an information group used to describe the first virtual link may include: the device identifier of the first virtual forwarding device (namely, a source virtual forwarding device), a port identifier of a link source port in the first virtual forwarding device, the device identifier of the second virtual forwarding device (namely, a destination virtual forwarding device), and a port identifier of a link destination port in the first virtual forwarding device.

In some embodiments of the present invention, the mapping relationship between the port of the first virtual forwarding device and the port of the first physical forwarding device may include at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

Similarly, the mapping relationship between the port of the second virtual forwarding device and the port of the second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). For example, the outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

The physical forwarding device in the embodiments of the present invention may be a physical router or a physical switch, which is a device having a packet forwarding function, where the virtual forwarding device may be a virtual router or a virtual switch.

For example, after the processor 1102 registers the first virtual forwarding device with the virtual SDN controller, the processor 1102 may optionally further obtain, by using the first virtual forwarding device, a first routing entry delivered by the virtual SDN controller, where an action field of the first routing entry carries the outbound port information of the first virtual forwarding device; the processor 1102 determines, based on the first virtual forwarding device and the device mapping relationship, the first physical forwarding device that has the mapping relationship with the first virtual forwarding device; the processor 1102 determines, based on the port mapping relationship and the outbound port information of the first virtual forwarding device, the outbound port information of the first physical forwarding device that has the mapping relationship with the outbound port information of the first virtual forwarding device; and the processor 1102 sends a second routing entry to the first physical forwarding device, where an action field of the second routing entry carries the outbound port information of the first physical forwarding device. The processor 1102 may, for example, obtain the second routing entry by conversion based on the first routing entry. For example, the processor 1102 may obtain the second routing entry by replacing the outbound port information of the first virtual forwarding device, which is carried in the action field of the first routing entry, with the outbound port information of the first physical forwarding device. Optionally, if the processor 1102 allocates the virtual network identifier to the virtual network, a match field of the second routing entry may further carry the virtual network identifier.

For another example, after the processor 1102 registers the first virtual forwarding device with the virtual SDN controller, the processor 1102 may optionally further obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device; the processor 1102 determines, based on the first virtual forwarding device and the device mapping relationship, the first physical forwarding device that has the mapping relationship with the first virtual forwarding device; the processor 1102 determines, based on the port mapping relationship and the outbound port information of the first virtual forwarding device, the outbound port information of the first physical forwarding device that has the mapping relationship with the outbound port information of the first virtual forwarding device; and the processor 1102 sends a second routing entry to the first physical forwarding device, where a match field of the second routing entry carries the network address, where the network address is a destination address and/or a source address, and an action field of the second routing entry carries the outbound port information of the first physical forwarding device. The processor 1102 may, for example, obtain the second routing entry by conversion based on the first routing entry. For example, the processor 1102 may obtain the second routing entry by replacing the outbound port information of the first virtual forwarding device, which is carried in the action field of the first routing entry, with the outbound port information of the first physical forwarding device. Optionally, if the processor 1102 allocates the virtual network identifier to the virtual network, the match field of the second routing entry may further carry the virtual network identifier.

For another example, after the processor 1102 registers the first virtual forwarding device with the virtual SDN controller, the processor 1102 may optionally further obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device; the processor 1102 determines, based on the first virtual forwarding device and the device mapping relationship, the first physical forwarding device that has the mapping relationship with the first virtual forwarding device; the processor 1102 determines, based on the port mapping relationship and the outbound port information of the first virtual forwarding device, the outbound port information of the first physical forwarding device that has the mapping relationship with the outbound port information of the first virtual forwarding device; the processor 1102 determines, based on the port mapping relationship and the inbound port information of the first virtual forwarding device, the inbound port information of the first physical forwarding device that has the mapping relationship with the inbound port information of the first virtual forwarding device; and the processor 1102 sends a fourth routing entry to the first physical forwarding device, where a match field of the fourth routing entry carries the inbound port information of the first physical forwarding device, and an action field of the fourth routing entry carries the outbound port information of the first physical forwarding device. The processor 1102 may, for example, obtain the fourth routing entry by conversion based on the third routing entry. For example, the processor 1102 may obtain the fourth routing entry by replacing the inbound port information of the first virtual forwarding device, which is carried in the match field of the third routing entry, with the inbound port information of the first physical forwarding device, and replacing the outbound port information of the first virtual forwarding device, which is carried in the action field of the third routing entry, with the outbound port information of the first physical forwarding device.

For another example, after the processor 1102 registers the first virtual forwarding device with the virtual SDN controller, the processor 1102 may optionally further receive a first control message reported by the first physical forwarding device, where a match field of the first control message carries the inbound port information of the first physical forwarding device; the processor 1102 determines, based on the first physical forwarding device and the device mapping relationship, the first virtual forwarding device that has the mapping relationship with the first physical forwarding device; the processor 1102 determines, based on the port mapping relationship and the inbound port information of the first physical forwarding device, the inbound port information of the first virtual forwarding device that has the mapping relationship with the inbound port information of the first physical forwarding device; and the processor 1102 sends a second control message to the virtual SDN controller by using the first virtual forwarding device, where a match field of the second control message may carry the inbound port information of the first virtual forwarding device. The processor 1102 may obtain the second control message by conversion based on the first control message. For example, the processor 1102 may obtain the second control message by replacing the inbound port information of the first physical forwarding device, which is carried in the match field of the first control message, with the inbound port information of the first virtual forwarding device.

For another example, after the processor 1102 registers the first virtual forwarding device with the virtual SDN controller, the processor 1102 may optionally further receive a third control message reported by the first physical forwarding device, where a match field of the third control message may carry a virtual network identifier of a virtual network to which the first virtual forwarding device belongs; the processor 1102 determines, based on the virtual network identifier, the first physical forwarding device, and the device mapping relationship, the first virtual forwarding device that has the mapping relationship with the first physical forwarding device; and the processor 1102 removes the virtual network identifier of the virtual network to which the first virtual forwarding device belongs, which is carried in the match field of the third control message, so as to obtain a fourth control message. The processor 1102 sends the fourth control message to the virtual SDN controller by using the first virtual forwarding device.

In some embodiments of the present invention, if the processor 1102 obtains, by using the first virtual forwarding device, the first routing entry delivered by the virtual SDN controller, the processor 1102 may optionally further save the first routing entry. If the processor 1102 obtains, by using the first virtual forwarding device, the third routing entry delivered by the virtual SDN controller, the processor 1102 may optionally further save the third routing entry.

Particularly, some control messages may also need to be transferred only between a virtual controller and a virtual forwarding device. It is unnecessary for the processor 1102 to forward these control messages to a physical forwarding device that has a mapping relationship with the virtual forwarding device. For example, after a fifth control message sent by the virtual SDN controller is received by using the first virtual forwarding device, the processor 1102 may feed back a response message of the fifth control message to the virtual SDN controller by using the first virtual forwarding device. Alternatively, the processor 1102 may also send a sixth control message to the virtual SDN controller by using the first virtual forwarding device, and receive, by using the first virtual forwarding device, a response message that is of the sixth control message and is fed back by the virtual SDN controller.

It can be understood that functions of each functional module of the SDN controller 1100 in this embodiment may be implemented according to the methods in the foregoing method embodiments. The implementation process thereof is not further described herein. For details, refer to related descriptions of the foregoing method embodiments.

As seen from above, in this implementation solution, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by this embodiment has great improvements in manners such as service networking flexibility, and helps reduce service costs and shorten a service deployment period. In addition, after the virtual network is created, an SDN controller 1100 establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN mechanism, introduction of the virtual SDN controller and SDN controller 1100 helps simplify a service configuration, and helps further reduce the service costs and shorten the service deployment period.

Referring to FIG. 12, FIG. 12 is a structural block diagram of an SDN controller 1200 according to another embodiment of the present invention. The SDN controller 1200 may include at least one processor 1201, at least one network interface 1204 or user interface 1203, a memory 1205, and at least one communications bus 1202. The communications bus 1202 is configured to implement communication between the components. The SDN controller 1200 optionally includes the user interface 1203, including a display (for example, a touchscreen, an LCD, a CRT, holographic (Holographic), or a projector (Projector)), a pointer device (for example, a mouse, a trackball (trackball), a touch pad, or a touchscreen), a camera, and/or a pickup apparatus, and the like.

The memory 1205 may include a read-only memory and a random access memory, and provide an instruction and data for the processor 1201. A part in the memory 1202 may further include a non-volatile random access memory (NVRAM).

In some implementation manners, the memory 1205 stores the following elements: an executable module or data structure, or a subset of the executable module or data structure, or an extended set of the executable module or data structure:

an operating system 12051, including various system programs and configured to implement various basic services and process hardware-based tasks; and an application module 12052, including various applications and configured to implement various application services.

The application module 12052 includes but is not limited to at least one unit in the structures shown in FIG. 10-*a* to FIG. 10-*e*.

In the embodiment of the present invention, by invoking a program or an instruction stored in the memory 1205, the processor 1201 is configured to: receive a virtual network creation request that carries virtual network topology information; create a virtual network in response to the virtual network creation request, where the virtual network has a topology described by the virtual network topology information, and the virtual network includes a first virtual forwarding device and a second virtual forwarding device; establish a device mapping relationship, where the device mapping relationship includes a mapping relationship between the first virtual forwarding device and a first physical forwarding device in a physical network, and a mapping relationship between the second virtual forwarding device and a second physical forwarding device in the physical network; establish a port mapping relationship, where the port mapping relationship includes a mapping relationship between a port of the first virtual forwarding device and a port of the first physical forwarding device, and a mapping relationship between a port of the second virtual forwarding device and a port of the second physical forwarding device; allocate a virtual SDN controller to the virtual network; and register the first virtual forwarding device and the second virtual forwarding device with the virtual SDN controller.

Certainly, the virtual network may optionally further include other virtual forwarding devices. For example, the virtual network may optionally further include a third virtual forwarding device, a fourth virtual forwarding device, and the like. Each virtual forwarding device in the virtual network is a software instance. The virtual forwarding device may simulate a behavior mode of a physical forwarding device externally.

In some embodiments of the present invention, the processor 1201 may establish the mapping relationship between the first virtual forwarding device and the first physical forwarding device by generating a mapping relationship record that records device identifiers of the first virtual forwarding device and the first physical forwarding device. Likewise, the mapping relationship between the second virtual forwarding device and the second physical forwarding device may be established by generating a mapping relationship record that records device identifiers of the second virtual forwarding device and the second physical forwarding device. Manners of establishing mapping relationships between other virtual forwarding devices and other physical forwarding devices may be similar. Certainly, the device mapping relationship may also be established in other manners.

The first physical forwarding device may be a physical forwarding device or may also be a physical forwarding device group including multiple physical forwarding devices. Likewise, the second physical forwarding device may be a physical forwarding device or may also be a physical forwarding device group including multiple physical forwarding devices. For example, assuming that the first physical forwarding device is a router A, establishing the mapping relationship between the first virtual forwarding device and the first physical forwarding device includes: establishing a mapping relationship between the router A and the first virtual forwarding device. For another example, assuming that the first physical forwarding device is a physical forwarding device group including the router A and a router B, establishing the mapping relationship between the first virtual forwarding device and the first physical forwarding device includes: establishing a mapping relationship between the physical forwarding device group including the router A and router B, and the first virtual forwarding device. Other cases are similar to the foregoing case.

It can be understood that different virtual forwarding devices in different virtual networks may have a mapping relationship with a same physical forwarding device.

In some embodiments of the present invention, the processor 1201 may allocate different SDN controllers to different virtual networks, that is, the virtual SDN controller and the virtual network may be in a one-to-one correspondence. In some scenarios, the processor 1201 may also allocate a same virtual SDN controller to at least two virtual networks.

The virtual SDN controller may be integrated in the SDN controller. The virtual SDN controller may also be a device independent of the SDN controller. For example, the virtual SDN controller may be a server, a virtual machine, or a software instance.

The processor 1201 may register virtual forwarding devices including the first virtual forwarding device and the second virtual forwarding device in the virtual network with the virtual SDN controller. By registering the virtual forwarding devices with the virtual SDN controller, control channels may be established between the virtual SDN controller and the virtual forwarding devices. The virtual SDN controller may deliver control information such as a routing entry to the virtual forwarding devices based on the control channels, and the virtual SDN controller may further use the control channels to discover the topology of the virtual network based on a topology discovery protocol. The virtual forwarding devices may use the control channels to report a virtual device power-on/power-off event, a port activation/deactivation event, a link activation/deactivation event, and the like to the virtual SDN controller.

In some embodiments of the present invention, after the virtual network is created, the processor 1201 may optionally further allocate a virtual network identifier to the virtual network. The processor 1201 may optionally further establish a mapping relationship between the virtual network identifier and an identifier of the virtual SDN controller.

In some embodiments of the present invention, after the virtual network is created, the processor 1201 may optionally further separately allocate a device identifier to the first virtual forwarding device and the second virtual forwarding device (certainly the processor 1201 may optionally further separately allocate a device identifier to other virtual forwarding devices in the virtual network). The mapping relationship between the first virtual forwarding device and the first physical forwarding device in the physical network may include a mapping relationship between the device identifier of the first virtual forwarding device and a device identifier of the first physical forwarding device. The mapping relationship between the second virtual forwarding device and the second physical forwarding device in the physical network may include a mapping relationship between the device identifier of the second virtual forwarding device and a device identifier of the second physical forwarding device. It can be understood that mapping relationships between other virtual forwarding devices (if any) and other physical forwarding devices (if any) are inferred by analogy.

In some embodiments of the present invention, optionally, the virtual network creation request may further carry link attribute information and the like, and after the virtual network is created, the processor 1201 may optionally further establish a mapping relationship between a first virtual link and a first link tunnel, where the first link tunnel complies with a constraint of the link attribute information, where the first virtual link is a virtual link between the first virtual forwarding device and the second virtual forwarding device, and the link tunnel is a link tunnel between the first physical forwarding device and the second physical forwarding device. In some embodiments of the present invention, the link attribute information includes at least one piece of the following information: link bandwidth information, link delay information, link packet loss ratio information, link jitter information, and the like.

In some embodiments of the present invention, an information group used to describe the first virtual link may include: the device identifier of the first virtual forwarding device (namely, a source virtual forwarding device), a port identifier of a link source port in the first virtual forwarding device, the device identifier of the second virtual forwarding device (namely, a destination virtual forwarding device), and a port identifier of a link destination port in the first virtual forwarding device.

In some embodiments of the present invention, the mapping relationship between the port of the first virtual forwarding device and the port of the first physical forwarding device may include at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

Similarly, the mapping relationship between the port of the second virtual forwarding device and the port of the second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

The physical forwarding device in the embodiments of the present invention may be a physical router or a physical switch, which is a device having a packet forwarding function, where the virtual forwarding device may be a virtual router or a virtual switch.

For example, after the processor 1201 registers the first virtual forwarding device with the virtual SDN controller, the processor 1201 may optionally further obtain, by using the first virtual forwarding device, a first routing entry delivered by the virtual SDN controller, where an action field of the first routing entry carries the outbound port information of the first virtual forwarding device; the processor 1201 determines, based on the first virtual forwarding device and the device mapping relationship, the first physical forwarding device that has the mapping relationship with the first virtual forwarding device; the processor 1201 determines, based on the port mapping relationship and the outbound port information of the first virtual forwarding device, the outbound port information of the first physical forwarding device that has the mapping relationship with the outbound port information of the first virtual forwarding device; and the processor 1201 sends a second routing entry to the first physical forwarding device, where an action field of the second routing entry carries the outbound port information of the first physical forwarding device. The processor 1201 may, for example, obtain the second routing entry by conversion based on the first routing entry. For example, the processor 1201 may obtain the second routing entry by replacing the outbound port information of the first virtual forwarding device, which is carried in the action field of the first routing entry, with the outbound port information of the first physical forwarding device. Optionally, if the processor 1201 allocates the virtual network identifier to the virtual network, a match field of the second routing entry may further carry the virtual network identifier.

For another example, after the processor 1201 registers the first virtual forwarding device with the virtual SDN controller, the processor 1201 may optionally further obtain, by using the first virtual forwarding device, a first routing entry delivered by the virtual SDN controller, where a match field of the first routing entry carries a network address, where the network address is a destination address and/or a source address, and an action field of the first routing entry carries the outbound port information of the first virtual forwarding device; the processor 1201 determines, based on the first virtual forwarding device and the device mapping relationship, the first physical forwarding device that has the mapping relationship with the first virtual forwarding device; the processor 1201 determines, based on the port mapping relationship and the outbound port information of the first virtual forwarding device, the outbound port information of the first physical forwarding device that has the mapping relationship with the outbound port information of the first virtual forwarding device; and the processor 1201 sends a second routing entry to the first physical forwarding device, where a match field of the second routing entry carries the network address, where the network address is a destination address and/or a source address, and an action field of the second routing entry carries the outbound port information of the first physical forwarding device. The processor 1201 may, for example, obtain the second routing entry by conversion based on the first routing entry. For example, the processor 1201 may obtain the second routing entry by replacing the outbound port information of the first virtual forwarding device, which is carried in the action field of the first routing entry, with the outbound port information of the first physical forwarding device. Optionally, if the processor 1201 allocates the virtual network identifier to the virtual network, the match field of the second routing entry may further carry the virtual network identifier.

For another example, after the processor 1201 registers the first virtual forwarding device with the virtual SDN controller, the processor 1201 may optionally further obtain, by using the first virtual forwarding device, a third routing entry delivered by the virtual SDN controller, where a match field of the third routing entry carries the inbound port information of the first virtual forwarding device, and an action field of the third routing entry carries the outbound port information of the first virtual forwarding device; the processor 1201 determines, based on the first virtual forwarding device and the device mapping relationship, the first physical forwarding device that has the mapping relationship with the first virtual forwarding device; the processor 1201 determines, based on the port mapping relationship and the outbound port information of the first virtual forwarding device, the outbound port information of the first physical forwarding device that has the mapping relationship with the outbound port information of the first virtual forwarding device; the processor 1201 determines, based on the port mapping relationship and the inbound port information of the first virtual forwarding device, the inbound port information of the first physical forwarding device that has the mapping relationship with the inbound port information of the first virtual forwarding device; and the processor 1201 sends a fourth routing entry to the first physical forwarding device, where a match field of the fourth routing entry carries the inbound port information of the first physical forwarding device, and an action field of the fourth routing entry carries the outbound port information of the first physical forwarding device. The processor 1201 may, for example, obtain the fourth routing entry by conversion based on the third routing entry. For example, the processor 1201 may obtain the fourth routing entry by replacing the inbound port information of the first virtual forwarding device, which is carried in the match field of the third routing entry, with the inbound port information of the first physical forwarding device, and replacing the outbound port information of the first virtual forwarding device, which is carried in the action field of the third routing entry, with the outbound port information of the first physical forwarding device.

For another example, after the processor 1201 registers the first virtual forwarding device with the virtual SDN controller, the processor 1201 may optionally further receive a first control message reported by the first physical forwarding device, where a match field of the first control message carries the inbound port information of the first physical forwarding device; the processor 1201 determines, based on the first physical forwarding device and the device mapping relationship, the first virtual forwarding device that has the mapping relationship with the first physical forwarding device; the processor 1201 determines, based on the port mapping relationship and the inbound port information of the first physical forwarding device, the inbound port information of the first virtual forwarding device that has the mapping relationship with the inbound port information of the first physical forwarding device; and the processor 1201 sends a second control message to the virtual SDN controller by using the first virtual forwarding device, where a match field of the second control message may carry the inbound port information of the first virtual forwarding device. The processor 1201 may obtain the second control message by conversion based on the first control message. For example, the processor 1201 may obtain the second control message by replacing the inbound port information of the first physical forwarding device, which is carried in the match field of the first control message, with the inbound port information of the first virtual forwarding device.

For another example, after the processor 1201 registers the first virtual forwarding device with the virtual SDN controller, the processor 1201 may optionally further receive a third control message reported by the first physical forwarding device, where a match field of the third control message may carry a virtual network identifier of a virtual network to which the first virtual forwarding device belongs; the processor 1201 determines, based on the virtual network identifier, the first physical forwarding device, and the device mapping relationship, the first virtual forwarding device that has the mapping relationship with the first physical forwarding device; and the processor 1201 removes the virtual network identifier of the virtual network to which the first virtual forwarding device belongs, which is carried in the match field of the third control message, so as to obtain a fourth control message. The processor 1201 sends the fourth control message to the virtual SDN controller by using the first virtual forwarding device.

In some embodiments of the present invention, if the processor 1201 obtains, by using the first virtual forwarding device, the first routing entry delivered by the virtual SDN controller, the processor 1201 may optionally further save the first routing entry. If the processor 1201 obtains, by using the first virtual forwarding device, the third routing entry delivered by the virtual SDN controller, the processor 1201 may optionally further save the third routing entry.

Particularly, some control messages may also need to be transferred only between a virtual controller and a virtual forwarding device. It is unnecessary for the processor 1201 to forward these control messages to a physical forwarding device that has a mapping relationship with the virtual forwarding device. For example, after a fifth control message sent by the virtual SDN controller is received by using the first virtual forwarding device, the processor 1201 may feed back a response message of the fifth control message to the virtual SDN controller by using the first virtual forwarding device. Alternatively, the processor 1201 may also send a sixth control message to the virtual SDN controller by using the first virtual forwarding device, and receive, by using the first virtual forwarding device, a response message that is of the sixth control message and is fed back by the virtual SDN controller.

It can be understood that functions of each functional module of the SDN controller 1200 in this embodiment may be implemented according to the methods in the foregoing method embodiments. The implementation process thereof is not further described herein. For details, refer to related descriptions of the foregoing method embodiments.

As seen from above, in this implementation solution, a mechanism for creating a virtual network according to a requirement is provided, so that a user may raise, according to a requirement of the user, a virtual network creation request for creating a virtual network of a required topology, and that a user using the virtual network does not need to perceive a specific topology of a physical network. In comparison with a conventional VPN creation mechanism, the virtual network creation mechanism provided by this embodiment has great improvements in manners such as service networking flexibility, and helps reduce service costs and shorten a service deployment period. In addition, after the virtual network is created, an SDN controller 1200 establishes a device mapping relationship and a port mapping relationship between the virtual network and the physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, which helps implement separation of a control plane from a data forwarding plane of the physical network to some extent. In comparison with a conventional VPN mechanism, introduction of the virtual SDN controller and SDN controller 1200 helps simplify a service configuration, and helps further reduce the service costs and shorten the service deployment period.

Referring to FIG. 13-*a*, FIG. 13-*a* is a schematic diagram of an SDN controller 1300 according to an embodiment of the present invention. The SDN controller 1300 may include a first obtaining unit 1301, a first converting unit 1302, and a sending unit 1303.

The first obtaining unit 1301 is configured to obtain, by using a first virtual forwarding device, a first routing entry delivered by a virtual SDN controller, where an action field of the first routing entry carries outbound port information of the first virtual forwarding device, and the first virtual forwarding device is registered with the virtual SDN controller.

The first converting unit 1302 is configured to: determine, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determine, based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device.

The sending unit 1303 is configured to send a second routing entry to the first physical forwarding device, where a match field of the second routing entry carries the network address, and an action field of the second routing entry carries the outbound port information of the first physical forwarding device.

In some embodiments of the present invention, the outbound port information of the first virtual forwarding device includes a port identifier of an outbound port of the first virtual forwarding device.

The outbound port information of the first physical forwarding device includes a port identifier of an outbound port of the first physical forwarding device, or the outbound port information of the first physical forwarding device includes a port identifier and an outbound port label of an outbound port of the first physical forwarding device.

In some embodiments of the present invention, a match field of the first routing entry carries a network address, where the network address is a destination address and/or a source address; and the match field of the second routing entry carries the network address.

In some embodiments of the present invention, the match field of the second routing entry carries a virtual network of a virtual network to which the first virtual forwarding device belongs.

In some embodiments of the present invention, the match field of the first routing entry carries inbound port information of the first virtual forwarding device.

Referring to FIG. 13-*b*, the SDN controller 1300 may further include:

a second converting unit 1304, configured to determine, based on the port mapping relationship and the inbound port information of the first virtual forwarding device, inbound port information of the first physical forwarding device that has a mapping relationship with the inbound port information of the first virtual forwarding device, where the port mapping relationship further includes the mapping relationship between the inbound port information of the first virtual forwarding device and the inbound port information of the first physical forwarding device.

The match field of the second routing entry may carry the inbound port information of the first physical forwarding device.

In some embodiments of the present invention, the sending unit 1303 may, for example, obtain the second routing entry by conversion based on the first routing entry. For example, the sending unit 1303 may obtain the second routing entry by replacing the outbound port information of the first virtual forwarding device, which is carried in the action field of the first routing entry, with the outbound port information of the first physical forwarding device.

In some embodiments of the present invention, a mapping relationship between a port of the first virtual forwarding device and a port of the first physical forwarding device may include at least one of the following mapping relationships: the mapping relationship between the inbound port information of the first virtual forwarding device and the inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

It can be understood that functions of each functional module of the SDN controller 1300 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1300 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1300 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1300 helps simplify a service configuration, and helps reduce service costs and shorten a service deployment period.

Referring to FIG. 14, FIG. 14 is a schematic diagram of an SDN controller 1400 according to an embodiment of the present invention. The SDN controller 1400 may include at least one bus 1401, at least one processor 1402 connected to the bus 1401, and at least one memory 1403 connected to the bus 1401.

By invoking, by using the bus 1401, code stored in the memory 1403, the processor 1402 is configured to: obtain, by using a first virtual forwarding device, a first routing entry delivered by a virtual SDN controller, where an action field of the first routing entry carries outbound port information of the first virtual forwarding device, and the first virtual forwarding device is registered with the virtual SDN controller; determine, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determine, based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and send a second routing entry to the first physical forwarding device, where an action field of the second routing entry carries the outbound port information of the first physical forwarding device.

In addition, a virtual network to which the first virtual forwarding device belongs may further include a second virtual forwarding device and the like.

In some embodiments of the present invention, the SDN controller may, for example, obtain the second routing entry by conversion based on the first routing entry. For example, the SDN controller may obtain the second routing entry by replacing the outbound port information of the first virtual forwarding device, which is carried in the action field of the first routing entry, with the outbound port information of the first physical forwarding device.

The physical forwarding device in the embodiments of the present invention may be a physical router or a physical switch, which is a device having a packet forwarding function, where the virtual forwarding device may be a virtual router or a virtual switch.

In some embodiments of the present invention, a mapping relationship between a port of the first virtual forwarding device and a port of the first physical forwarding device may include at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, the first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, the first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

In some embodiments of the present invention, optionally, a match field of the first routing entry carries a network address, where the network address is a destination address and/or a source address; and a match field of the second routing entry carries the network address.

In some embodiments of the present invention, optionally, the match field of the second routing entry carries a virtual network of the virtual network to which the first virtual forwarding device belongs.

In some other embodiments of the present invention, optionally, the match field of the first routing entry carries the inbound port information of the first virtual forwarding device, and optionally, the processor 1402 may further determine, based on the port mapping relationship and the inbound port information of the first virtual forwarding device, the inbound port information of the first physical forwarding device that has the mapping relationship with the inbound port information of the first virtual forwarding device, where the port mapping relationship further includes the mapping relationship between the inbound port information of the first virtual forwarding device and the inbound port information of the first physical forwarding device. The match field of the second routing entry may further carry the inbound port information of the first physical forwarding device.

It can be understood that functions of each functional module of the SDN controller 1400 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1400 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1400 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1400 helps simplify a service configuration, and helps reduce service costs and shorten a service deployment period.

Figure 15:
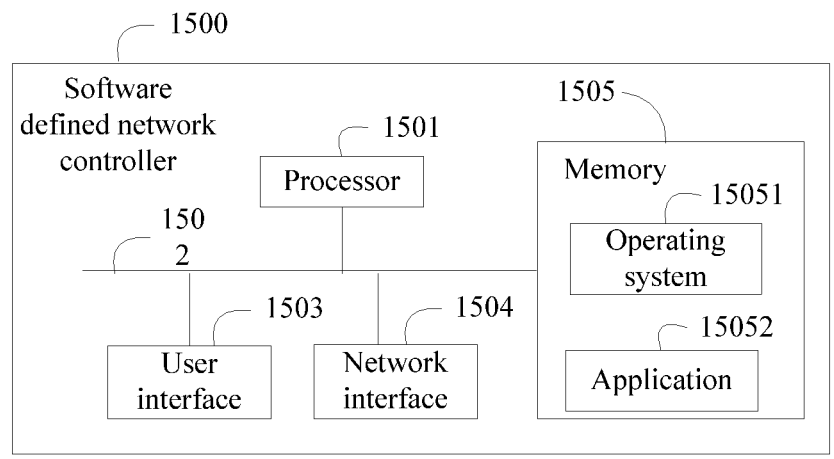

Referring to FIG. 15, FIG. 15 is a structural block diagram of an SDN controller 1500 according to another embodiment of the present invention. The SDN controller 1500 may include at least one processor 1501, at least one network interface 1504 or another user interface 1503, a memory 1505, and at least one communications bus 1502. The communications bus 1502 is configured to implement connections and communication between the components. The SDN controller 1500 optionally includes the user interface 1503, including a display (for example, a touchscreen, an LCD, a CRT, holographic (Holographic), or a projector (Projector)), a pointer device (for example, a mouse, a trackball (trackball), a touch pad, or a touchscreen), a camera, and/or a pickup apparatus, and the like.

The memory 1505 may include a read-only memory and a random access memory, and provide an instruction and data for the processor 1501. A part in the memory 1502 may further include a non-volatile random access memory (NVRAM).

In some implementation manners, the memory 1505 stores the following elements: an executable module or data structure, or a subset of the executable module or data structure, or an extended set of the executable module or data structure:

an operating system 15051, including various system programs and configured to implement various basic services and process hardware-based tasks; and an application module 15052, including various applications and configured to implement various application services.

The application module 15052 may include but is not limited to a second converting unit 1304, a first obtaining unit 1301, a first converting unit 1302, and/or a sending unit 1303, and the like.

In this embodiment of the present invention, by invoking a program or an instruction stored in the memory 1505, the processor 1501 is configured to: obtain, by using a first virtual forwarding device, a first routing entry delivered by a virtual SDN controller, where an action field of the first routing entry carries outbound port information of the first virtual forwarding device, and the first virtual forwarding device is registered with the virtual SDN controller; determine, based on the first virtual forwarding device and the device mapping relationship, a first physical forwarding device that has a mapping relationship with the first virtual forwarding device, where the device mapping relationship includes the mapping relationship between the first virtual forwarding device and the first physical forwarding device in a physical network; determine, based on the port mapping relationship and the outbound port information of the first virtual forwarding device, outbound port information of the first physical forwarding device that has a mapping relationship with the outbound port information of the first virtual forwarding device, where the port mapping relationship includes the mapping relationship between the outbound port information of the first virtual forwarding device and the outbound port information of the first physical forwarding device; and send a second routing entry to the first physical forwarding device, where an action field of the second routing entry carries the outbound port information of the first physical forwarding device.

In addition, a virtual network to which the first virtual forwarding device belongs may further include a second virtual forwarding device and the like.

In some embodiments of the present invention, the SDN controller may, for example, obtain the second routing entry by conversion based on the first routing entry. For example, the SDN controller may obtain the second routing entry by replacing the outbound port information of the first virtual forwarding device, which is carried in the action field of the first routing entry, with the outbound port information of the first physical forwarding device.

The physical forwarding device in the embodiments of the present invention may be a physical router or a physical switch, which is a device having a packet forwarding function, where the virtual forwarding device may be a virtual router or a virtual switch.

In some embodiments of the present invention, a mapping relationship between a port of the first virtual forwarding device and a port of the first physical forwarding device may include at least one of the following mapping relationships: a mapping relationship between inbound port information of the first virtual forwarding device and inbound port information of the first physical forwarding device; and the mapping relationship between the outbound port information of the first virtual forwarding device and the outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

In some embodiments of the present invention, optionally, a match field of the first routing entry carries a network address, where the network address is a destination address and/or a source address; and a match field of the second routing entry carries the network address.

In some embodiments of the present invention, optionally, the match field of the second routing entry carries a virtual network of the virtual network to which the first virtual forwarding device belongs.

In some other embodiments of the present invention, optionally, the match field of the first routing entry carries the inbound port information of the first virtual forwarding device, and optionally, the processor 1501 may further determine, based on the port mapping relationship and the inbound port information of the first virtual forwarding device, the inbound port information of the first physical forwarding device that has the mapping relationship with the inbound port information of the first virtual forwarding device, where the port mapping relationship further includes the mapping relationship between the inbound port information of the first virtual forwarding device and the inbound port information of the first physical forwarding device. The match field of the second routing entry may further carry the inbound port information of the first physical forwarding device.

It can be understood that functions of each functional module of the SDN controller 1500 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1500 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1500 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1500 helps simplify a service configuration, and helps reduce service costs and shorten a service deployment period.

Figure 16:
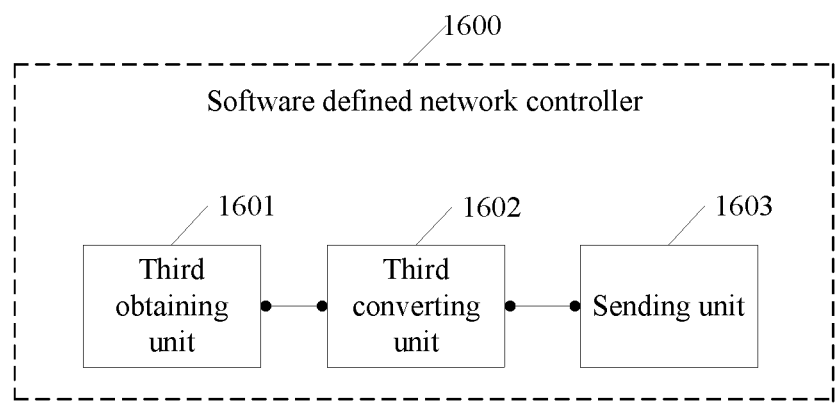

Referring to FIG. 16, FIG. 16 is a schematic diagram of an SDN controller 1600 according to an embodiment of the present invention. The SDN controller 1600 may include:

a third obtaining unit 1601, a third converting unit 1602, and a sending unit 1603.

The third obtaining unit 1601 is configured to receive a third control message reported by a first physical forwarding device in a physical network, where a match field of the third control message carries inbound port information of the first physical forwarding device.

The third converting unit 1602 is configured to determine, based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device.

The sending unit 1603 is configured to send a fourth control message to a virtual SDN controller by using the first virtual forwarding device, where a match field of the fourth control message carries the inbound port information of the first virtual forwarding device, and the first virtual forwarding device is registered with the virtual SDN controller.

In some embodiments of the present invention, the inbound port information of the first virtual forwarding device includes a port identifier of an inbound port of the first virtual forwarding device.

The inbound port information of the first physical forwarding device includes a port identifier of an inbound port of the first physical forwarding device, or the inbound port information of the first physical forwarding device includes a port identifier and an inbound port label of an inbound port of the first physical forwarding device.

In some embodiments of the present invention, the third converting unit 1602 may determine, based on the first physical forwarding device and a device mapping relationship, at least one first virtual forwarding device that has a mapping relationship with the first physical forwarding device and includes the first virtual forwarding device (because different virtual forwarding devices in different virtual networks may have a mapping relationship with a same physical forwarding device). The third converting unit 1602 determines, based on the port mapping relationship and first inbound port information of the first physical forwarding device, first inbound port information of the first virtual forwarding device that has a mapping relationship with the first inbound port information of the first physical forwarding device.

A virtual network in which the first virtual forwarding device is located may further include a second virtual forwarding device; and the first virtual forwarding device and the second virtual forwarding device are registered with the virtual SDN controller.

The physical forwarding device in the embodiments of the present invention may be a physical router or a physical switch, which is a device having a packet forwarding function, where the virtual forwarding device may be a virtual router or a virtual switch.

In some embodiments of the present invention, a mapping relationship between a port of the first virtual forwarding device and a port of the first physical forwarding device may include at least one of the following mapping relationships: the mapping relationship between the inbound port information of the first virtual forwarding device and the inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, the first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, the first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

It can be understood that functions of each functional module of the SDN controller 1600 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1600 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1600 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1600 helps simplify a service configuration, and helps reduce service costs and shorten a service deployment period.

Figure 17:
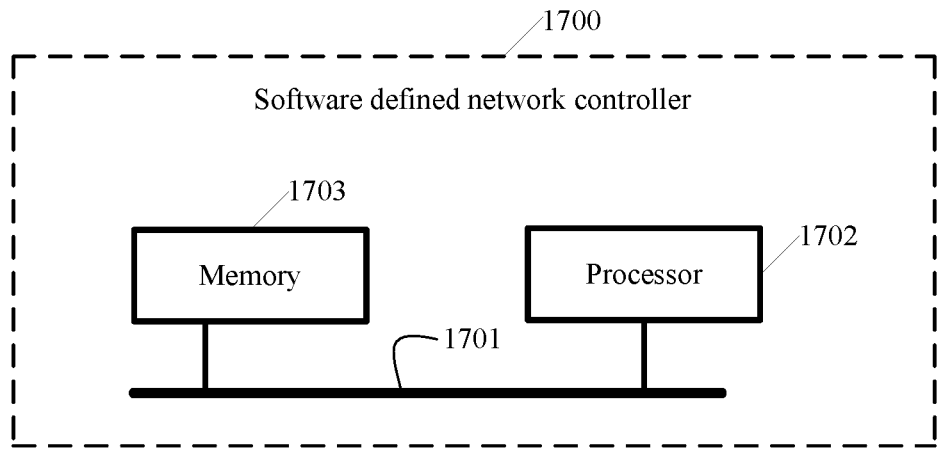

Referring to FIG. 17, FIG. 17 is a schematic diagram of an SDN controller 1700 according to an embodiment of the present invention. The SDN controller 1700 may include at least one bus 1701, at least one processor 1702 connected to the bus 1701, and at least one memory 1703 connected to the bus 1701.

By invoking, by using the bus 1701, code stored in the memory 1703, the processor 1702 is configured to: receive a third control message reported by a first physical forwarding device in a physical network, where a match field of the third control message carries inbound port information of the first physical forwarding device; determine, based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and send a fourth control message to a virtual SDN controller by using the first virtual forwarding device, where a match field of the fourth control message carries the inbound port information of the first virtual forwarding device, and the first virtual forwarding device is registered with the virtual SDN controller.

In some embodiments of the present invention, the processor 1702 may determine, based on the first physical forwarding device and a device mapping relationship, at least one first virtual forwarding device that has a mapping relationship with the first physical forwarding device and includes the first virtual forwarding device (because different virtual forwarding devices in different virtual networks may have a mapping relationship with a same physical forwarding device). The processor 1702 determines, based on the port mapping relationship and first inbound port information of the first physical forwarding device, first inbound port information of the first virtual forwarding device that has a mapping relationship with the first inbound port information of the first physical forwarding device.

A virtual network in which the first virtual forwarding device is located may further include a second virtual forwarding device; and the first virtual forwarding device and the second virtual forwarding device are registered with the virtual SDN controller.

In some embodiments of the present invention, a mapping relationship between a port of the first virtual forwarding device and a port of the first physical forwarding device may include at least one of the following mapping relationships: the mapping relationship between the inbound port information of the first virtual forwarding device and the inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, the first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of the first virtual forwarding device).

For example, the inbound port information of the first physical forwarding device includes a port identifier of an inbound port of the first physical forwarding device (for example, the first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

It can be understood that functions of each functional module of the SDN controller 1700 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1700 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1700 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1700 helps simplify a service configuration, and helps reduce service costs and shorten a service deployment period.

Figure 18:
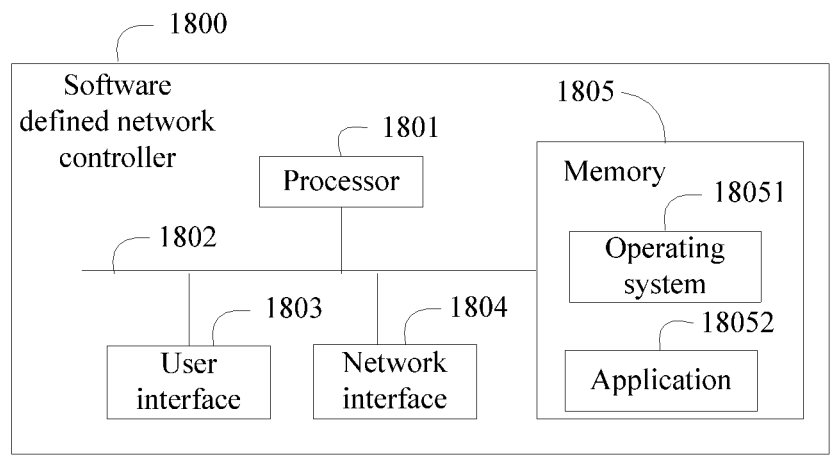

Referring to FIG. 18, FIG. 18 is a structural block diagram of an SDN controller 1800 according to another embodiment of the present invention. The SDN controller 1800 may include at least one processor 1801, at least one network interface 1804 or another user interface 1803, a memory 1805, and at least one communications bus 1802. The communications bus 1802 is configured to implement connections and communication between the components. The SDN controller 1800 optionally includes the user interface 1803, including a display (for example, a touchscreen, an LCD, a CRT, holographic (Holographic), or a projector (Projector)), a pointer device (for example, a mouse, a trackball (trackball), a touch pad, or a touchscreen), a camera, and/or a pickup apparatus, and the like.

The memory 1805 may include a read-only memory and a random access memory, and provide an instruction and data for the processor 1801. A part in the memory 1802 may further include a non-volatile random access memory (NVRAM).

In some implementation manners, the memory 1805 stores the following elements:

an executable module or data structure, or a subset thereof, or an extended set thereof:

an operating system 18051, including various system programs and configured to implement various basic services and process hardware-based tasks; and an application module 18052, including various applications and configured to implement various application services.

The application module 18052 may include but is not limited to a third obtaining unit 1601, a third converting unit 1602, a sending unit 1603, and the like.

In this embodiment of the present invention, by invoking a program or an instruction stored in the memory 1805, the processor 1801 is configured to: receive a third control message reported by a first physical forwarding device in a physical network, where a match field of the third control message carries inbound port information of the first physical forwarding device; determine, based on the port mapping relationship and the inbound port information of the first physical forwarding device, inbound port information of the first virtual forwarding device that has a mapping relationship with the inbound port information of the first physical forwarding device, where the port mapping relationship includes the mapping relationship between the inbound port information of the first virtual forwarding device and the inbound port information of the first physical forwarding device; and send a fourth control message to a virtual SDN controller by using the first virtual forwarding device, where a match field of the fourth control message carries the inbound port information of the first virtual forwarding device, and the first virtual forwarding device is registered with the virtual SDN controller.

In some embodiments of the present invention, the processor 1801 may determine, based on the first physical forwarding device and a device mapping relationship, at least one first virtual forwarding device that has a mapping relationship with the first physical forwarding device and includes the first virtual forwarding device (because different virtual forwarding devices in different virtual networks may have a mapping relationship with a same physical forwarding device). The processor 1801 determines, based on the port mapping relationship and first inbound port information of the first physical forwarding device, first inbound port information of the first virtual forwarding device that has a mapping relationship with the first inbound port information of the first physical forwarding device.

A virtual network in which the first virtual forwarding device is located may further include a second virtual forwarding device; and the first virtual forwarding device and the second virtual forwarding device are registered with the virtual SDN controller.

In some embodiments of the present invention, a mapping relationship between a port of the first virtual forwarding device and a port of the first physical forwarding device may include at least one of the following mapping relationships: the mapping relationship between the inbound port information of the first virtual forwarding device and the inbound port information of the first physical forwarding device; and a mapping relationship between outbound port information of the first virtual forwarding device and outbound port information of the first physical forwarding device.

Similarly, a mapping relationship between a port of the second virtual forwarding device and a port of a second physical forwarding device may include at least one of the following mapping relationships: a mapping relationship between inbound port information of the second virtual forwarding device and inbound port information of the second physical forwarding device; and a mapping relationship between outbound port information of the second virtual forwarding device and outbound port information of the second physical forwarding device.

The outbound port information may include one or more pieces of information related to the outbound port. The inbound port information may include one or more pieces of information related to the inbound port.

For example, the inbound port information of the first virtual forwarding device may include a port identifier of an inbound port of the first virtual forwarding device (for example, first inbound port information of the first virtual forwarding device may include a port identifier of a first inbound port of the first virtual forwarding device). The outbound port information of the first virtual forwarding device may include a port identifier of an outbound port of the first virtual forwarding device (for example, first outbound port information of the first virtual forwarding device may include a port identifier of a first outbound port of the first virtual forwarding device).

For example, the inbound port information of the first physical forwarding device includes a port identifier of an inbound port of the first physical forwarding device (for example, first inbound port information of the first physical forwarding device includes a port identifier of a first inbound port of the first physical forwarding device), or the inbound port information of the first physical forwarding device includes a port identifier and an inbound port label of an inbound port of the first physical forwarding device (for example, first inbound port information of the first physical forwarding device includes a port identifier and an inbound port label of a first inbound port of the first physical forwarding device). The outbound port information of the first physical forwarding device may include a port identifier of an outbound port of the first physical forwarding device (for example, first outbound port information of the first physical forwarding device includes a port identifier of a first outbound port of the first physical forwarding device), or the outbound port information of the first physical forwarding device includes a port identifier and an outbound port label of an outbound port of the first physical forwarding device (for example, first outbound port information of the first physical forwarding device includes a port identifier and an inbound port label of a first outbound port of the first physical forwarding device).

For example, the inbound port information of the second virtual forwarding device may include a port identifier of an inbound port of the second virtual forwarding device (for example, first inbound port information of the second virtual forwarding device may include a port identifier of a first inbound port of the second virtual forwarding device). The outbound port information of the second virtual forwarding device may include a port identifier of an outbound port of the second virtual forwarding device (for example, first outbound port information of the second virtual forwarding device may include a port identifier of a first outbound port of the second virtual forwarding device).

For example, the inbound port information of the second physical forwarding device includes a port identifier of an inbound port of the second physical forwarding device (for example, first inbound port information of the second physical forwarding device includes a port identifier of a first inbound port of the second physical forwarding device), or the inbound port information of the second physical forwarding device includes a port identifier and an inbound port label of an inbound port of the second physical forwarding device (for example, first inbound port information of the second physical forwarding device includes a port identifier and an inbound port label of a first inbound port of the second physical forwarding device). The outbound port information of the second physical forwarding device may include a port identifier of an outbound port of the second physical forwarding device (for example, first outbound port information of the second physical forwarding device includes a port identifier of a first outbound port of the second physical forwarding device), or the outbound port information of the second physical forwarding device includes a port identifier and an outbound port label of an outbound port of the second physical forwarding device (for example, first outbound port information of the second physical forwarding device includes a port identifier and an inbound port label of a first outbound port of the second physical forwarding device).

It can be understood that functions of each functional module of the SDN controller 1800 in this embodiment may be implemented according to the methods in the foregoing method embodiments. The implementation process thereof is not further described herein. For details, refer to related descriptions of the foregoing method embodiments.

As may be seen above, in this implementation solution, after a virtual network is created, an SDN controller 1800 establishes a device mapping relationship and a port mapping relationship between the virtual network and a physical network, and registers a virtual forwarding device in the virtual network with a virtual SDN controller allocated to the virtual network. This helps the virtual SDN controller control the virtual forwarding device in the virtual network like controlling a physical forwarding device, while the virtual SDN controller may control a corresponding physical forwarding device by controlling the virtual forwarding device, and the SDN controller 1800 performs information conversion between the virtual SDN controller and the physical forwarding device, thereby implementing separation of a control plane from a data forwarding plane of the physical network to some extent. In comparison with a conventional VPN mechanism, introduction of the virtual SDN controller and SDN controller 1800 helps simplify a service configuration, and helps reduce service costs and shorten a service deployment period.

Figure 19:
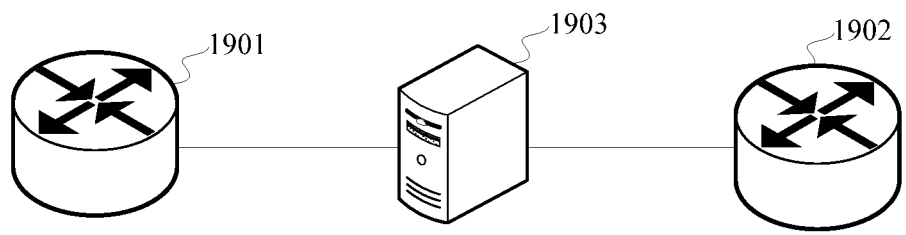
FIG. 19 and FIG. 20 are schematic diagrams of two communications systems according to embodiments of the present invention.

Referring to FIG. 19, an embodiment of the present invention further provides a communications system, which may include a first physical forwarding device 1901, a second physical forwarding device 1902, and an SDN controller 1903. The SDN controller 1903 may be any one of the foregoing SDN controllers in the foregoing embodiments.

Figure 20:
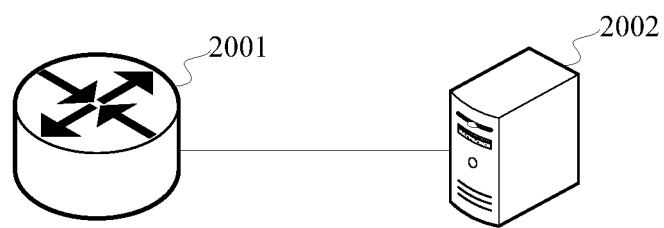

Referring to FIG. 20, an embodiment of the present invention further provides a communications system, which may include a first physical forwarding device 2001 and an SDN controller 2002. The SDN controller 2002 may be any one of the foregoing SDN controllers in the foregoing embodiments.

An embodiment of the present invention further provides a computer storage medium. The computer storage medium may store a program. When being executed, the program includes all or a part of the steps of any one or at least one of the methods for implementing network virtualization that are described in the foregoing method embodiments.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that the embodiments described in this specification all belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for implementing network virtualization, comprising:
   receiving, by a software defined network (SDN) controller, a virtual network creation request that carries virtual network topology information;
   creating, by the SDN controller, a topology for a virtual network in response to the virtual network creation request, wherein the topology is created based on the virtual network topology information, and the topology comprises a first virtual forwarding device and a second virtual forwarding device;
   establishing, by the SDN controller, a first device mapping relationship between the first virtual forwarding device and a first physical forwarding device in a physical network, and a second device mapping relationship between the second virtual forwarding device and a second physical forwarding device in the physical network;
   establishing, by the SDN controller, a first port mapping relationship between a port of the first virtual forwarding device and a port of the first physical forwarding device, and a second port mapping relationship between a port of the second virtual forwarding device and a port of the second physical forwarding device;
   allocating, by the SDN controller, a virtual SDN controller to the virtual network; and
   registering, by the SDN controller, the first virtual forwarding device and the second virtual forwarding device with the virtual SDN controller.

2. The method according to claim 1, wherein after the creating, by the SDN controller, a topology for a virtual network, the method further comprises: allocating, by the SDN controller, a virtual network identifier to the virtual network; and establishing, by the SDN controller, a mapping relationship between the virtual network identifier and an identifier of the virtual SDN controller.

3. The method according to claim 1, wherein:
   the first port mapping relationship comprises at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

4. The method according to claim 3, wherein:
   the inbound port information of the first virtual forwarding device comprises a port identifier of an inbound port of the first virtual forwarding device, and the outbound port information of the first virtual forwarding device comprises a port identifier of an outbound port of the first virtual forwarding device;
   the inbound port information of the first physical forwarding device comprises a port identifier of an inbound port of the first physical forwarding device, or a port identifier and an inbound port label of an inbound port of the first physical forwarding device; and
   the outbound port information of the first physical forwarding device comprises a port identifier of an outbound port of the first physical forwarding device, or a port identifier and an outbound port label of an outbound port of the first physical forwarding device.

5. The method according to claim 3, wherein after the registering, by the SDN controller, the first virtual forwarding device with the virtual SDN controller, the method further comprises:
   obtaining, by the SDN controller, a first routing entry delivered by the virtual SDN controller, wherein a match field of the first routing entry carries a network address, wherein the network address is a destination address and/or a source address, and an action field of the first routing entry carries the outbound port information of the first virtual forwarding device;
   determining, by the SDN controller based on the first virtual forwarding device and the first device mapping relationship, the first physical forwarding device that has the first device mapping relationship with the first virtual forwarding device; and determining, based on the first port mapping relationship and the outbound port information of the first virtual forwarding device, the outbound port information of the first physical forwarding device that has the first port mapping relationship with the outbound port information of the first virtual forwarding device; and
   sending, by the SDN controller, a second routing entry to the first physical forwarding device, wherein a match field of the second routing entry carries the network address, and an action field of the second routing entry carries the outbound port information of the first physical forwarding device.

6. The method according to claim 3, wherein after the registering, by the SDN controller, the first virtual forwarding device with the virtual SDN controller, the method further comprises:

obtaining, by the SDN controller by using the first virtual forwarding device, a third routing entry delivered by the virtual SDN controller, wherein a match field of the third routing entry carries the inbound port information of the first virtual forwarding device, and an action field of the third routing entry carries the outbound port information of the first virtual forwarding device;

determining, by the SDN controller based on the first virtual forwarding device and the first device mapping relationship, the first physical forwarding device that has the first device mapping relationship with the first virtual forwarding device; determining, based on the first port mapping relationship and the outbound port information of the first virtual forwarding device, the outbound port information of the first physical forwarding device that has the first port mapping relationship with the outbound port information of the first virtual forwarding device; and determining, based on the first port mapping relationship and the inbound port information of the first virtual forwarding device, the inbound port information of the first physical forwarding device that has the first port mapping relationship with the inbound port information of the first virtual forwarding device; and sending, by the SDN controller, a fourth routing entry to the first physical forwarding device, wherein a match field of the fourth routing entry carries the inbound port information of the first physical forwarding device, and an action field of the fourth routing entry carries the outbound port information of the first physical forwarding device.

7. The method according to claim 3, wherein after the registering, by the SDN controller, the first virtual forwarding device with the virtual SDN controller, the method further comprises:

receiving, by the SDN controller, a first control message reported by the first physical forwarding device, wherein a match field of the first control message carries the inbound port information of the first physical forwarding device;

determining, by the SDN controller based on the first port mapping relationship and the inbound port information of the first physical forwarding device, the inbound port information of the first virtual forwarding device that has the first port mapping relationship with the inbound port information of the first physical forwarding device; and sending, by the SDN controller, a second control message to the virtual SDN controller by using the first virtual forwarding device, wherein a match field of the second control message carries the inbound port information of the first virtual forwarding device.

8. The method according to claim 1, wherein: after the creating, by the SDN controller, a topology for a virtual network, the method further comprises:

separately allocating, by the SDN controller, a device identifier to the first virtual forwarding device and the second virtual forwarding device;

wherein the first device mapping relationship comprises a mapping relationship between the device identifier of the first virtual forwarding device and a device identifier of the first physical forwarding device; and wherein the second device mapping relationship comprises a mapping relationship between the device identifier of the second virtual forwarding device and a device identifier of the second physical forwarding device.

9. The method according to claim 1, wherein: the virtual network creation request further carries link attribute information, and after the creating, by the SDN controller, a topology for a virtual network, the method further comprises:

establishing, by the SDN controller, a mapping relationship between a virtual link and a link tunnel, wherein the link tunnel complies with a constraint of the link attribute information, wherein the virtual link is a virtual link between the first virtual forwarding device and the second virtual forwarding device, and the link tunnel is a link tunnel between the first physical forwarding device and the second physical forwarding device.

10. A method for implementing network virtualization, comprising:

obtaining, by a software defined network (SDN) controller, a first routing entry delivered by a virtual SDN controller, wherein an action field of the first routing entry carries outbound port information of thea first virtual forwarding device, and the first virtual forwarding device is registered with the virtual SDN controller;

determining, by the SDN controller based on the first virtual forwarding device and a device mapping relationship, a first physical forwarding device, wherein the device mapping relationship comprises the mapping relationship between the first virtual forwarding device and the first physical forwarding device in a physical network;

determining, by the SDN controller based on a port mapping relationship and the outbound port information of the first virtual forwarding device, outbound port information of the first physical forwarding device, wherein the port mapping relationship comprises the mapping relationship between the outbound port information of the first virtual forwarding device and the outbound port information of the first physical forwarding device; and sending, by the SDN controller, a second routing entry to the first physical forwarding device, wherein an action field of the second routing entry carries the outbound port information of the first physical forwarding device.

11. The method according to claim 10, wherein:

the outbound port information of the first virtual forwarding device comprises a port identifier of an outbound port of the first virtual forwarding device; and the outbound port information of the first physical forwarding device comprises a port identifier of an outbound port of the first physical forwarding device, or the outbound port information of the first physical forwarding device comprises a port identifier and an outbound port label of an outbound port of the first physical forwarding device.

12. The method according to claim 10, wherein a match field of the first routing entry carries inbound port information of the first virtual forwarding device; and the method further comprises:

determining, by the SDN controller based on the port mapping relationship and the inbound port information of the first virtual forwarding device, inbound port information of the first physical forwarding device, wherein the port mapping relationship further comprises the mapping relationship between the inbound port information of the first virtual forwarding device and the inbound port information of the first physical forwarding device;

wherein a match field of the second routing entry carries the inbound port information of the first physical forwarding device.

13. A software defined network (SDN) controller, comprising:
a processor;
a non-transitory memory coupled to the processor having instructions stored therein, which when executed by the processor, cause the processor to:
receive a virtual network creation request that carries virtual network topology information;
create a topology for a virtual network in response to the virtual network creation request, wherein the topology is created based on the virtual network topology information, and the topology comprises a first virtual forwarding device and a second virtual forwarding device;
establish a device mapping relationship and establish a port mapping relationship, wherein the device mapping relationship comprises a first device mapping relationship between the first virtual forwarding device and a first physical forwarding device in a physical network, and a second device mapping relationship between the second virtual forwarding device and a second physical forwarding device in the physical network, and the port mapping relationship comprises a first port mapping relationship between a port of the first virtual forwarding device and a port of the first physical forwarding device, and a second port mapping relationship between a port of the second virtual forwarding device and a port of the second physical forwarding device;
allocate a virtual SDN controller to the virtual network; and
register the first virtual forwarding device and the second virtual forwarding device with the virtual SDN controller.

14. The SDN controller according to claim 13, wherein the processor is further configured to execute the instructions to:
allocate a virtual network identifier to the virtual network; and
establish a mapping relationship between the virtual network identifier and an identifier of the virtual SDN controller.

15. The SDN controller according to claim 13, wherein the first port mapping relationship comprises at least one of the following mapping relationships: a mapping relationship between inbound port information of the first virtual forwarding device and inbound port information of the first physical forwarding device; and a mapping relationship between outbound port information of the first virtual forwarding device and outbound port information of the first physical forwarding device.

16. The SDN controller according to claim 13, wherein the processor is further configured to execute the instructions to:
obtain a first routing entry delivered by the virtual SDN controller, wherein a match field of the first routing entry carries a network address, wherein the network address is a destination address and/or a source address, and an action field of the first routing entry carries the outbound port information of the first virtual forwarding device;
determine, based on the first virtual forwarding device and the device mapping relationship, the first physical forwarding device that has the mapping relationship with the first virtual forwarding device; and determine, based on the first port mapping relationship and the outbound port information of the first virtual forwarding device, the outbound port information of the first physical forwarding device that has the mapping relationship with the outbound port information of the first virtual forwarding device; and
send a second routing entry to the first physical forwarding device, wherein a match field of the second routing entry carries the network address, and an action field of the second routing entry carries the outbound port information of the first physical forwarding device.

17. The SDN controller according to claim 13, wherein the processor is further configured to execute the instructions to:
a third routing entry delivered by the virtual SDN controller, wherein a match field of the third routing entry carries the inbound port information of the first virtual forwarding device, and an action field of the third routing entry carries the outbound port information of the first virtual forwarding device;
determine, based on the first virtual forwarding device and the device mapping relationship, the first physical forwarding device that has the first device mapping relationship with the first virtual forwarding device; determine, based on the port mapping relationship and the outbound port information of the first virtual forwarding device, the outbound port information of the first physical forwarding device that has the mapping relationship with the outbound port information of the first virtual forwarding device; and determine, based on the first port mapping relationship and the inbound port information of the first virtual forwarding device, the inbound port information of the first physical forwarding device that has the mapping relationship with the inbound port information of the first virtual forwarding device; and
send a fourth routing entry to the first physical forwarding device, wherein a match field of the fourth routing entry carries the inbound port information of the first physical forwarding device, and an action field of the fourth routing entry carries the outbound port information of the first physical forwarding device.

18. The SDN controller according to claim 13, wherein the processor is further configured to execute the instructions to:
receive a first control message reported by the first physical forwarding device, wherein a match field of the first control message carries the inbound port information of the first physical forwarding device;
determine, based on the first port mapping relationship and the inbound port information of the first physical forwarding device, the inbound port information of the first virtual forwarding device that has the first port mapping relationship with the inbound port information of the first physical forwarding device; and
send a second control message to the virtual SDN controller by using the first virtual forwarding device, wherein a match field of the second control message carries the inbound port information of the first virtual forwarding device.

19. The SDN controller according to claim 13, wherein the processor is further configured to execute the instructions to:

separately allocate a device identifier to the first virtual forwarding device and the second virtual forwarding device;

wherein the first device mapping relationship between the first virtual forwarding device and the first physical forwarding device in the physical network comprises a mapping relationship between the device identifier of the first virtual forwarding device and a device identifier of the first physical forwarding device; and wherein the second device mapping relationship between the second virtual forwarding device and the second physical forwarding device in the physical network comprises a mapping relationship between the device identifier of the second virtual forwarding device and a device identifier of the second physical forwarding device.

20. A software defined network SDN controller, comprising:

a processor;

a non-transitory memory coupled to the processor having instructions stored therein, which when executed by the processor, cause the processor to:

obtain a first routing entry delivered by a virtual SDN controller, wherein an action field of the first routing entry carries outbound port information of a first virtual forwarding device, and the first virtual forwarding device is registered with the virtual SDN controller;

determine, based on the first virtual forwarding device and a device mapping relationship, a first physical forwarding device, wherein the device mapping relationship comprises a first device mapping relationship between the first virtual forwarding device and the first physical forwarding device in a physical network;

determine, based on a port mapping relationship and the outbound port information of the first virtual forwarding device, outbound port information of the first physical forwarding device, wherein the port mapping relationship comprises a first port mapping relationship between the outbound port information of the first virtual forwarding device and the outbound port information of the first physical forwarding device; and send a second routing entry to the first physical forwarding device, wherein an action field of the second routing entry carries the outbound port information of the first physical forwarding device.

21. The SDN controller according to claim 20, wherein:

the outbound port information of the first virtual forwarding device comprises a port identifier of an outbound port of the first virtual forwarding device; and the outbound port information of the first physical forwarding device comprises a port identifier of an outbound port of the first physical forwarding device, or the outbound port information of the first physical forwarding device comprises a port identifier and an outbound port label of an outbound port of the first physical forwarding device.

22. The SDN controller according to claim 20, wherein:

the match field of the first routing entry carries inbound port information of the first virtual forwarding device; and the processor is further configured to executed the instructions to:

determine, based on the first port mapping relationship and the inbound port information of the first virtual forwarding device, inbound port information of the first physical forwarding device that has a mapping relationship with the inbound port information of the first virtual forwarding device, wherein the port mapping relationship further comprises the mapping relationship between the inbound port information of the first virtual forwarding device and the inbound port information of the first physical forwarding device;

wherein the match field of the second routing entry carries the inbound port information of the first physical forwarding device.

\* \* \* \* \*